US010511955B2

(12) United States Patent
Itoh et al.

(10) Patent No.: US 10,511,955 B2
(45) Date of Patent: Dec. 17, 2019

(54) INFORMATION PROCESSING APPARATUS, COMMUNICATION SYSTEM AND CONTROL METHOD OF INFORMATION PROCESSING APPARATUS

(75) Inventors: Katsutoshi Itoh, Tokyo (JP); Masanori Sato, Tokyo (JP); Shinji Takae, Tokyo (JP); Tadashi Ehara, Kanagawa (JP)

(73) Assignee: Sony Corporation, Tokyo (JP)

( * ) Notice: Subject to any disclaimer, the term of this patent is extended or adjusted under 35 U.S.C. 154(b) by 38 days.

(21) Appl. No.: 14/235,838

(22) PCT Filed: Jul. 2, 2012

(86) PCT No.: PCT/JP2012/066882
§ 371 (c)(1),
(2), (4) Date: Jan. 29, 2014

(87) PCT Pub. No.: WO2013/024638
PCT Pub. Date: Feb. 21, 2013

(65) Prior Publication Data
US 2014/0171077 A1 Jun. 19, 2014

(30) Foreign Application Priority Data
Aug. 12, 2011 (JP) ................. 2011-176658

(51) Int. Cl.
*H04W 4/00* (2018.01)
*H04M 1/66* (2006.01)
(Continued)

(52) U.S. Cl.
CPC ............... *H04W 8/04* (2013.01); *H04W 4/08* (2013.01); *H04W 12/0023* (2019.01);
(Continued)

(58) Field of Classification Search
CPC ....... H04W 4/003; H04W 4/005; H04W 4/08; H04W 8/04; H04W 8/18; H04W 8/20;
(Continued)

(56) References Cited

U.S. PATENT DOCUMENTS 7,639,943 B1 * 12/2009 Kalajan ......................... 396/429
2002/0013869 A1 * 1/2002 Taniguchi et al. .............. 710/33
(Continued)

FOREIGN PATENT DOCUMENTS

EP           2665246 A1    11/2013
JP          2002-073460     3/2002
(Continued)

OTHER PUBLICATIONS

3GPP TR 33.812 V9.2.0 (Jun. 2010) Technical Report.3rd Generation Partnership Project; Technical Specification Group Services and System Aspects; Feasibility study on the security aspects of remote provisioning and change of subscription for Machine to Machine (M2M) equipment (Release 9). Jun. 2010.
(Continued)

*Primary Examiner* — Rafael Pérez-Gutiérrez
*Assistant Examiner* — Mark G. Pannell
(74) *Attorney, Agent, or Firm* — Chip Law Group

(57) ABSTRACT

Provided is an information processing apparatus including a determination unit which determines whether a first wireless communication apparatus for which a connection right to connect to a predetermined network using wireless communication has not been set satisfies a predetermined condition for connecting to the network and performing predetermined communication processing. When the predetermined condition is satisfied, the first wireless communication apparatus performs the communication processing using the connection right set for the first wireless communication apparatus through transfer of the connection right from a second
(Continued)

wireless communication apparatus for which the connection right has been set to the first wireless communication apparatus.

17 Claims, 31 Drawing Sheets

(51) Int. Cl.
| | |
|---|---|
| H04M 1/68 | (2006.01) |
| H04M 3/16 | (2006.01) |
| H04M 3/42 | (2006.01) |
| H04W 8/04 | (2009.01) |
| H04W 48/18 | (2009.01) |
| H04W 4/08 | (2009.01) |
| H04W 12/08 | (2009.01) |
| H04W 12/00 | (2009.01) |
| H04W 4/70 | (2018.01) |

(52) U.S. Cl.
 CPC ........... *H04W 12/08* (2013.01); *H04W 48/18* (2013.01); *H04W 4/70* (2018.02); *H04W 12/00403* (2019.01)

(58) Field of Classification Search
 CPC ..... H04W 8/183; H04W 8/205; H04W 12/04; H04W 12/06; H04W 12/08; H04W 12/10; H04W 48/02; H04W 48/16; H04W 48/18; H04W 72/042; H04W 84/045
 USPC ........................... 455/411, 435.1, 435.2, 558
 See application file for complete search history.

(56) References Cited

U.S. PATENT DOCUMENTS

| | | | | |
|---|---|---|---|---|
| 2004/0046868 | A1* | 3/2004 | Anderson et al. | 348/207.11 |
| 2005/0266883 | A1 | 12/2005 | Chatrath | |
| 2006/0013197 | A1* | 1/2006 | Anderson | 370/352 |
| 2006/0161635 | A1* | 7/2006 | Lamkin et al. | 709/217 |
| 2007/0011704 | A1* | 1/2007 | Anglin, Jr. | H04N 7/17318 725/46 |
| 2007/0109586 | A1* | 5/2007 | Yamada | G06F 3/121 358/1.14 |
| 2007/0191057 | A1* | 8/2007 | Kamada | 455/558 |
| 2008/0096555 | A1 | 4/2008 | Herrmann | |
| 2008/0261561 | A1* | 10/2008 | Gehrmann | 455/411 |
| 2009/0322595 | A1* | 12/2009 | Mizukami | G01S 5/0027 342/357.22 |
| 2010/0273462 | A1* | 10/2010 | Thorn | H04W 8/26 455/414.1 |
| 2010/0277597 | A1* | 11/2010 | Vaysburg et al. | 348/207.1 |
| 2011/0078325 | A1* | 3/2011 | Vanover | H04L 63/10 709/232 |
| 2011/0258706 | A1* | 10/2011 | Rouse | G06F 21/10 726/28 |
| 2012/0047276 | A1* | 2/2012 | Lindquist et al. | 709/228 |
| 2013/0208703 | A1* | 8/2013 | Sugimoto et al. | 370/331 |
| 2013/0291071 | A1* | 10/2013 | Blom | H04L 9/0833 726/4 |
| 2014/0099951 | A1* | 4/2014 | Tsiatis et al. | 455/435.1 |
| 2014/0162622 | A1* | 6/2014 | Oda et al. | 455/419 |
| 2014/0171080 | A1* | 6/2014 | Takae et al. | 455/435.3 |

FOREIGN PATENT DOCUMENTS

| | | |
|---|---|---|
| JP | 2004-140641 A | 5/2004 |
| JP | 2008-011416 A | 1/2008 |
| JP | 2009-042933 A | 2/2009 |
| JP | 2009-152812 A | 7/2009 |
| JP | 2010-532107 | 9/2010 |
| JP | 2011-510571 | 3/2011 |
| WO | WO 2005/086519 A1 | 9/2005 |

OTHER PUBLICATIONS

No Author Listed, 3$^{rd}$ Generation Partnership Project; Technical Specification Group Services and System Aspects; Feasibility study on the security aspects of remote provisioning and change of subscription for Machine to Machine (M2M) equipment (Release 9), 3GPP Draft; 33812-920, (Jun. 2010), 87 pages.

Office Action for CN Patent Application No. 201280038408.7, dated Feb. 3, 2017, 11 pages of Office Action and 17 pages of English Translation.

\* cited by examiner

FIG. 1
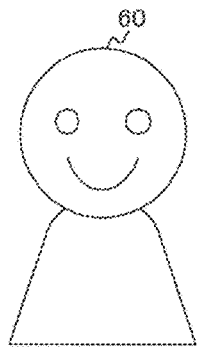
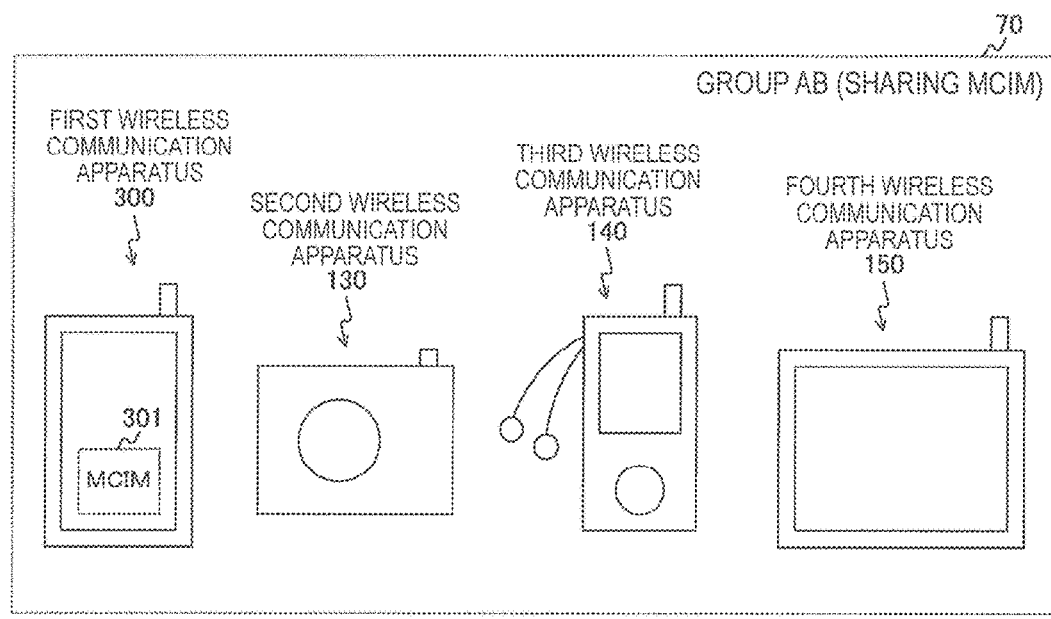
(a)
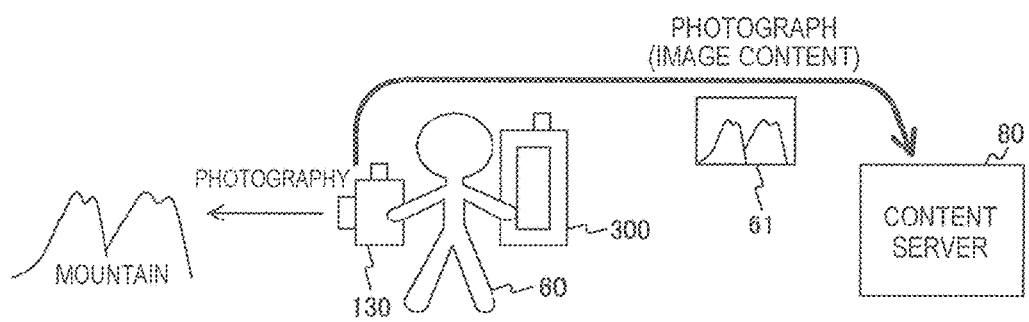
(b)

FIG. 2
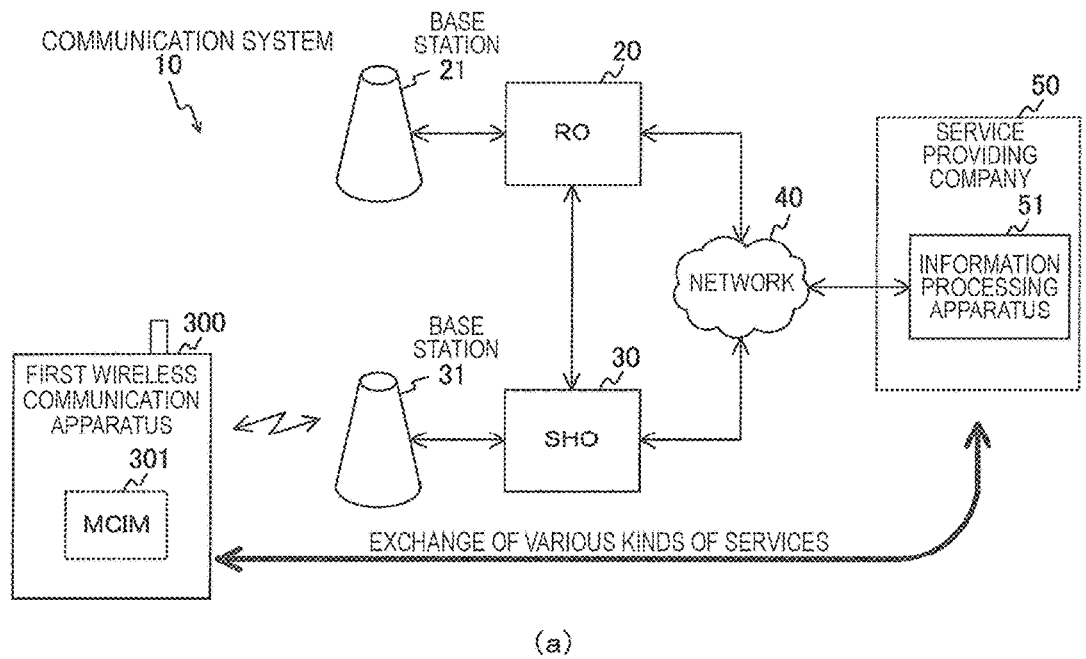
(a)
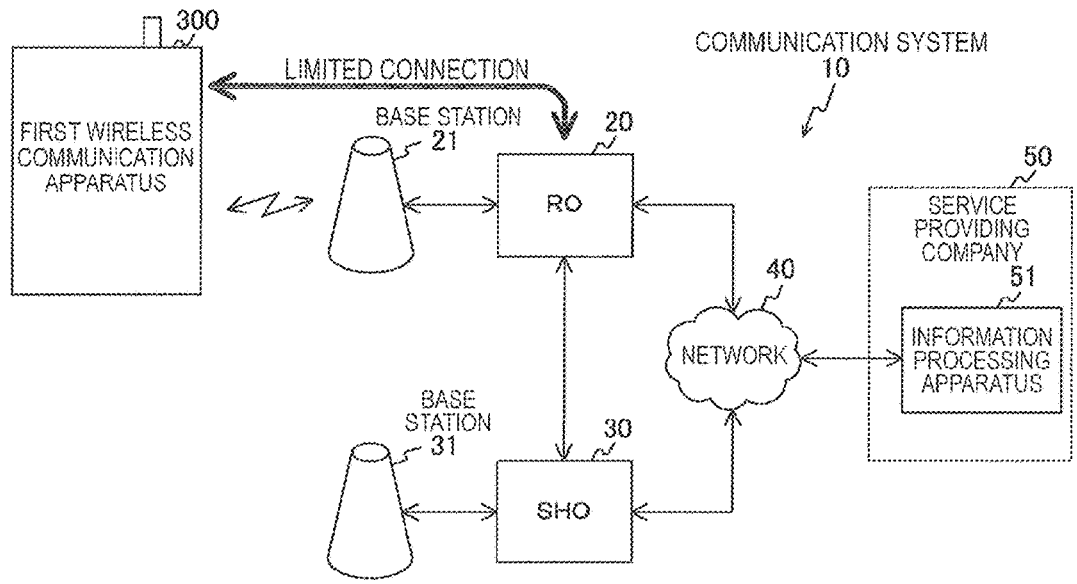
(b)

FIG. 4

GROUP MANAGEMENT DATABASE 220

| | GROUP NAME 221 | GROUP ID 222 | GROUP PASSWORD 223 | DEVICE NAME 224 | TERMINAL IDENTIFICATION INFORMATION 225 | VALID/INVALID INFORMATION 226 | RESERVATION RECEPTION TIME 227 | TIMING INFORMATION 228 |
|---|---|---|---|---|---|---|---|---|
| 1 | GROUP AB | 1234567 | poiuytr | MY MOBILE PHONE | PCID#1 | VALID | — | — |
| | | | | MR. CAMERA | PCID#2 | INVALID | — | — |
| | | | | MS. MUSIC | PCID#3 | INVALID | 2011/08/02 12:30 | WITHIN 12 HOURS |
| | | | | GRANDMA'S PHOTO | PCID#4 | INVALID | — | — |
| 2 | ... | ... | ... | ... | ... | ... | ... | ... |
| ... | ... | ... | ... | ... | ... | ... | ... | ... |
| M | ... | ... | ... | ... | ... | ... | ... | ... |

FIG. 7
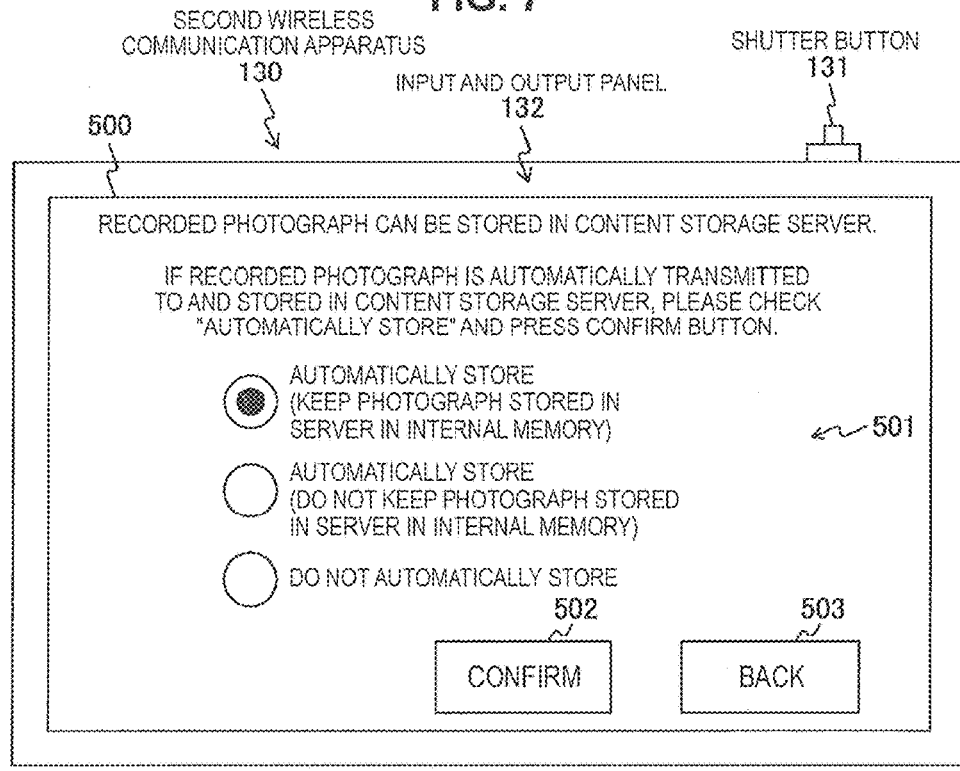
(a)
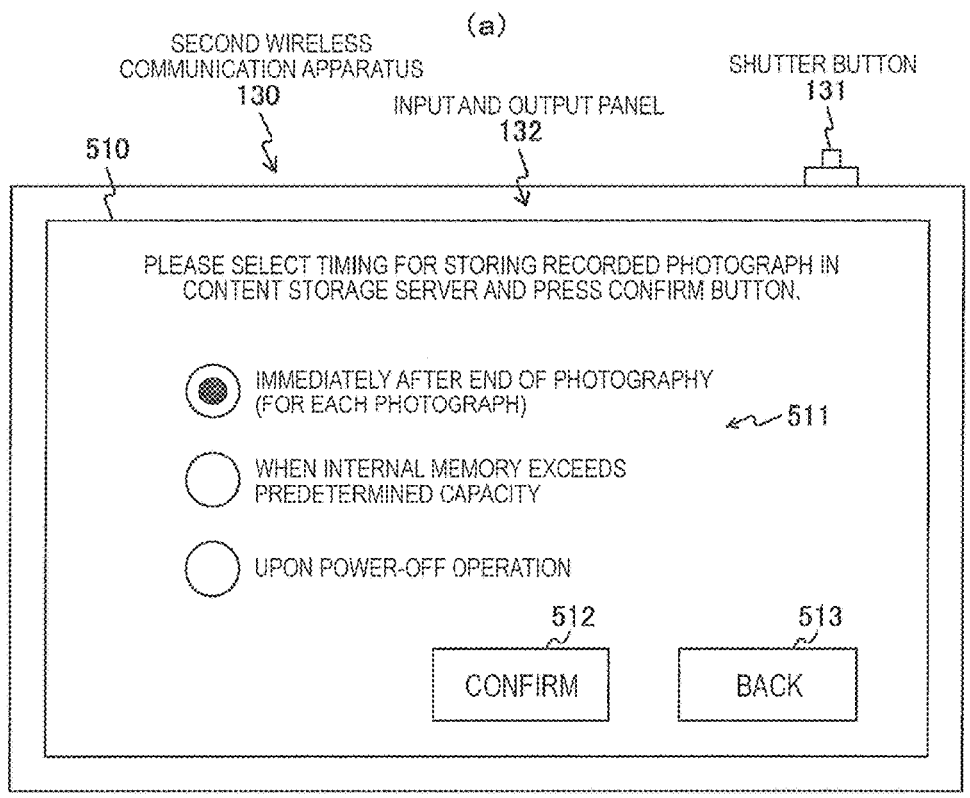
(b)

FIG. 8

PHOTOGRAPHY WITH SECOND WIRELESS COMMUNICATION APPARATUS
(FIRST WIRELESS COMMUNICATION APPARATUS HOLDS MCIM)

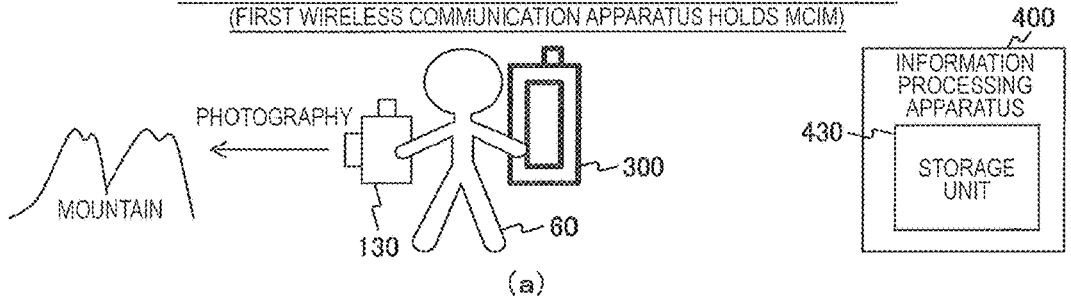

(a)

RIGHTS OF USING MCIM ARE TRANSFERRED FROM FIRST WIRELESS COMMUNICATION
APPARATUS TO SECOND WIRELESS COMMUNICATION APPARATUS

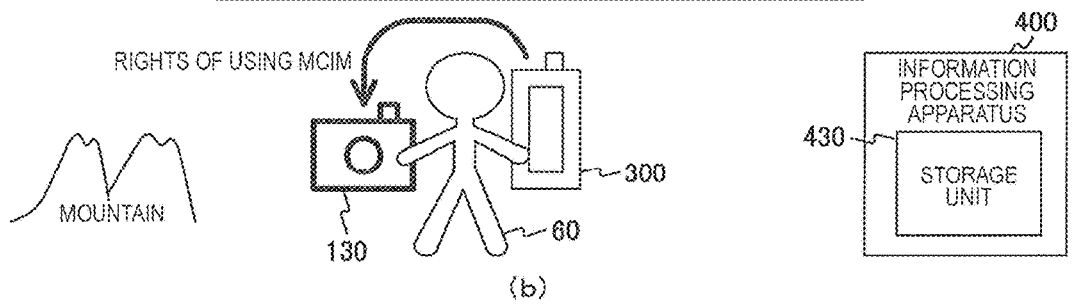

(b)

UPLOAD PHOTOGRAPH FROM SECOND WIRELESS COMMUNICATION
APPARATUS TO INFORMATION PROCESSING APPARATUS

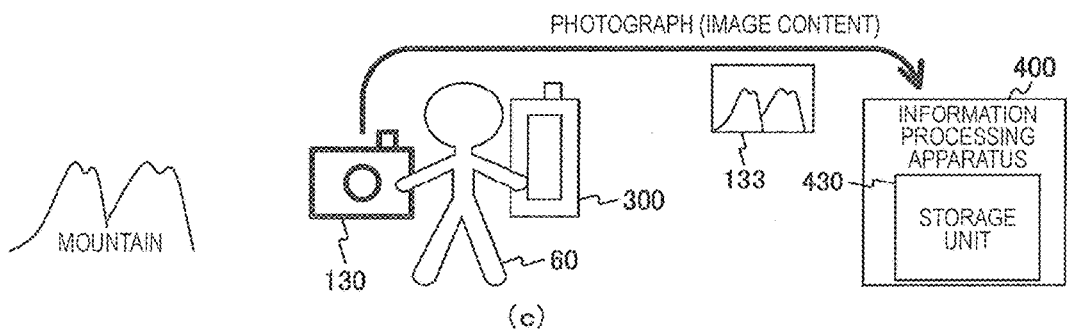

(c)

RIGHTS OF USING MCIM ARE TRANSFERRED FROM SECOND WIRELESS COMMUNICATION
APPARATUS TO FIRST WIRELESS COMMUNICATION APPARATUS (RESTORATION)

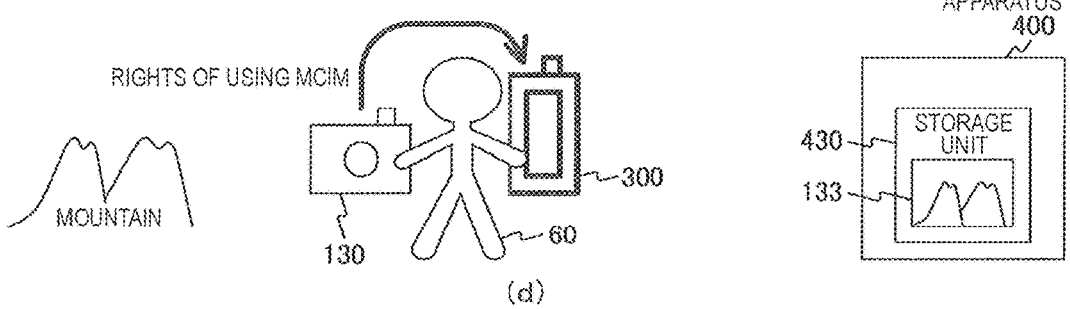

(d)

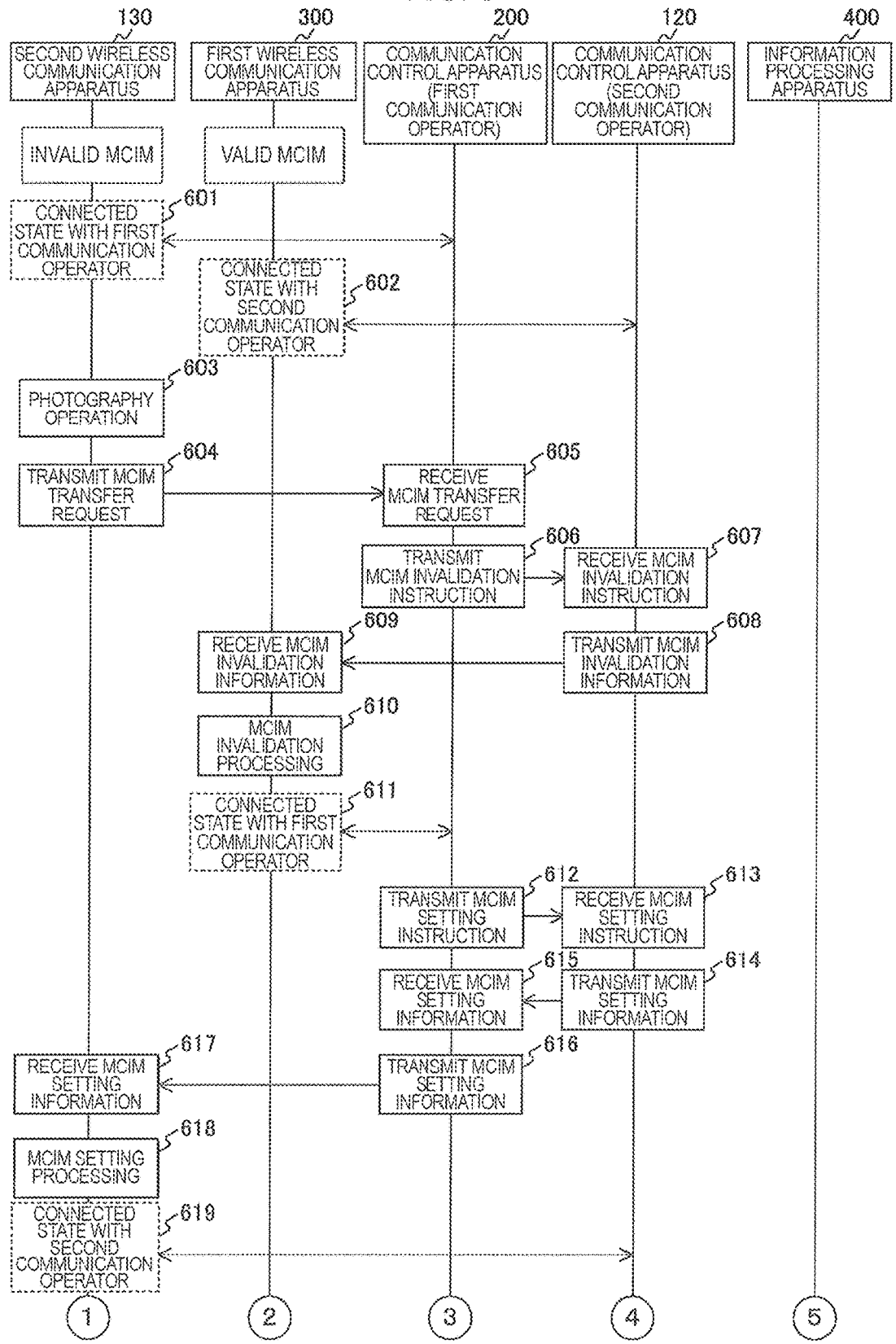

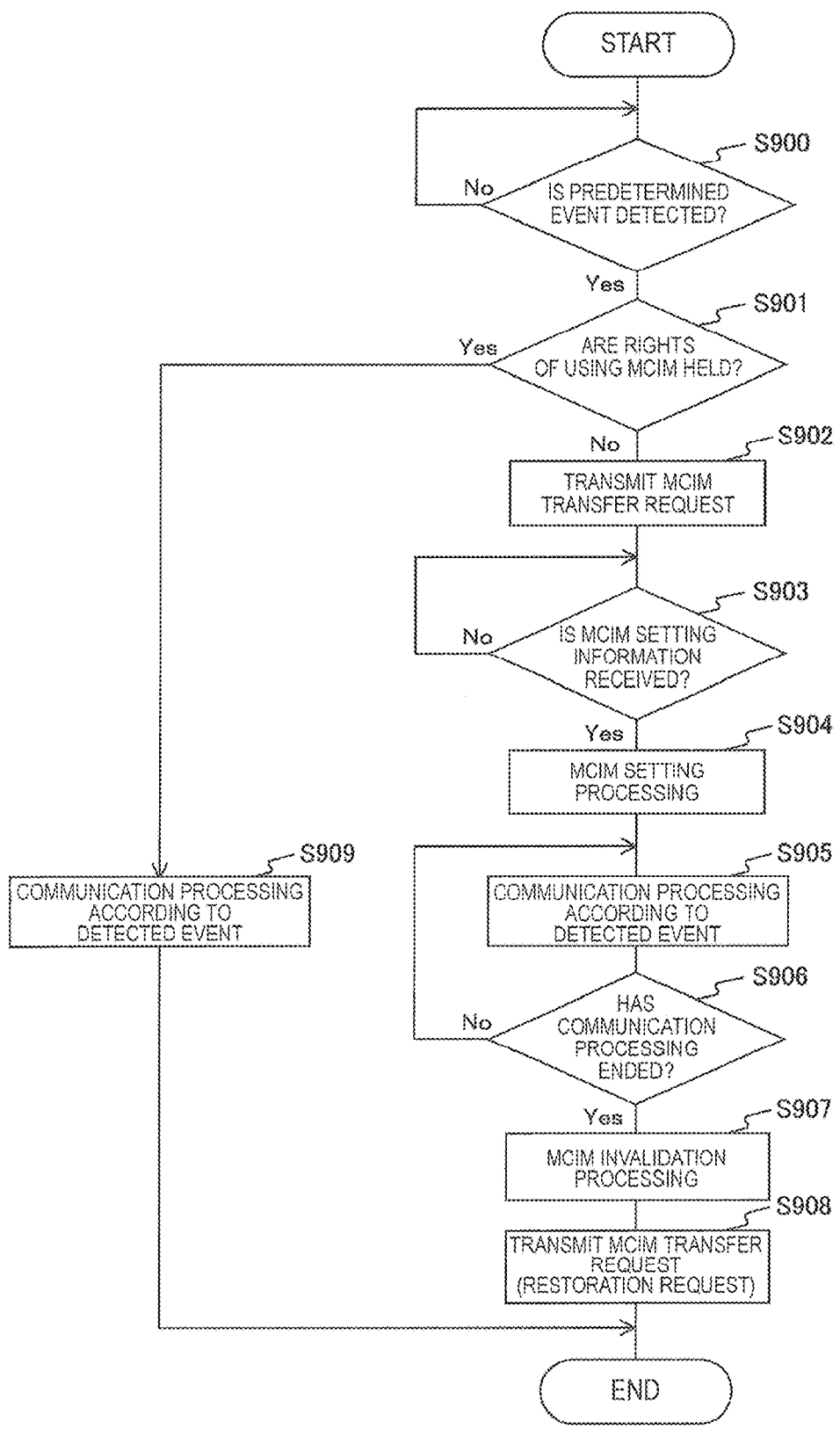

LIST OF WIRELESS COMMUNICATION APPARATUSES BELONGING TO GROUP AB.

PLEASE SELECT WIRELESS COMMUNICATION APPARATUS OF STORAGE LOCATION TO STORE PURCHASED MUSIC CONTENT AND PRESS CONFIRM BUTTON.

| 521 | 522 | 523 | 524 |
|---|---|---|---|
| STORAGE LOCATION | DEVICE NAME | TERMINAL IDENTIFICATION INFORMATION | MCIM VALID/INVALID |
| ○ | MY MOBILE PHONE | PCID#1 | VALID |
| ○ | MR. CAMERA | PCID#2 | INVALID |
| ● | MS. MUSIC | PCID#3 | INVALID |
| ○ | GRANDMA'S PHOTO | PCID#4 | INVALID |

525 CONFIRM   526 BACK

FIG. 28

SERVICE RESERVATION DATABASE
850

| | DESTINATION DEVICE INFORMATION 851 | CONNECTION TIME 852 | PURCHASE LIST 853 |
|---|---|---|---|
| 1 | PCID#3 | AM 03:00 | ○○MUSIC CONTENT <br> △△MUSIC CONTENT |
| 2 | ... | ... | ... |
| ⋮ | ⋮ | ⋮ | ⋮ |
| N | ... | ... | ... |

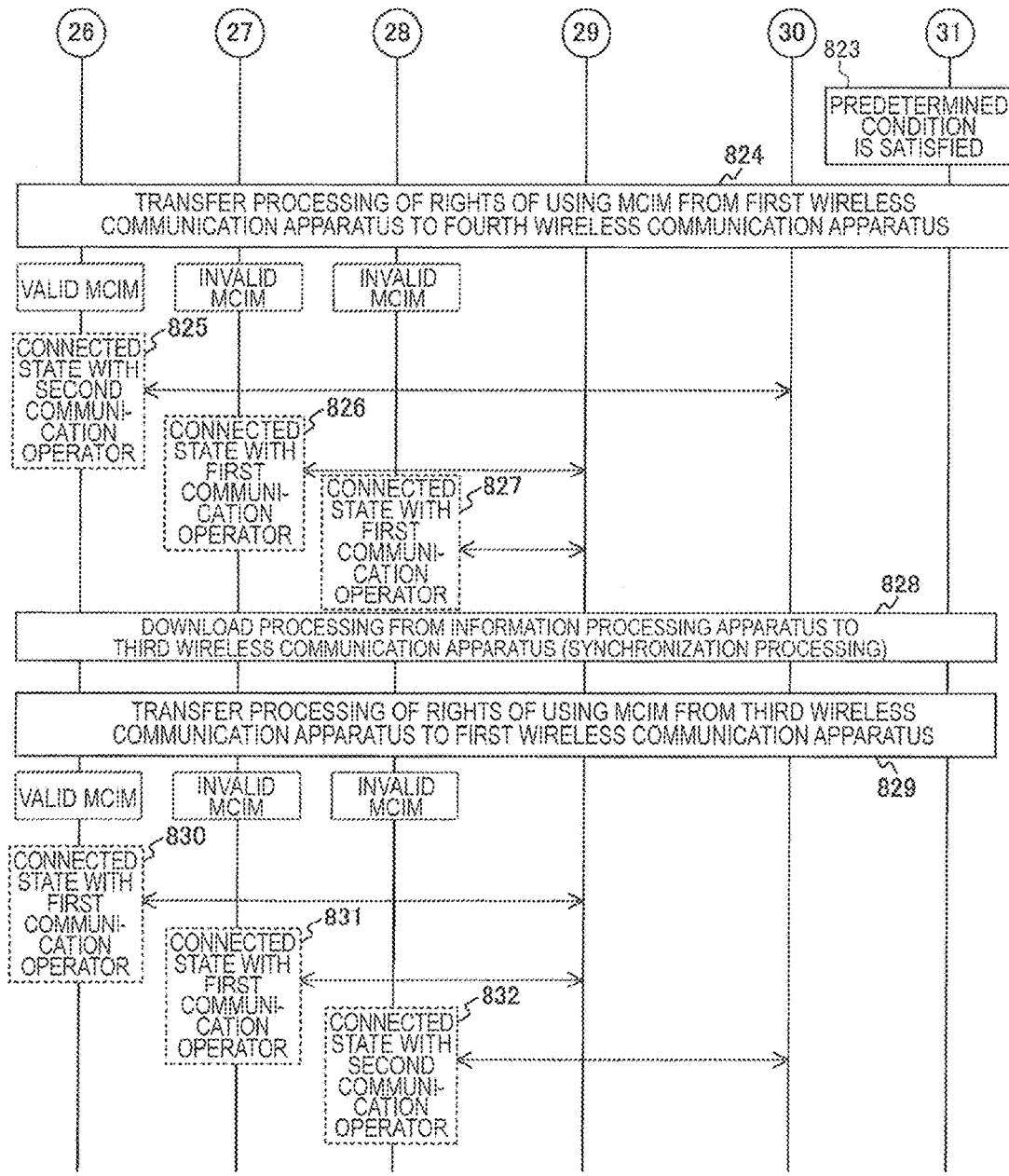

INFORMATION PROCESSING APPARATUS, COMMUNICATION SYSTEM AND CONTROL METHOD OF INFORMATION PROCESSING APPARATUS

TECHNICAL FIELD

The present technology relates to an information processing apparatus. More specifically, the present technology relates to an information processing apparatus connected to a network, a communication system including the apparatus, and a control method of a wireless communication apparatus.

BACKGROUND ART

Currently, 3GPP (3rd Generation Partnership Project) drawing up technical specifications of public wireless communication networks is working on a function extension (see, for example, Non-Patent Literature 1).

According to the function extension (called Machine to Machine Equipment), information indicating service availability can flexibly be used. The information indicating service availability is MCIM (Machine Communication Identity Module). For example, MCIM can be downloaded from a network, temporarily stopped, or restarted.

Currently, information corresponding to the MCIM needs to be stored in a physical device called an SIM (Subscriber Identity Module) card. However, by handling MCIM as software, the method of storing the MCIM can also be made flexible.

CITATION LIST

Non-Patent Literature

Non-Patent Literature 1: 3GPP TR 33.812 V9.2.0(2010-06)

SUMMARY OF INVENTION

Technical Problem

By using the above function extension, the method of using MCIM that is different from a conventional method can now be considered.

For example, when a user having a plurality of wireless communication apparatuses operates a desired wireless communication apparatus, if it is possible to easily receive a suitable communication service for the operation, it is convenient for the user.

It is desirable to receive a suitable communication service with ease.

Solution to Problem

The present technology is provided in order to solve the above-mentioned issues. According to a first aspect of the present technology, there are provided an information processing apparatus, a control method thereof, and a program for causing a computer to execute the method, the information processing apparatus including a determination unit which determines whether a first wireless communication apparatus for which a connection right to connect to a predetermined network using wireless communication has not been set satisfies a predetermined condition for connecting to the network and performing predetermined communication processing. When the predetermined condition is satisfied, the first wireless communication apparatus performs the communication processing using the connection right set for the first wireless communication apparatus through transfer of the connection right from a second wireless communication apparatus for which the connection right has been set to the first wireless communication apparatus. In this way, when a predetermined condition is satisfied, an effect in which a first wireless communication apparatus performs communication processing using connection rights set through transfer of connection rights from a second wireless communication apparatus to the first wireless communication apparatus is brought about.

According to the first aspect, the information processing apparatus may be the first wireless communication apparatus. The information processing apparatus may further include a control unit which makes a transfer request to transfer the connection right from the second wireless communication apparatus to the first wireless communication apparatus and performs control for performing the communication processing using the connection right set according to the transfer request when it is determined that the predetermined condition is satisfied in the first wireless communication apparatus. In this way, when it is determined that the predetermined condition is satisfied, an effect of making a transfer request to transfer connection rights from a second wireless communication apparatus to a first wireless communication apparatus, and performing communication processing using connection rights set according to the transfer request is brought about.

According to the first aspect, the information processing apparatus may be a content creation apparatus that creates content. The control unit may perform control for performing, as the communication processing, upload processing of uploading the created content to an information processing apparatus for storing the created content. In this way, an effect of performing upload processing as communication processing is brought about.

According to the first aspect, the determination unit may determine that the predetermined condition is satisfied at any timing among a timing at which the content is generated, a timing at which a capacity of the content stored in a storage unit exceeds a predetermined capacity, and a timing of power off or a fixed time after power off. In this way, an effect of determining at which timing among a timing when content is generated, a timing when the capacity of content stored in a storage unit exceeds a predetermined capacity, and a timing of power off or a fixed time after power off a predetermined condition is satisfied is brought about.

According to the first aspect, the control unit may make the transfer request to an RO (Registration Operator), and perform control for performing the communication processing using the connection right set according to the transfer request by an SHO (Selected Home Operator). In this way, an effect of making a transfer request to an RO and performing communication processing using connection rights set by an SHO according to the transfer request is brought about.

According to the first aspect, the information processing apparatus may be the second wireless communication apparatus. The information processing apparatus may further include a control unit which performs control for transferring the connection right from the second wireless communication apparatus to the first wireless communication apparatus when it is determined that the predetermined condition is satisfied in the second wireless communication apparatus. In this way, when it is determined that a predetermined condition is satisfied, an effect of controlling connection rights to be transferred from a second wireless communication apparatus to a first wireless communication apparatus is brought about.

According to the first aspect, the first wireless communication apparatus may be an information processing apparatus that handles content. The control unit may perform control for performing, as the communication processing, download processing of downloading the content from another information processing apparatus that handles the content to the first wireless communication apparatus. In this way, an effect of performing download processing as communication processing is brought about.

According to the first aspect, the information processing apparatus may further include a reception unit which receives a determination operation of determining a timing for performing the download processing. The control unit may perform control for performing the download processing at the determined timing. In this way, an effect of performing download processing at a determined timing is brought about.

According to the first aspect, a group that shares the connection right may include a plurality of wireless communication apparatuses including the information processing apparatus. The information processing apparatus may further include a reception unit which receives a determination operation of determining the first wireless communication apparatus to perform the download processing, from among the plurality of wireless communication apparatuses included in the group. In this way, an effect of determining a first wireless communication apparatus to be caused to perform download processing from among a plurality of wireless communication apparatuses included in a group is brought about.

According to the first aspect, identification information for identifying the respective wireless communication apparatuses included in the group may be stored in an RO that manages the group. The control unit may acquire the identification information from the RO, cause a display unit to display a selection screen for selecting the first wireless communication apparatus from among the plurality of wireless communication apparatuses included in the group based on the acquired identification information, and determine a wireless communication apparatus selected through a user operation in the selection screen as the first wireless communication apparatus. In this way, an effect of determining a wireless communication apparatus selected by a user operation in a selection screen as a first wireless communication apparatus is brought about.

According to the first aspect, the information processing apparatus may be an information processing apparatus that performs the communication processing between the information processing apparatus and the first wireless communication apparatus. The information processing apparatus may further include a control unit which makes a transfer request to transfer the connection right from the second wireless communication apparatus to the first wireless communication apparatus and performs control for performing the communication processing between the information processing apparatus and the first wireless communication apparatus using the connection right set for the first wireless communication apparatus according to the transfer request when it is determined that the predetermined condition is satisfied in the information processing apparatus. In this way, when it is determined that a predetermined condition is satisfied, an effect of making a transfer request to transfer connection rights from a second wireless communication apparatus to a first wireless communication apparatus, and performing communication processing with the first wireless communication apparatus using connection rights set according to the transfer request is brought about.

According to the first aspect, identification information for identifying a plurality of wireless communication apparatuses included in a group that is constituted of the wireless communication apparatuses including the information processing apparatus and shares the connection right may be stored in an RO that manages the group. The control unit may acquire the identification information from the RO, and perform control for transmitting the acquired identification information to the second wireless communication apparatus. In this way, an effect of transmitting identification information acquired from an RO to a second wireless communication apparatus is brought about.

According to the first aspect, the control unit may transmit the acquired identification information to the second wireless communication apparatus as information for causing a display unit of the second wireless communication apparatus to display a selection screen for selecting the first wireless communication apparatus from among the plurality of wireless communication apparatuses included in the group. In this way, an effect of causing a display unit of a second wireless communication apparatus to display a selection screen is brought about.

According to the first aspect, when a communication environment of the first wireless communication apparatus satisfies a given condition, or when a set period of time arrives, the determination unit may determine that the predetermined condition is satisfied. In this way, when a communication environment of a first wireless communication apparatus satisfies a fixed condition, or it is a set period of time, an effect of determining that the predetermined condition is satisfied is brought about.

According to the first aspect, the information processing apparatus may be an information processing apparatus that handles content. The control unit may perform control for performing, as the communication processing, upload processing of uploading the content from the first wireless communication apparatus or download processing of downloading the content to the first wireless communication apparatus. In this way, an effect of performing upload processing or download processing as communication processing is brought about.

According to the first aspect, when the communication processing using the connection right set through the transfer ends, the connection right may be transferred from the first wireless communication apparatus to the second wireless communication apparatus. In this way, when communication processing using connection rights set by a transfer ends, an effect of transferring connection rights from a first wireless communication apparatus to a second wireless communication apparatus is brought about.

According to the first aspect, the connection right may be a right to connect to a base station managed by a communication operator based on contract authentication information for connecting to the base station. In this way, an effect of using the rights as connection rights is brought about.

According to a second aspect of the present technology, there are provided a communication system, a control method therein, and a program for causing a computer to execute the method, the communication system including a first wireless communication apparatus for which a connection right to connect to a predetermined network using wireless communication has not been set, and a second wireless communication apparatus for which the connection right has been set. It is determined whether the first wireless communication apparatus satisfies a predetermined condition for connecting to the network and performing predetermined communication processing, and when the predetermined condition is satisfied, the first wireless communication apparatus performs the communication processing using the connection right set for the first wireless communication apparatus through transfer of the connection right from the second wireless communication apparatus to the first wireless communication apparatus. In this way, when a predetermined condition is satisfied, an effect in which a first wireless communication apparatus performs communication processing using connection rights set for the first wireless communication apparatus by transferring connection rights from a second wireless communication apparatus to the first wireless communication apparatus is brought about.

Advantageous Effects of Invention

According to the present technology, an excellent effect of easily receiving a suitable communication service can be accomplished.

BRIEF DESCRIPTION OF DRAWINGS

FIG. 1 is a diagram showing an example of using a plurality of wireless communication apparatuses (devices) according to a first embodiment of the present technology in a simplified manner.

FIG. 2 is a block diagram showing a system configuration example of a communication system 10 according to the first embodiment of the present technology.

FIG. 4 is a diagram schematically showing a group management database 220 according to the first embodiment of the present technology.

FIG. 7 is a diagram showing examples of a display screen displayed on a display unit 370 of a second wireless communication apparatus 130 according to the first embodiment of the present technology.

FIG. 8 is a diagram showing the flow of a case of storing image content generated by photography using the second wireless communication apparatus 130 in the information processing apparatus 400 according to the first embodiment of the present technology in a simplified manner.

FIG. 9 is a sequence chart showing the communication processing example between each apparatus included in the communication system 100 according to the first embodiment of the present technology.

FIG. 11 is a flow chart showing an example of a processing procedure for communication processing by a second wireless communication apparatus 130 according to the first embodiment of the present technology.

FIG. 12 is a diagram showing an example of a display screen (a storage location selection screen 520) displayed on a display unit 370 of a first wireless communication apparatus 300 according to a second embodiment of the present technology.

FIG. 28 is a diagram schematically showing a service reservation database 850 stored in the information processing apparatus 400 according to the third embodiment of the present technology.

FIG. 31 is a sequence chart showing a communication processing example between each apparatus included in the communication system 100 according to the fourth embodiment of the present technology.

DESCRIPTION OF EMBODIMENTS

Figure 3:
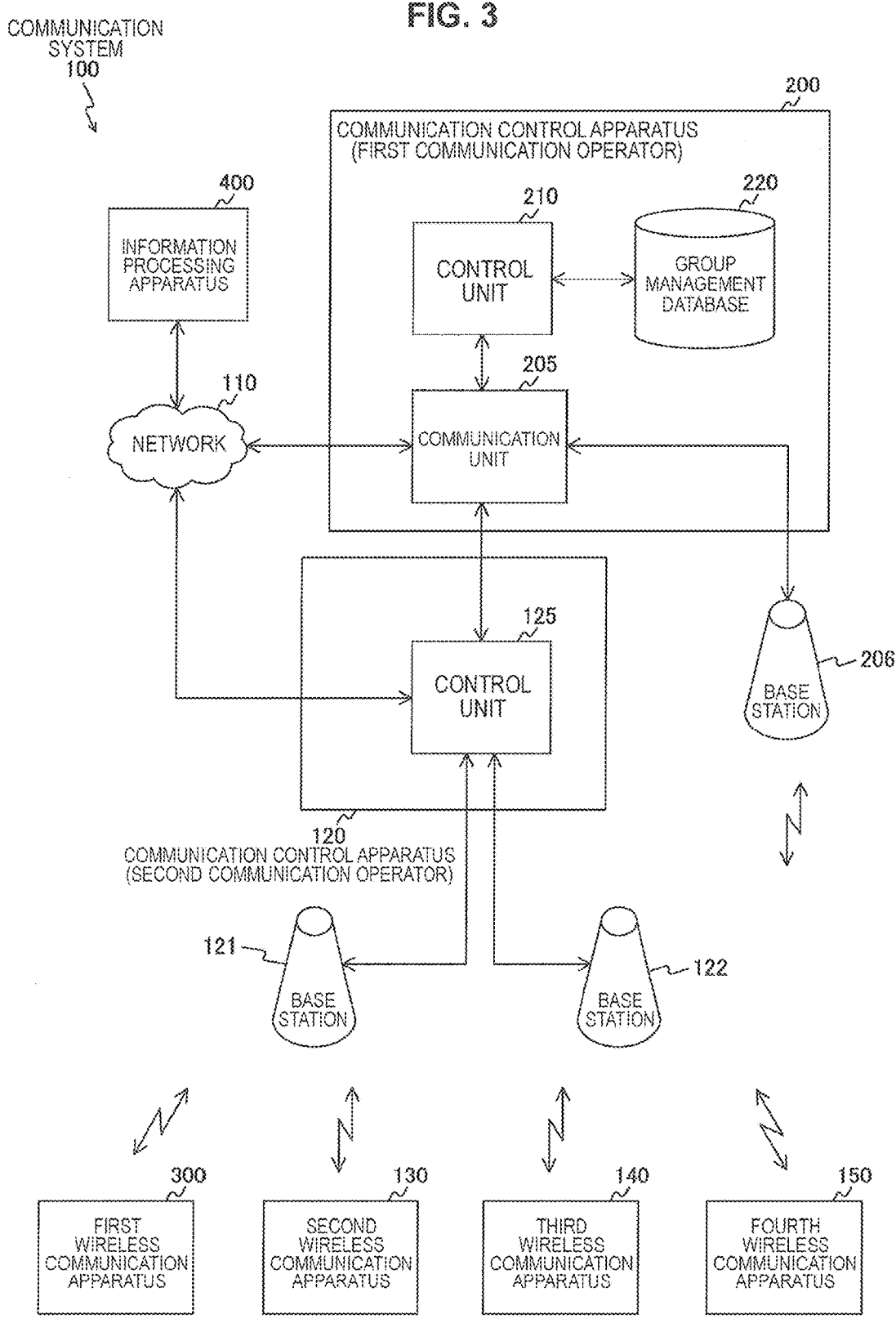
FIG. 3 is a block diagram showing a system configuration example of a communication system 100 according to the first embodiment of the present technology.

Hereinafter, modes for carrying out the present technology (hereinafter, referred to as embodiments) will be described. Description will be made in the following order.

1. First embodiment (communication control: an example of performing MCIM transfer processing according to a predetermined operation (for example, a photography operation) in a wireless communication apparatus that does not hold MCIM, and processing an upload and the like)

2. Second embodiment (communication control: an example of performing MCIM transfer processing according to a predetermined operation (for example, a content purchase operation) in a wireless communication apparatus that holds MCIM, and processing a download and the like)

3. Third embodiment (communication control: an example of performing MCIM transfer processing based on control of a network side, and processing a download and the like)

4. Fourth Embodiment (communication control: an example of exchanging content between a plurality of apparatuses)

<1. First Embodiment>
[Example of Using Wireless Communication Apparatuses]

FIG. 1 is a diagram showing an example of using a plurality of wireless communication apparatuses (devices) according to the first embodiment of the present technology in a simplified manner.

FIG. 1(a) shows four wireless communication apparatuses (a first wireless communication apparatus 300, a second wireless communication apparatus 130, a third wireless communication apparatus 140, and a fourth wireless communication apparatus 150) that a user 60 has.

The first wireless communication apparatus 300 is, for example, a mobile phone apparatus (for example, a smartphone having call functions and a data communication function). The second wireless communication apparatus 130 is, for example, an imaging apparatus having wireless communication functions (for example, a digital still camera and a digital video camera (a camera-integrated recorder)). The third wireless communication apparatus 140 is, for example, an audio output apparatus having wireless communication functions (for example, a portable music player). The fourth wireless communication apparatus 150 is, for example, a display apparatus having wireless communication functions (for example, a digital photo frame). These wireless communication apparatuses are examples of wireless communication apparatuses capable of using a software-downloadable SIM (Subscriber Identity Module). Also, these wireless communication apparatuses can be applied to other wireless communication apparatuses capable of using a software-downloadable SIM (for example, an e-book display apparatus having wireless communication functions). Also, these wireless communication apparatuses can be applied to an information processing apparatus that can perform wireless communication when wireless communication equipment (for example, a personal computer that does not have wireless communication functions) is installed. Here, the first wireless communication apparatus 300, the second wireless communication apparatus 130, the third wireless communication apparatus 140, and the fourth wireless communication apparatus 150 are examples of information processing apparatuses described in claims.

These four wireless communication apparatuses are assumed to belong to a group that shares connection rights to connect to a predetermined network (group name: group AB). These connection rights can be understood as, for example, rights of using MCIM (Machine Communication Identity Module).

Here, MCIM is an example of contract authentication information, and contract authentication information is information including telephone subscriber information and information on an authentication key (authentication). MCIM is, for example, contract authentication information (a so-called soft SIM) that is not limited to a specific communication operator (a mobile phone operator) upon purchase of a device, and in which a communication operator can be flexibly set after the purchase. Rewriting of MCIM on a network facilitates separation between sales of mobile phones and selection of communication operators, and also facilitates sharing of subscriber authentication information between a plurality of wireless communication apparatuses. A case of not holding rights of using MCIM implies, for example, a case of not holding the MCIM itself, or a case of only holding MCIM invalidated by MCIM invalidation processing.

FIG. 1(b) shows a case of performing photography using the second wireless communication apparatus 130 in a simplified manner.

Here, it is assumed that the second wireless communication apparatus (for example, a camera) relatively seldom connects to a network such as the Internet or the like and performs communication processing. For this reason, the second wireless communication apparatus (for example, a camera) does not have to be connected to a network such as the Internet or the like at all times. For example, in the case of performing photography in an event such as an athletic event or the like, the second wireless communication apparatus (for example, a camera) is assumed to be connected to a network such as the Internet or the like to upload the photograph to a content server 80.

In other words, a device such as the second wireless communication apparatus (for example, a camera) can be frequently managed to be kept in a limited connection state at normal times and temporarily use rights of using MCIM according to need.

Here, the rights of using MCIM are assumed to be held in the first wireless communication apparatus 300 because, for example, the user 60 frequently uses the first wireless communication apparatus 300 at normal times. For this reason, when communication processing is performed in another wireless communication apparatus, the rights of using MCIM are assumed to be transferred by a manual operation of the user 60.

Here, a case of performing photography using the second wireless communication apparatus 130, and uploading a photograph (image content 61) recorded by the photography to the content server 80 using wireless communication is assumed, for example, as shown in FIG. 1(*b*).

In this case, for example, the user 60 performs photography using the second wireless communication apparatus 130, and then performs a transfer operation of transferring the rights of using MCIM from the first wireless communication apparatus 300 to the second wireless communication apparatus 130, thereby performing MCIM transfer processing. In this way, after the rights of using MCIM are transferred to the second wireless communication apparatus 130, the second wireless communication apparatus 130 uploads the photograph (image content 61) recorded by the photography to the content server 80 on a network. Also, since the user 60 frequently uses the first wireless communication apparatus 300 at normal times, it is necessary to return the rights of using MCIM to the first wireless communication apparatus 300 by a manual operation.

In this way, when an upload (communication processing) of a photograph (image content) is performed every time photography is performed using, for example, the second wireless communication apparatus 130, it is necessary to perform a transfer operation of the rights of using MCIM every time photography is performed. In other words, when communication processing is performed by each wireless communication apparatus, it is necessary to perform a transfer operation for transferring the rights of using MCIM to the wireless communication apparatus that performs the communication processing, and the transfer operation becomes complicated.

Accordingly, the first embodiment of the present technology shows an example of easily performing transfer processing of MCIM when usage rights of the MCIM are shared among a plurality of wireless communication apparatuses.

[Configuration Example of Communication System]

FIG. 2 is a block diagram showing a system configuration example of a communication system 10 according to the first embodiment of the present technology. FIG. 2 shows a configuration example of a communication system on the premise of a network configuration including an SHO (Selected Home Operator) and an RO (Registration Operator) (for example, see Non-Patent Literature 1)

FIG. 2(*a*) shows a wireless communication example of a case in which the first wireless communication apparatus 300 holds valid MCIM (rights of using MCIM) 301. Also, FIG. 2(*b*) shows a wireless communication example of a case in which the first wireless communication apparatus 300 does not hold valid MCIM (rights of using MCIM) 301.

The communication system 10 includes an RO 20, an SHO 30, base stations 21 and 31, a network 40, an information processing apparatus 51, and the first wireless communication apparatus 300.

Here, an RO and an SHO indicate logical roles, and may be assumed to be operated by different operators, or may be assumed to be operated by the same operator. Also, it is assumed that there are a plurality of each of ROs and SHOs. Further, each of an RO and an SHO may be integrally constituted as an information processing apparatus, or may be constituted of a plurality of apparatuses. Here, RO and SHO denote relative roles when a wireless communication apparatus having valid MCIM is regarded as a reference. For this reason, an equivalent of an RO for one wireless communication apparatus also has the possibility to be equivalent to an SHO for another wireless communication apparatus.

As shown in FIG. 2(*a*), when the first wireless communication apparatus 300 holds valid MCIM (rights of using MCIM) 301, the first wireless communication apparatus 300 is able to connect to the SHO 30 via the base station 31 based on the MCIM 301. On the other hand, when the first wireless communication apparatus 300 does not hold the valid MCIM (rights of using MCIM) 301 as shown in FIG. 2(*b*), the first wireless communication apparatus 300 is not able to connect to the SHO 30. However, in this case, the first wireless communication apparatus 300 is able to connect to the RO 20 via the base station 21 based on provisional connectivity identity (PCID).

Here, PCID is an identifier (for example, terminal identification information 225 on a network shown in FIG. 4) for connecting to an RO, and is given to a wireless communication apparatus (device) having the mechanism of a software-downloadable SIM.

The network 40 is a network such as a telephone network, the Internet, or the like (for example, public network). Also, the network 40 and the SHO 30 are connected via a gateway (not shown). Likewise, the network 40 and the RO 20 are connected via a gateway (not shown).

The RO 20 is a communication control apparatus that is managed by a wireless operator providing service such as initial connection registration and the like. The RO 20 corresponds to, for example, a wireless operator providing a wireless connection service (for example, a mobile phone operator). Also, the RO 20 includes a control unit (not shown).

The control unit of the RO 20 performs authentication control of a wireless communication apparatus connected via the base station 21. For example, the control unit of the RO 20 performs authentication based on PCID for a wireless communication apparatus connected via the base station 21. Then, the RO 20 provides service such as initial connection registration and the like to an authenticated wireless communication apparatus. Also, the control unit of the RO 20 is connected to the SHO 30 and exchanges various kinds of information with the SHO 30.

The base station 21 is a mobile communication base station (NodeB) that connects the first wireless communication apparatus 300 and the RO 20 via a wireless line.

The SHO 30 is a communication control apparatus that is managed by a wireless operator providing a wireless connection service. The SHO 30 provides Internet services and the like, and corresponds to a wireless operator providing a wireless connection service (for example, a mobile phone operator). Also, the SHO 30 includes a control unit (not shown).

The control unit of the SHO 30 performs authentication control of a wireless communication apparatus connected via the base station 31. For example, the control unit of the SHO 30 authenticates a wireless communication apparatus holding valid MCIM (contract authentication information) of the SHO 30 among wireless communication apparatuses connected via the base station 31. Then, the SHO 30 connects the authenticated wireless communication apparatus to the network 40 via the gateway (not shown).

Also, the control unit of the SHO 30 is connected to the RO 20 and exchanges various kinds of information with the RO 20. Here, a wireless communication apparatus that does not hold valid MCIM (contract authentication information) can connect (limited connection) to the RO 20 via the SHO 30 based on PCID of the wireless communication apparatus.

The base station 31 is a mobile communication base station (NodeB) that connects the first wireless communication apparatus 300 and the SHO 30 via a wireless line.

A service providing company 50 is a company that provides various kinds of communication services (SP (Service Provider)), such as content delivery services, content distribution services, and the like, and has the information processing apparatus 51 for providing these communication services. The information processing apparatus 51 is also connected to the RO 20 and the SHO 30 via the network 40. Here, an operator performing various kinds of communication services is assumed to be a communication operator providing a wireless connection service, a MVNO (Mobile Virtual Network Operator) (an operator of a business model known as a virtual communication operator), or the like.

The information processing apparatus 51 is an information processing apparatus providing various kinds of communication services via the network 40, and provides the various kinds of communication services to the first wireless communication apparatus 300 using wireless communication. For example, the information processing apparatus 51 provides communication services such as web services, data download services, data upload services, online gaming, and the like.

For example, as shown in FIG. 2(*a*), when the first wireless communication apparatus 300 has the valid MCIM 301, the first wireless communication apparatus 300 is connected to the base station 31 via the wireless line based on the MCIM 301, and is connected to the SHO 30 via the base station 31. In this case, the first wireless communication apparatus 300 is connected to the SHO 30 via the base station 31, and can be provided with various kinds of services (for example, content download) from the information processing apparatus 51. Also, when the first wireless communication apparatus 300 holding the valid MCIM 301 connects to the RO 20, the first wireless communication apparatus 300 is connected to the RO 20 via the SHO 30.

As shown in FIG. 2(*b*), when the first wireless communication apparatus 300 does not hold the valid MCIM 301, the first wireless communication apparatus 300 can connect (limited connection) to the RO 20 via the base station 21 based on held PCID. In this case, the first wireless communication apparatus 300 is connected (limited connection) to the RO 20 via the base station 21 but can only perform limited communication (for example, MCIM download and MCIM validation/invalidation).

When the first wireless communication apparatus 300 does not hold the valid MCIM 301, the first wireless communication apparatus 300 can connect to any of the base stations 21 and 31 according to a position at which the first wireless communication apparatus 300 is being used, and is connected to the RO 20 via these base stations.

In this way, the first wireless communication apparatus 300 not holding the valid MCIM 301 is not able to be provided with various kinds of services by the information processing apparatus 51. In other words, a wireless communication apparatus having no rights of using MCIM can be understood as a device (RO connected device) connected to limited services. On the other hand, a wireless communication apparatus holding rights of using MCIM can be understood as a device (SHO connected device) connected to services (normal connection). A wireless communication apparatus not holding rights of using MCIM can connect to the SHO 30 by acquiring rights of using MCIM via the RO 20 (for example, MCIM download or MCIM validation). This is the same for the second wireless communication apparatus 130, the third wireless communication apparatus 140, and the fourth wireless communication apparatus 150 as well.

[Configuration Example of the Communication System]

FIG. 3 is a block diagram showing a system configuration example of the communication system 100 according to the first embodiment of the present technology.

The communication system 100 includes a network 110, base stations 121, 122, and 206, the first wireless communication apparatus 300, the second wireless communication apparatus 130, the third wireless communication apparatus 140, and the fourth wireless communication apparatus 150. Also, the communication system 100 includes a communication control apparatus (second communication operator) 120, a communication control apparatus (first communication operator) 200, and an information processing apparatus 400.

Here, the communication system 100 is a system corresponding to the communication system 10 shown in FIG. 2. Specifically, the communication control apparatus (second communication operator) 120 corresponds to the SHO 30 shown in FIG. 2, the communication control apparatus (first communication operator) 200 corresponds to the RO 20 shown in FIG. 2, and the information processing apparatus 400 corresponds to the information processing apparatus 51 shown in FIG. 2. For this reason, in this example, description of parts that are common to the example and the communication system 10 shown in FIG. 2 will be partially omitted.

The network 110 is a network such as a telephone network, the Internet, or the like (for example, a public network). Also, the network 110 and the communication control apparatus (second communication operator) 120 are connected via a gateway (not shown). Likewise, the network 110 and the communication control apparatus (first communication operator) 200 are connected via a gateway (not shown).

The communication control apparatus (second communication operator) 120 is a communication control apparatus managed by a wireless operator that provides a wireless connection service, and corresponds to the SHO 30 shown in FIG. 2. In other words, the communication control apparatus (second communication operator) 120 provides Internet services and the like, and corresponds to a wireless operator that provides a wireless connection service (for example, a mobile phone operator). Also, the communication control apparatus 120 includes a control unit 125.

The control unit 125 performs authentication control of wireless communication apparatuses connected via the base stations 121 and 122. For example, the control unit 125 authenticates a wireless communication apparatus holding valid MCIM (contract authentication information) of the communication control apparatus (second communication operator) among wireless communication apparatuses connected via the base stations 121 and 122. Then, the communication control apparatus 120 connects the authenticated wireless communication apparatus to the network 110 via the gateway (not shown).

Also, the control unit 125 is connected to the communication control apparatus (first communication operator) 200 and exchanges various kinds of information with the communication control apparatus (first communication operator) 200. Here, a wireless communication apparatus that does not hold valid MCIM (contract authentication information) can connect (limited connection) to the communication control apparatus (first communication operator) 200 via the communication control apparatus (second communication operator) 120 based on PCID of the wireless communication apparatus. Also, when an MCIM transfer request is received from a wireless communication apparatus, the control unit 125 transmits the transfer request to the communication control apparatus (first communication operator) 200.

The base stations 121 and 122 are mobile communication base stations (NodeB) that connect the first wireless communication apparatus 300, the second wireless communication apparatus 130, the third wireless communication apparatus 140, and the fourth wireless communication apparatus 150 with the communication control apparatus (second communication operator) 120 via a wireless line.

In the communication system 100, for example, a wireless communication apparatus holding valid MCIM is connected to the base stations 121 and 122 via a wireless line, and connected to the communication control apparatus (second communication operator) 120 via the base stations 121 and 122. Also, when a wireless communication apparatus holding valid MCIM is connected to the communication control apparatus (first communication operator) 200, the wireless communication apparatus is connected to the communication control apparatus (first communication operator) 200 via the communication control apparatus (second communication operator).

Also, a wireless communication apparatus not holding valid MCIM can connect (limited connection) to the communication control apparatus (first communication operator) 200 via the base station 206 based on PCID of the wireless communication apparatus. A wireless communication apparatus not holding valid MCIM can connect to any of the base stations 121, 122, and 206 according to a position at which the wireless communication apparatus is being used, and is connected to the communication control apparatus (first communication operator) 200 via these base stations.

The communication control apparatus (first communication operator) 200 is a communication control apparatus managed by a wireless operator that provides service such as initial connection registration and the like, and corresponds to the RO 20 shown in FIG. 2. The communication control apparatus (first communication operator) 200 corresponds to, for example, a wireless operator that provides a wireless connection service (for example, a mobile phone operator). Also, the communication control apparatus (first communication operator) 200 includes a communication unit 205, a control unit 210, and a group management database 220.

The communication unit 205 performs transmission and reception of various kinds of information based on control of the control unit 210. The communication unit 205 is connected to, for example, the communication control apparatus (second communication operator) 120 and the base station 206, and performs transmission and reception of various kinds of information between respective wireless communication apparatuses connected via these.

The control unit 210 performs various kinds of control relating to the wireless communication apparatus connected via the communication unit 205 (or the communication unit 205 and the communication control apparatus (second communication operator) 120). For example, the control unit 210 acquires information (group information) relating to a group including a plurality of wireless communication apparatuses that share rights of using MCIM from the group management database 220. Then, the control unit 210 supplies the group information to the wireless communication apparatuses via the communication unit 205 and the communication control apparatus (second communication operator) 120.

By transferring the rights of using MCIM (the right to use the MCIM) between a plurality of wireless communication apparatuses, the MCIM can be shared among the plurality of wireless communication apparatuses. In this case, the plurality of wireless communication apparatuses relating to this sharing can be set as one group. This group can be managed by the group management database 220.

This group is a group sharing connection rights (network connection rights). The connection rights are rights to connect to a predetermined network (for example, the network 110) using wireless communication, and correspond to, for example, rights of using MCIM. In other words, connection rights are rights to connect to a base station operated by a communication operator based on MCIM (contract authentication information) for connecting to the base station. Also, for example, the presence/absence of connection rights corresponds to the presence/absence of rights of using MCIM.

The group management database 220 is a database to manage a group including a plurality of wireless communication apparatuses sharing MCIM. The group management database 220 will be described in detail with reference to FIG. 4.

Here, an example of transferring rights of using MCIM (example of transfer of network connection rights) in the communication system 100 will be described. For example, MCIM is caused to be held in each wireless communication apparatus. Then, based on an instruction from the control unit 210, the communication control apparatus (second communication operator) 120 performs validation/invalidation of the MCIM held in each wireless communication apparatus, and thereby can transfer the rights of using the MCIM. Validation/invalidation of the MCIM held in the wireless communication apparatuses can also be performed on the side of the communication control apparatus (first communication operator) 200. For this reason, the rights of using the MCIM may be transferred by the control unit 210 performing validation/invalidation of the MCIM held in each wireless communication apparatus.

Also, rights of using the MCIM may be transferred by transferring the MCIM itself instead of causing the MCIM to be held in each wireless communication apparatus. For example, a case of transferring the rights of using the MCIM from the first wireless communication apparatus 300 to the second wireless communication apparatus 130 is assumed. For example, an MCIM transfer request is transmitted from the first wireless communication apparatus 300 to the control unit 210. In this case, the MCIM held in the first wireless communication apparatus 300 is invalidated (erased) by the communication control apparatus (second communication operator) 120 based on an instruction from the control unit 210. Also, setting information (including the MCIM) is transmitted from the communication control apparatus (second communication operator) 120 to the second wireless communication apparatus 130 via the control unit 210. By holding the MCIM included in the setting information in the second wireless communication apparatus 130, valid MCIM is set in the second wireless communication apparatus 130. Here, transmission of the setting information (including MCIM) to each wireless communication apparatus can also be performed on the side of the communication control apparatus (first communication operator) 200. For this reason, the rights of using the MCIM may be transferred by the control unit 210 transmitting the setting information (including the MCIM) to each wireless communication apparatus.

The information processing apparatus 400 is an information processing apparatus providing various kinds of communication services via the network 110 (for example, a content server), and provides the various kinds of communication services to each wireless communication apparatus using wireless communication. These various kinds of communication services will be described in detail with reference to FIG. 8 to FIG. 10 and the like.

In this way, the communication system 100 is a wireless communication system having wireless communication apparatuses (devices) regarding which contract authentication information can be rewritten via a network. Also, the communication system 100 is a wireless communication system in which contract authentication information can be shared among a plurality of wireless communication apparatuses (devices), and connection rights can be automatically assigned to a suitable wireless communication apparatus (device) for a request of an application or the like.

[Configuration Example of the Group Management Database]

FIG. 4 is a diagram schematically showing the group management database 220 according to the first embodiment of the present technology.

FIG. 4 shows a case when the first wireless communication apparatus 300, the second wireless communication apparatus 130, the third wireless communication apparatus 140 and the fourth wireless communication apparatus 150 are registered with the group AB.

In the group management database 220, a group name 221, a group ID 222, a group password 223, a device name 224, terminal identification information 225, and valid/invalid information 226 are stored in association with each other in group units. Likewise, in the group management database 220, a reservation reception time 227 and timing information 228 are stored in association with each other in group units. These pieces of information are updated in sequence by the control unit 210 based on, for example, each request (a group addition request and a group deletion request) from each wireless communication apparatus.

In the group name 221, a name given to a group is stored. This name is stored, for example, upon creation of the group.

In the group ID 222, an ID given to the group is stored. Also, in the group password 223, a password given to the group is stored. Using the ID and the password, for example, a group addition request to add a new wireless communication apparatus to the group is made. Also, each wireless communication apparatus belonging to the group may store the ID and the password given to the group (for example, stored in a memory 340 shown in FIG. 5). Otherwise, the ID and the password may be input by a user each time without being stored in the wireless communication apparatus.

The name given to a wireless communication apparatus is stored in the device name 224. The name is stored, for example, during additional registration with a group of the wireless communication apparatus.

The terminal identification number of a wireless communication apparatus is stored in the terminal identification information 225. The terminal identification information is identification information to identify the wireless communication apparatus and, for example, PCID is stored therein. In FIG. 4, "PCID#1" of the terminal identification information 225 is assumed to correspond to the first wireless communication apparatus 300. Similarly, it is assumed that "PCID#2" of the terminal identification information 225 corresponds to the second wireless communication apparatus 130, the "PCID#3" of the terminal identification information 225 corresponds to the third wireless communication apparatus 140, and the "PCID#4" of the terminal identification information 225 corresponds to the third wireless communication apparatus 150.

Information indicating whether MCIM in a wireless communication apparatus is valid or invalid (or not holding MCIM) is stored in the valid/invalid information 226. To make the description easier, "Valid" is shown in a wireless communication apparatus in which MCIM is valid and "Invalid" is shown in a wireless communication apparatus in which MCIM is invalid in FIG. 4.

The reservation reception time 227 and the timing information 228 will be described in detail in a third embodiment of the present technology.

In this way, in the group management database 220, a group including a plurality of wireless communication apparatuses sharing MCIM is managed. In the first embodiment of the present technology, description will be made assuming that MCIM transfer processing is performed between wireless communication apparatuses belonging to the same group.

Here, an example of adding a new wireless communication apparatus to a group including a plurality of wireless communication apparatuses sharing MCIM will be described. For example, by performing an additional registration operation in the new wireless communication apparatus that is an addition target, it is possible to additionally register the new wireless communication apparatus with the group. In this case, the new wireless communication apparatus may be registered with the group on the condition that an approval operation of the additional registration has been performed in one or a plurality of wireless communication devices (registered with the group) other than the new wireless communication apparatus.

For convenience of description, an embodiment of the present technology shows an example in which one piece of MCIM is shared by a group including a plurality of wireless communication apparatuses. However, the embodiment of the present technology can be likewise applied to a case in which N pieces of MCIM are shared by a group including M wireless communication apparatuses (M>N).

[Configuration Example of Wireless Communication Apparatus]

Figure 5:
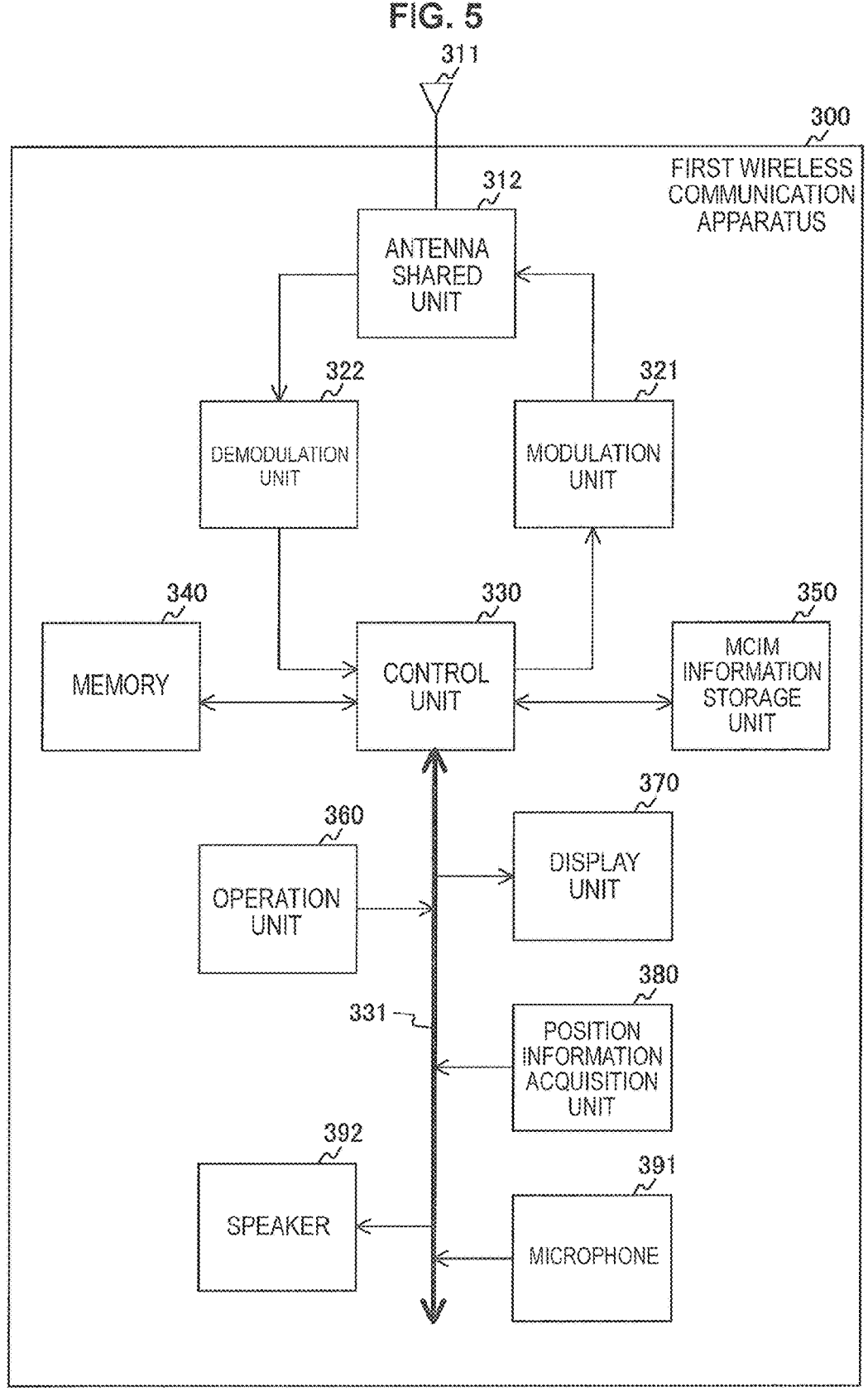
FIG. 5 is a block diagram showing an internal configuration example of a first wireless communication apparatus 300 according to the first embodiment of the present technology.

FIG. 5 is a block diagram showing an internal configuration example of the first wireless communication apparatus 300 according to the first embodiment of the present technology. Internal configurations of the second wireless communication apparatus 130, the third wireless communication apparatus 140, and the fourth wireless communication apparatus 150 are the same as that of the first wireless communication apparatus 300, and thus description will be omitted here. Also, when the second wireless communication apparatus 130, the third wireless communication apparatus 140, and the fourth wireless communication apparatus 150 are described in FIG. 6 or subsequent drawings, description will be made using names and reference numbers corresponding to the first wireless communication apparatus 300.

The first wireless communication apparatus 300 includes an antenna 311, an antenna shared unit 312, a modulation unit 321, a demodulation unit 322, a control unit 330, a memory 340, and a MCIM information storage unit 350. The first wireless terminal apparatus 300 also includes an operation unit 360, a display unit 370, a position information acquisition unit 380, a microphone 391, and a speaker 392. In addition, each of the parts is connected by a bus 331. The first wireless communication apparatus 300 is realized by, for example, a mobile phone apparatus capable of performing calls and data communication.

When, for example, reception processing is performed, a radio wave received by the antenna 311 is demodulated by the demodulation unit 322 after going through the antenna shared unit 312 and the demodulated received data is supplied to the control unit 330. If the reception processing is call reception processing, the demodulated received data (audio data) goes through the control unit 330 before being output from the speaker 392 as a voice.

When, for example, transmission processing is performed, transmission data output by the control unit 330 is modulated by the modulation unit 321 and the modulated transmission data is transmitted from the antenna 311 after going through the antenna shared unit 312. If the transmission processing is call transmission processing, audio data input from the microphone 391 is modulated by the modulation unit 321 after going through the control unit 330 and the modulated transmission data (audio data) is transmitted from the antenna 311 after going through the antenna shared unit 312.

The control unit 330 exercises various kinds of control based on a control program stored in the memory 340. The control unit 330 is constituted of, for example, a microprocessor. The control unit 330 is connected to, for example, the modulation unit 321 and the demodulation unit 322 and transmits/receives various kinds of data to/from the communication control apparatus (second communication operator) 120 connected via the base stations 121, 122. In addition, the control unit 330 performs connection processing to the communication control apparatus (first communication operator) 200 via a wireless line in a limited connection based on PCID without MCIM. Note that the control unit 330 is an example of the determination unit and the control unit described in claims.

The memory 340 is a memory storing control programs for the control unit 330 to perform various kinds of control, transmission data, reception data, and the like. The memory 340 includes, for example, a Read Only Memory (ROM) and a Random Access Memory (RAM). Also, the memory 340 stores terminal identification information (PCID#1) for identifying the first wireless communication apparatus 300 and a device name of the first wireless communication apparatus 300 (for example, the device name 224 shown in FIG. 4). This device name is registered through, for example, a user operation. Also, the memory 340 stores an ID and a password given to the group AB to which the first wireless communication apparatus 300 belongs (for example, the group ID 222 and the group password 223 shown in FIG. 4). The group ID and the password are included in, for example, group addition authentication results corresponding to a group addition request, transmitted from the communication control apparatus 200, and recorded in the memory 340.

Also, each piece of setting information (for example, setting content set in a display screen shown in FIG. 7) is recorded in the memory 340.

The MCIM information storage unit 350 is a memory to hold MCIM (contract authentication information). As the MCIM information storage unit 350, for example, a UICC (Universal Integrated Circuit) card may be used or a dedicated memory to maintain MCIM securely may be used. When a UICC card is used as the MCIM information storage unit 350, a UICC card capable of performing processing to enable or disable MCIM is used, instead of a UICC card into which MCIM is fixedly written. That is, a UICC card in which the control unit 330 can perform processing to enable or disable MCIM based on transfer information received by the antenna 311 and demodulated. In addition, a UICC card capable of rewriting MCIM is used. The processing to enable or disable MCIM can be performed by enable processing and disable processing defined by 3GPP (Third Generation Partnership Project). Further, the MCIM information storage unit 350 may be mounted in a memory 340 by maintaining some region securely in the memory 340.

The operation unit 360 is an operation reception unit that receives an operation input operated by the user and outputs a signal corresponding to the received operation input to the control unit 330. The operation unit 360 includes various keys such as numeric keys and alphabetical keys. The operation unit 360 is an example of a reception unit described in claims.

The display unit 370 is a display unit that displays various kinds of information (character information, time information and the like) based on control of the control unit 330. The display unit 370 displays, for example, each piece of information (for example, display screens shown in FIG. 7) used for various setting. As the display unit 370, for example, a display panel such as an organic EL (Electro Luminescence) panel and LCD (Liquid Crystal Display) panel can be used. The operation unit 360 and the display unit 370 can integrally be configured by using a touch panel in which operation input can be done by the display surface thereof being touched by a finger of the user or a finger of the user being brought closer to the display surface.

Here, for example, the control unit 330 determines whether a wireless communication apparatus (wireless communication apparatus A) for which connection rights to connect to a predetermined network using wireless communication have not been set satisfies a predetermined condition for connecting to the network and performing predetermined communication processing.

When the predetermined condition is satisfied, the control unit 330 transfers the connection rights from a wireless communication apparatus (wireless communication apparatus B) for which the connection rights have been set to the wireless communication apparatus A, thereby controlling the wireless communication apparatus A to perform communication processing using the connection rights set for the wireless communication apparatus A.

Here, description will be made under the assumption of the second wireless communication apparatus 130. The predetermined condition mentioned above is, for example, a condition shown in FIG. 7(b) (the capacity of a photograph stored in an internal memory exceeds a predetermined capacity, or the operation of turning off the power is performed). In other words, the control unit 330 of the second wireless communication apparatus 130 determines whether the predetermined condition is satisfied at any timing among the following (1) to (3). (1) A timing at which image content is generated. (2) A timing at which the capacity of image content stored in the memory 340 exceeds a predetermined capacity. (3) A timing of power off or a fixed time after power off.

When it is determined that the predetermined condition is satisfied in the second wireless communication apparatus 130, the control unit 330 of the second wireless communication apparatus 130 makes a transfer request to transfer the connection rights from the wireless communication apparatus B (for example, the first wireless communication apparatus 300) to the second wireless communication apparatus 130. This transfer request is made to the communication control apparatus (first communication operator) 200. The control unit 330 of the second wireless communication apparatus 130 performs the communication processing described above using the connection rights set by the communication control apparatus (second communication operator) 120 according to the transfer request.

Specifically, the control unit 330 of the second wireless communication apparatus 130 controls upload processing of uploading generated image content to the information processing apparatus 400 for storing the generated image content to be performed as communication processing.

When the communication processing using the connection rights set by the transfer described above (for example, image content download processing) ends, the connection rights are transferred from the transfer destination to the transfer source.

The position information acquisition unit 380 acquires position information indicating the position where the first wireless communication apparatus 300 is located and outputs the acquired position information to the control unit 330. The position information acquisition unit 380 can be realized by a GPS (Global Positioning System) unit that calculates position information based on a GPS signal received by a GPS signal receiving antenna (not shown). The calculated position information includes each piece of data on the position such as the latitude, longitude, altitude and the like when the GPS signal is received. Alternatively, a position information acquisition apparatus that acquires position information by a different acquisition method of position method may be used. For example, a position information acquisition apparatus that acquires position information by deriving position information by using access point information by wireless LAN (Local Area Network) present therearound.

[Configuration Example of Information Processing Apparatus]

Figure 6:
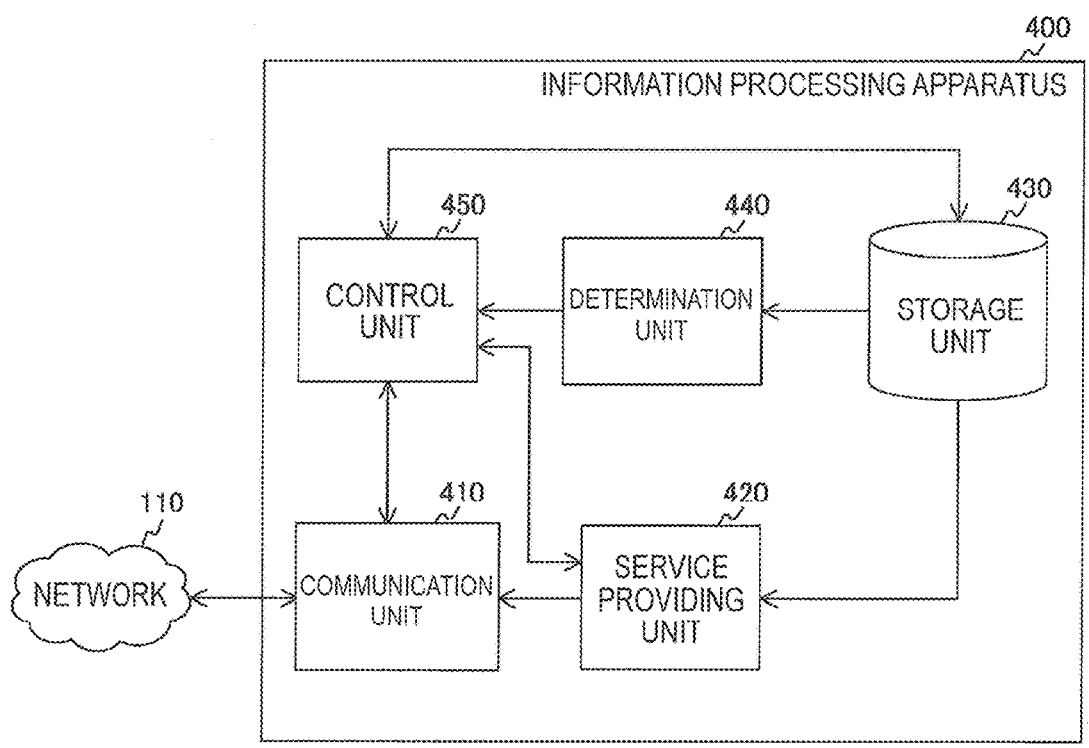
FIG. 6 is a block diagram showing a functional configuration example of an information processing apparatus 400 according to the first embodiment of the present technology.

FIG. 6 is a block diagram showing a functional configuration example of the information processing apparatus 400 according to the first embodiment of the present technology.

The information processing apparatus 400 includes a communication unit 410, a service providing unit 420, a storage unit 430, a determination unit 440, and a control unit 450.

The communication unit 410 is connected to the network 110, and performs communication that is performed between respective wireless communication apparatuses connected via the network 110 based on control of the control unit 450. For example, the communication unit 410 receives each piece of information (for example, a content upload request) transmitted from each wireless communication apparatus via the network 110, and outputs the received piece of information to the control unit 450. Also, the communication unit 410 transmits various kinds of content output from the service providing unit 420 to each wireless communication apparatus via the network 110.

The service providing unit 420 provides various kinds of services to a wireless communication apparatus connected via the network according to a request from the wireless communication apparatus based on control of the control unit 450. Also, the service providing unit 420 uses various kinds of data stored in the storage unit 430 to provide various kinds of services. For example, when a content download request is received from the first wireless communication apparatus 300, the service providing unit 420 acquires content relating to the request (for example, music content) from the storage unit 430. Then, the service providing unit 420 transmits the acquired content to the first wireless communication apparatus 300 via the communication unit 410.

The storage unit 430 is a storage unit that stores various kinds of data corresponding to a time at which the service providing unit 420 provides various kinds of communication services, and data transmitted from a wireless communication apparatus. The storage unit 430 stores, for example, content uploaded from a wireless communication apparatus (for example, image content), content for providing content to be downloaded (for example, game content and music content), and the like.

The determination unit 440 determines whether a wireless communication apparatus for which connection rights to connect to a predetermined network using wireless communication have not been set satisfies a predetermined condition for connecting to the network and performing predetermined communication processing. Also, the determination unit 440 outputs the determination results to the control unit 450. Determination by the determination unit 440 will be described in detail with reference to FIG. 28.

The control unit 450 exercises control relating to communication performed between respective wireless communication apparatuses connected via the network 110. For example, the control unit 450 controls upload processing of uploading content from a wireless communication apparatus or download processing of downloading content to a wireless communication apparatus to be performed.

[Example of Display Screen]

FIG. 7 is a diagram showing examples of a display screen displayed on the display unit 370 of the second wireless communication apparatus 130 according to the first embodiment of the present technology. FIG. 7 shows an example in which an input and output panel 132 integrally constituted with the operation unit 360 and the display unit 370 is installed on a rear surface of the second wireless communication apparatus 130 (in other words, a surface on the opposite side of a surface on which a lens directed to a subject is installed).

The input and output panel 132 displays various images, and receives an operation input of the user by detecting a touch operation in the input and output panel 132. The input and output panel 132 is realized by, for example, a touch panel.

FIG. 7(a) shows a display screen (an automatic storage necessity/unnecessity selection screen 500) for selecting whether or not to automatically store a photograph (image content) taken using the second wireless communication apparatus 130 in the information processing apparatus 400. For example, the automatic storage necessity/unnecessity selection screen 500 is displayed according to, for example, a selection operation in a display screen for selecting a function to be performed by the second wireless communication apparatus 130 (for example, a menu screen).

Specifically, in the automatic storage necessity/unnecessity selection screen 500, an automatic storage selection area 501, a confirm button 502, and a back button 503 are provided.

In the automatic storage selection area 501, radio buttons for selecting whether or not to automatically store a photograph (image content) taken using the second wireless communication apparatus 130 in the information processing apparatus 400 are displayed. Also, in the case of automatic storage, radio buttons for selecting whether or not to leave a photograph (image content) stored in the information processing apparatus 400 in the memory 340 of the second wireless communication apparatus 130 are displayed. In the case of leaving a photograph (image content) stored in the information processing apparatus 400 in the memory 340 of the second wireless communication apparatus 130, the uppermost radio button is selected as shown in FIG. 7(a).

The confirm button 502 is a button pressed to confirm a selection operation of selecting whether or not automatic storage is necessary in the automatic storage selection area 501 after the selection operation is performed.

The back button 503 is a button pressed, for example, to return to a display screen that has been displayed immediately before.

FIG. 7(*b*) shows a display screen (storage timing selection screen 510) for selecting a timing for automatically storing a photograph (image content) taken using the second wireless communication apparatus 130 in the information processing apparatus 400. The storage timing selection screen 510 is displayed, for example, after a selection operation for performing automatic storage is performed in the automatic storage necessity/unnecessity selection screen 500 shown in FIG. 7(*a*). In other words, after a radio button for performing automatic storage (in other words, any one of two upper radio buttons) is selected in the automatic storage selection area 501, and the confirm button 502 is pressed, the storage timing selection screen 510 is displayed.

Specifically, in the storage timing selection screen 510, a storage timing selection area 511, a confirm button 512, and a back button 513 are provided.

In the storage timing selection area 511, radio buttons for selecting timings of automatically storing a photograph (image content) taken using the second wireless communication apparatus 130 in the information processing apparatus 400 are displayed. For example, radio buttons for selecting any of a timing immediately after the end of photography (in other words, every time a still image is taken), a timing at which the capacity of a photograph recorded in an internal memory exceeds a predetermined capacity, and a timing at which an operation of turning off the power is performed.

Here, the timing immediately after the end of photography can be, for example, a timing immediately after the end of record processing of a photograph (image content) in photography. Also, the timing at which the operation of turning off the power is performed can be, for example, immediately after the operation of turning off the power or a timing of a fixed time after a power-off state. In other words, in the case of a camera, it is possible to expect frequent repetition of power-on and -off. For this reason, on condition that the power-off state is maintained for a fixed time, processing (upload processing) of storing a taken photograph (image content) can be performed.

The confirm button 512 is a button pressed to confirm a selection operation of selecting an automatic storage timing after the selection operation is performed in the storage timing selection area 511.

The back button 513 is a button pressed, for example, to return to a display screen that has been displayed immediately before.

[Example of Storage of Image Content]

FIG. 8 is a diagram showing the flow of a case of storing image content generated by photography using the second wireless communication apparatus 130 in the information processing apparatus 400 according to the first embodiment of the present technology in a simplified manner.

In FIG. 8, a wireless communication apparatus holding rights of using MCIM is shown with a thick line. In other words, it is assumed in FIGS. 8(*a*) and (*d*) that the first wireless communication apparatus 300 holds rights of using MCIM, and in FIGS. 8(*b*) and (*c*), the second wireless communication apparatus 130 holds rights of using MCIM.

As an example, FIG. 8 shows a case in which a setting for automatically storing a photograph (image content) in the information processing apparatus 400 at a timing immediately after the end of photography (in other words, every time a still image is taken) has been made.

FIG. 8(*a*) shows a state in which photography is being performed using the second wireless communication apparatus 130. For example, with the lens of the second wireless communication apparatus 130 directed to a subject (mountain), the user 60 performs a full-pressing operation of a shutter button 131. According to the full-pressing operation of the shutter button 131, a capturing unit (not shown) of the second wireless communication apparatus 130 performs capturing processing, and thereby generates image data. The image data generated in this way is recorded in the memory 340 of the second wireless communication apparatus 130 as image content (an image file). When the image content is recorded in the memory 340 in this way, the control unit 330 of the second wireless communication apparatus 130 determines that a predetermined condition for connecting to the network 110 and performing predetermined communication processing (upload processing of the image content) is satisfied.

FIG. 8(*b*) shows a state in which transfer processing of rights of using MCIM from the first wireless communication apparatus 300 to the second wireless communication apparatus 130 has been performed. As described above, when the record processing of the image content to the memory 340 ends, it is determined that a predetermined condition for connecting to the network 110 and performing predetermined communication processing (upload processing of the image content) is satisfied. For this reason, to connect to the network 110 and perform the predetermined communication processing (upload processing of the image content), the transfer processing of the rights of using the MCIM from the first wireless communication apparatus 300 to the second wireless communication apparatus 130 is performed. This MCIM transfer processing will be described in detail with reference to FIG. 9 and FIG. 10.

FIG. 8(*c*) shows a state in which a photograph (image content 133) is being uploaded to the information processing apparatus 400 using the rights of using the MCIM set for the second wireless communication apparatus 130. For example, the photograph (image content 133) recorded in the memory 340 of the second wireless communication apparatus 130 is transmitted to the information processing apparatus 400 via the communication control apparatus (second communication operator) 120 and the network 110, and recorded in the storage unit 430.

FIG. 8(*d*) shows a state in which transfer processing of the rights of using the MCIM from the second wireless communication apparatus 130 to the first wireless communication apparatus 300 has been performed. When the upload processing of the photograph (the image content 133) to the information processing apparatus 400 ends, the MCIM transfer processing (restoration processing) is performed. This MCIM transfer processing will be described in detail with reference to FIG. 9 and FIG. 10.

[Communication Example in Case of Performing Upload Processing of Image Content]

Figure 10:
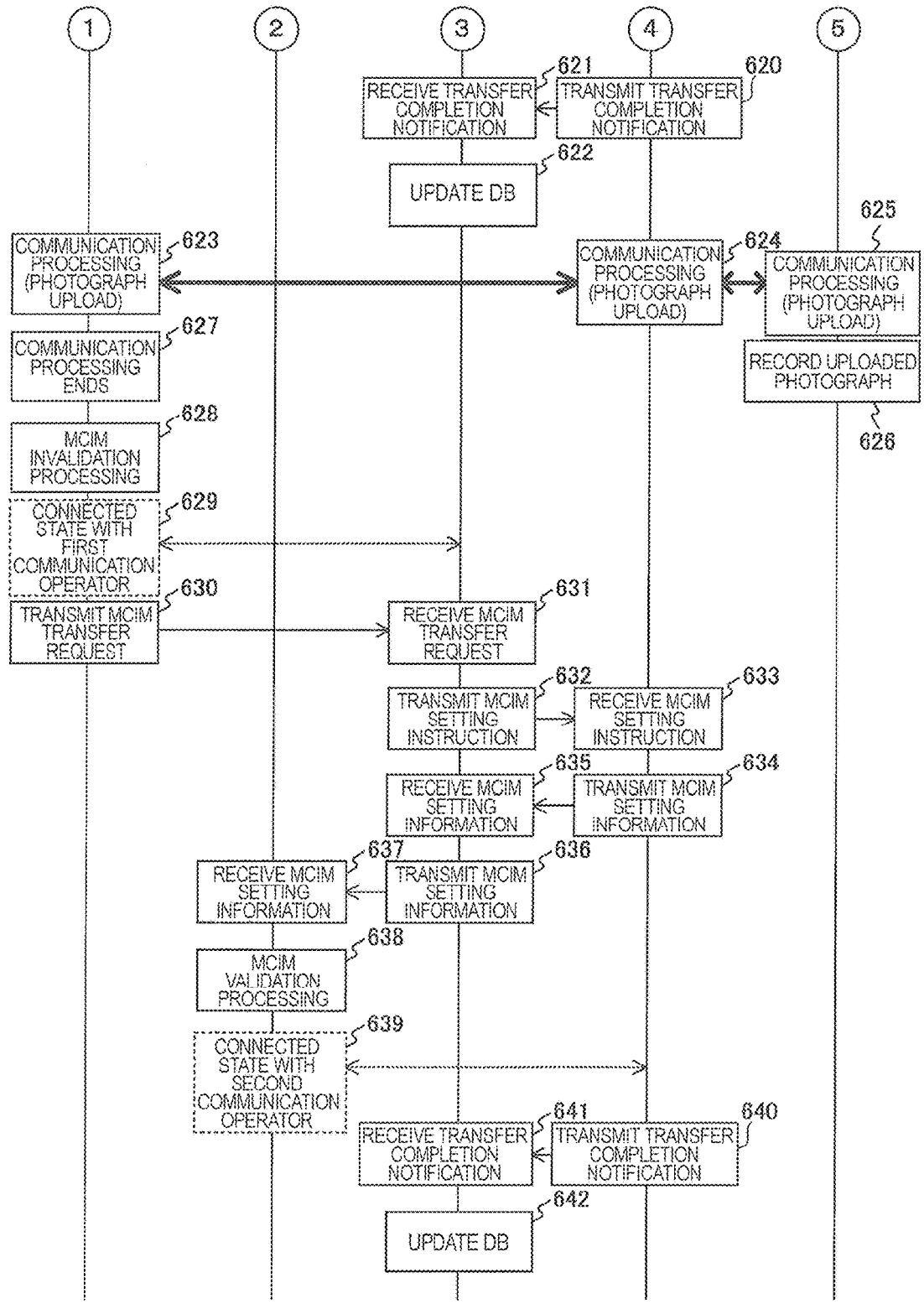
FIG. 10 is a sequence chart showing the communication processing example between each apparatus included in the communication system 100 according to the first embodiment of the present technology.

FIG. 9 and FIG. 10 are sequence charts showing the communication processing example between each apparatus included in the communication system 100 according to the first embodiment of the present technology.

In FIG. 9 and FIG. 10, description will be made assuming that the aforementioned group AB has been configured, and the first wireless communication apparatus 300 is holding rights of using MCIM. FIG. 9 and FIG. 10 show the communication processing example of a case of automatically uploading image content recorded by photography to the information processing apparatus 400 when the photography has been performed using the second wireless communication apparatus 130. In other words, the communication processing example of a case of performing an upload at the timing set by a selection operation of the uppermost radio button in the storage timing selection area 511 shown in FIG. 7(b).

In FIG. 9 and FIG. 10, it is assumed that the first wireless communication apparatus 300 is in a connected state (602) with the communication control apparatus (second communication operator) 120, and the second wireless communication apparatus 130 is in a connected state (601) with the communication control apparatus (first communication operator) 200. In addition, in FIG. 9 and FIG. 10, the third wireless communication apparatus 140, the fourth wireless communication apparatus 150, and the like are omitted for convenience of description.

At first, as shown in FIG. 8(a), photography is performed by the user 60 using the second wireless communication apparatus 130 (603). In this way, when a photography operation is performed in the second wireless communication apparatus 130 (603), the control unit 330 of the second wireless communication apparatus 130 transmits an MCIM transfer request to the communication control apparatus (first communication operator) 200 (604 and 605). In this case, the second wireless communication apparatus 130 is in the connected state (601) with the communication control apparatus (first communication operator) 200. For this reason, the MCIM transfer request is directly transmitted from the second wireless communication apparatus 130 to the communication control apparatus (first communication operator) 200 (604 and 605).

In other words, the control unit 330 of the second wireless communication apparatus 130 determines that a predetermined condition for connecting to the network 110 and performing predetermined communication processing (upload processing of image content) is satisfied (603). When it is determined that the predetermined condition is satisfied in this way, the control unit 330 of the second wireless communication apparatus 130 decides whether or not rights of using MCIM are held. When the rights of using the MCIM are not held, the MCIM transfer request is transmitted to the communication control apparatus (first communication operator) 200 (604 and 605). Also, when the rights of using the MCIM are held, upload processing of image content is performed without transmitting the MCIM transfer request. The MCIM transfer request is a request for a wireless communication apparatus (the first wireless communication apparatus 300) to transfer the usage rights. By this MCIM transfer request, the transfer processing of rights of using the MCIM shown in FIG. 8(b) is performed.

When the communication control apparatus (first communication operator) 200 receives the MCIM transfer request (605), the control unit 210 of the communication control apparatus (first communication operator) 200 transmits an MCIM invalidation instruction to the communication control apparatus (second communication operator) 120 (606 and 607). This MCIM invalidation instruction is an instruction for invalidating MCIM of a wireless communication apparatus (the first wireless communication apparatus 300) of a transfer source relating to the MCIM transfer request. Here, MCIM validation/invalidation is performed based on control of the communication control apparatus (second communication operator) 120. For this reason, the communication control apparatus (first communication operator) 200 gives the MCIM invalidation instruction to the communication control apparatus (second communication operator) 120, and the communication control apparatus (second communication operator) 120 performs MCIM invalidation processing.

In this way, the communication control apparatus (second communication operator) 120 performs validation/invalidation of MCIM held in each wireless communication apparatus based on an instruction from the control unit 210, and thereby can transfer the rights of using the MCIM. In addition, validation/invalidation of MCIM held in each wireless communication apparatus can also be performed on the side of the communication control apparatus (first communication operator) 200. For this reason, the control unit 210 performs validation/invalidation of MCIM held in each wireless communication apparatus, and thereby may transfer the rights of using the MCIM.

When the communication control apparatus (second communication operator) 120 receives the MCIM invalidation instruction (607), the control unit 125 of the communication control apparatus (second communication operator) 120 transmits MCIM invalidation information to the first wireless communication apparatus 300 (608 and 609). This MCIM invalidation information is information for invalidating valid MCIM of a wireless communication apparatus holding the MCIM. In this case, the first wireless communication apparatus 300 is in the connected state (602) with the communication control apparatus (second communication operator) 120. For this reason, the MCIM invalidation information is directly transmitted from the communication control apparatus (second communication operator) 120 to the first wireless communication apparatus 300 (608 and 609).

When the first wireless communication apparatus 300 receives the MCIM invalidation information (609), invalidation processing of MCIM stored in the MCIM information storage unit 350 of the first wireless communication apparatus 300 is performed (610). In this way, the MCIM held in the first wireless communication apparatus 300 is invalidated, and thus the first wireless communication apparatus 300 is not able to connect to the communication control apparatus (second communication operator) 120 based on the MCIM. For this reason, the first wireless communication apparatus 300 is put in a connected state of connecting to the communication control apparatus (first communication operator) 200 through a limited connection based on PCID (611).

In this way, when the MCIM invalidation processing is performed in the transfer source (first wireless communication apparatus 300) (610), and the connection between the transfer source and the communication control apparatus (second communication operator) 120 is cut off, the disconnection is detected by the control unit 210 of the communication control apparatus (first communication operator) 200. For example, after the MCIM invalidation processing is performed, this is transmitted from the transfer source (first wireless communication apparatus 300) to the communication control apparatus (first communication operator) 200, and thereby the control unit 210 can detect the disconnection. Also, the control unit 210 can detect the disconnection by detecting that the transfer source (first wireless communication apparatus 300) is in a state of connecting (connected state) to the communication control apparatus (first communication operator) 200 through a limited connection based on PCID.

In this way, when the disconnection between the transfer source and the communication control apparatus (second communication operator) 120 is detected by the control unit 210 of the communication control apparatus (first communication operator) 200, the control unit 210 transmits an MCIM setting instruction to the communication control apparatus (second communication operator) 120 (612 and 613). This MCIM setting instruction is an instruction for setting valid MCIM in the wireless communication apparatus (second wireless communication apparatus 130) of the transfer source relating to the MCIM transfer request.

When the communication control apparatus (second communication operator) 120 receives the MCIM setting instruction (613), the control unit 125 of the communication control apparatus (second communication operator) 120 transmits MCIM setting information to the second wireless communication apparatus 130 (614 to 617). This MCIM setting information is information for setting valid MCIM in a wireless communication apparatus. In this case, the second wireless communication apparatus 130 is in the connected state (601) with the communication control apparatus (first communication operator). For this reason, the MCIM setting information is transmitted from the communication control apparatus (second communication operator) 120 to the second wireless communication apparatus 130 via the communication control apparatus (first communication operator) 200 (614 to 617).

When the second wireless communication apparatus 130 receives the MCIM setting instruction (617), setting processing (for example, validation processing) of MCIM stored in the MCIM information storage unit 350 of the second wireless communication apparatus 130 is performed (618). In this way, valid MCIM is set in the second wireless communication apparatus 130, and thus the second wireless communication apparatus 130 can connect to the communication control apparatus (second communication operator) 120 based on the MCIM (619). In other words, the second wireless communication apparatus 130 is put in a connected state of connecting to the communication control apparatus (second communication operator) 120 based on the MCIM (619).

In this way, when the second wireless communication apparatus 130 is put in the connected state with the communication control apparatus (second communication operator) 120 (619), the communication control apparatus (second communication operator) 120 transmits a transfer completion notification to the communication control apparatus (first communication operator) 200 (620 and 621). This transmission completion notification is a notification that the MCIM transfer processing relating to the MCIM transfer request has been finished. When the communication control apparatus (first communication operator) 200 receives the transfer completion notification (621), the control unit 210 of the communication control apparatus (first communication operator) 200 updates content of the group management database 220 (shown in FIG. 4) (622). For example, in the valid/invalid information 226 shown in FIG. 4, the first wireless communication apparatus 300 (the terminal identification information 225 "PCID#1") is changed from "Valid" to "Invalid." On the other hand, the second wireless communication apparatus 130 (the terminal identification information 225 "PCID#2") is changed from "Invalid" to "Valid." In other words, the transfer processing of rights of using MCIM shown in FIG. 8(*b*) is completed.

Subsequently, as shown in FIG. 8(*c*), communication processing is performed between the second wireless communication apparatus 130 and the information processing apparatus 400 via the communication control apparatus (second communication operator) 120 (623 to 625). In other words, upload processing of a photograph (image content) recorded in the memory 340 of the second wireless communication apparatus 130 to the information processing apparatus 400 is performed (623 to 625). Then, the control unit 450 of the information processing apparatus 400 causes the storage unit 430 to record the photograph (image content) transmitted from the second wireless communication apparatus 130 through the upload processing (626).

When the communication processing between the second wireless communication apparatus 130 and the information processing apparatus 400 ends (627), the transfer processing of rights of using MCIM (restoration processing) shown in FIG. 8(*d*) is performed. In other words, invalidation processing of MCIM stored in the MCIM information storage unit 350 of the second wireless communication apparatus 130 is performed (628). In this way, the MCIM held in the second wireless communication apparatus 130 is invalidated, and thus the second wireless communication apparatus 130 is not able to connect to the communication control apparatus (second communication operator) 120 based on the MCIM. For this reason, the second wireless communication apparatus 130 is put in a connected state of connecting to the communication control apparatus (first communication operator) 200 through a limited connection based on PCID (629). In other words, a connected state of the second wireless communication apparatus 130 returns to the original connected state (601) (629).

Subsequently, the control unit 330 of the second wireless communication apparatus 130 transmits an MCIM transfer request to the communication control apparatus (first communication operator) 200 (630 and 631). This MCIM transfer request is a request for the wireless communication apparatus (second wireless communication apparatus 130) for which rights of using MCIM have been set by the MCIM transfer processing to transfer (return) the rights of using the MCIM to the wireless communication apparatus of the transfer source relating to the MCIM transfer processing. In this case, the second wireless communication apparatus 130 is in the connected state (629) with the communication control apparatus (first communication operator) 200. For this reason, the MCIM transfer request is directly transmitted from the second wireless communication apparatus 130 to the communication control apparatus (first communication operator) 120 (630 and 631).

When the communication control apparatus (first communication operator) 200 receives the MCIM transfer request (631), the control unit 210 of the communication control apparatus (first communication operator) 200 transmits an MCIM setting instruction to the communication control apparatus (second communication operator) 120 (632 and 633).

When the communication control apparatus (second communication operator) 120 receives the MCIM setting instruction (634), the control unit 125 of the communication control apparatus (second communication operator) 120 transmits MCIM setting information to the first wireless communication apparatus 300 (634 to 637). In this case, the first wireless communication apparatus 300 is in the connected state (611) with the communication control apparatus (first communication operator). For this reason, the MCIM setting information is transmitted from the communication control apparatus (second communication operator) 120 to the first wireless communication apparatus 300 via the communication control apparatus (first communication operator) 200 (634 to 637).

When the first wireless communication apparatus 300 receives the MCIM setting instruction (637), MCIM setting processing (for example, validation processing) is performed in the first wireless communication apparatus 300

(638). In this way, valid MCIM is set in the first wireless communication apparatus 300, and thus the first wireless communication apparatus 300 can connect to the communication control apparatus (second communication operator) 120 based on the MCIM (639). In other words, a connected state of the first wireless communication apparatus 300 returns to the original connected state (602) (639).

In this way, when the first wireless communication apparatus 300 is put in the connected state with the communication control apparatus (second communication operator) 120 (639), the communication control apparatus (second communication operator) 120 transmits a transfer completion notification to the communication control apparatus (first communication operator) 200 (640 and 641). When the communication control apparatus (first communication operator) 200 receives this transfer completion notification (641), the control unit 210 of the communication control apparatus (first communication operator) 200 changes content of the group management database 220 (shown in FIG. 4) (642). For example, in the valid/invalid information 226 shown in FIG. 4, the first wireless communication apparatus 300 (the terminal identification information 225 "PCID#1") is changed from "Invalid" to "Valid." On the other hand, the second wireless communication apparatus 130 (the terminal identification information 225 "PCID#2") is changed from "Valid" to "Invalid." In other words, it becomes a state before the MCIM transfer processing is performed.

In this way, in the first embodiment of the present technology, connection control is automatically exercised in connection with an application operated by a user, and thereby the user can easily use a network with a plurality of wireless communication apparatuses without being aware of a connection setting. In other words, it is possible to provide a mechanism of automatically providing connection rights to a suitable wireless communication apparatus for a request of the application operated by the user, and a software-downloadable SIM oriented toward an application that does not depend on a connection can be realized. For this reason, the user can receive a desired communication service at a suitable timing without performing a transfer operation of rights of using MCIM. In other words, it is unnecessary for the user to make a connection setting for receiving service, and a connection setting is automatically performed according to processing or an application that the user wants to execute so that the user can easily receive a suitable communication service.

In recent years, there are wireless communication apparatuses (for example, netbooks) that store content on a cloud, and download and store only metadata associated with the content only in the case of necessity. In such a wireless communication apparatus, a time when a user clicks metadata indicating a book or music may be set as a detection time of the aforementioned event. In this case, it is possible to perform transfer processing of rights of using MCIM at the detection time of the event, and return the rights of using the MCIM to the original state in a stage in which necessary content has been downloaded. In this way, even when content is stored using a cloud, it is possible to apply the first embodiment of the present technology.

In addition, this example shows the case of transferring rights of using MCIM by performing validation/invalidation, but rights of using MCIM may be transferred by sending the MCIM itself. In this case, when MCIM invalidation information is transmitted to the first wireless communication apparatus 300, MCIM held in the first wireless communication apparatus 300 is invalidated (erased). On the other hand, when MCIM setting information (including MCIM) is transmitted to the second wireless communication apparatus 130, valid MCIM is recorded in the MCIM information storage unit 350 of the second wireless communication apparatus 130 based on the setting information. In this way, valid MCIM is set in the second wireless communication apparatus 130.

Also, this example shows the case in which one wireless communication apparatus holds one piece of MCIM, and transfers rights of using the MCIM by performing validation/invalidation of the MCIM. However, contract authentication information (for example, referred to as first contract authentication information) that is only used in a connection relating to transfer processing of rights of using MCIM (for example, referred to as second contract authentication information) may be held in each wireless communication apparatus, and the connection relating to the transfer processing may be established using the first contract authentication information.

[Operational Example of Communication System]

Next, operation of the communication system 100 according to the first embodiment of the present technology will be described with reference to drawings.

[Operational Example of Wireless Communication Apparatus (Operation Device)]

FIG. 11 is a flow chart showing an example of a processing procedure for communication processing by the second wireless communication apparatus 130 according to the first embodiment of the present technology.

At first, the control unit 330 of the second wireless communication apparatus 130 decides whether or not a predetermined event has been detected (step S900), and continues monitoring when the predetermined event has not been detected. The predetermined event is each event shown in FIG. 7(b) and, for example, record processing of image content immediately after the end of photography. When the predetermined event is detected, it is determined that a predetermined condition for connecting to the network 110 and performing predetermined communication processing is satisfied. Step S900 is an example of a determination procedure described in claims.

When the predetermined event is detected (step S900), the control unit 330 of the second wireless communication apparatus 130 decides whether or not rights of using MCIM are held (step S901). When rights of using MCIM are held (step S901), communication processing (for example, upload processing of image content) is performed according to the detected event (step S909).

On the other hand, when rights of using MCIM are not held (step S901), the control unit 330 of the second wireless communication apparatus 130 transmits an MCIM transfer request to the communication control apparatus (first communication operator) 200 (step S902).

Subsequently, the control unit 330 of the second wireless communication apparatus 130 decides whether or not MCIM setting information has been received (step S903), and continues monitoring when MCIM setting information has not been received (step S903). Also, when MCIM setting information has been received (step S903), the control unit 330 of the second wireless communication apparatus 130 performs setting processing (for example, validation processing) of MCIM stored in the MCIM information storage unit 350 of the second wireless communication apparatus 130 (step S904).

Subsequently, the control unit 330 of the second wireless communication apparatus 130 performs communication processing (communication processing according to the detected event (for example, upload processing of image content)) between the second wireless communication apparatus 130 and the information processing apparatus 400 (step S905). This communication processing is performed via the communication control apparatus (second communication control apparatus) 120.

Subsequently, the control unit 330 of the second wireless communication apparatus 130 decides whether or not the communication processing with the information processing apparatus 400 has ended (step S906), and continues monitoring when the communication processing has not ended (step S906). On the other hand, when the communication processing has ended (step S906), the control unit 330 of the second wireless communication apparatus 130 performs invalidation processing of MCIM stored in the MCIM information storage unit 350 of the second wireless communication apparatus 130 (step S907).

Subsequently, the control unit 330 of the second wireless communication apparatus 130 transmits an MCIM transfer request to the communication control apparatus (first communication operator) 200 (step S908). Steps S902 to S906 are an example of a control procedure described in claims.

<2. Second Embodiment>

The first embodiment of the present technology shows an example of performing MCIM transfer processing according to an event (for example, a photography operation) in a wireless communication apparatus not holding MCIM. However, MCIM transfer processing may be performed according to an event in a wireless communication apparatus holding MCIM.

Accordingly, a second embodiment of the present technology shows an example of performing MCIM transfer processing according to an event (content purchase operation) in a wireless communication apparatus holding MCIM. In the second embodiment of the present technology, a configuration of a communication system is approximately the same as the example of FIG. 3 or the like. For this reason, in this example, description of parts that are common between the second embodiment and the first embodiment of the present technology will be partially omitted.

[Example of Display of Storage Location Selection Screen]

FIG. 12 is a diagram showing an example of a display screen (a storage location selection screen 520) displayed on the display unit 370 of the first wireless communication apparatus 300 according to the second embodiment of the present technology.

The storage location selection screen 520 is a display screen for selecting a wireless communication apparatus to store music content purchased through an operation of the first wireless communication apparatus 300. For example, the storage location selection screen 520 is displayed after a purchase operation in a music content purchase screen for purchasing music content ends.

Specifically, in the storage location selection screen 520, a storage location selection area 521, a device name display area 522, a terminal identification information display area 523, an MCIM valid/invalid information display area 524, a confirm button 525, and a back button 526 are provided.

In the storage location selection area 521, radio buttons for selecting a wireless communication apparatus of a storage location to store purchased music content from among respective wireless communication apparatuses belonging to a group are displayed. For example, when a selection operation for a wireless communication apparatus of a storage location has been performed, a black circle is added to a radio button of the storage location selection area 521 corresponding to the selected wireless communication apparatus.

In the device name display area 522, names (device names) representing the respective wireless communication apparatuses belonging to the group are displayed. For example, device names (the device name 224 shown in FIG. 4) stored in the group management database 220 are displayed.

In the terminal identification information display area 523, terminal identification information representing the respective wireless communication apparatuses belonging to the group is displayed. For example, the terminal identification information (the terminal identification information 225 shown in FIG. 4) stored in the group management database 220 is displayed.

In the MCIM valid/invalid information display area 524, MCIM valid/invalid information corresponding to the respective wireless communication apparatuses belonging to the group is displayed. For example, valid/invalid information stored in the group management database 220 (the valid/invalid information 226 shown in FIG. 4) is displayed. In other words, by looking at "Valid" and "Invalid" displayed in the MCIM valid/invalid information display area 524, a user can visually and easily understand a wireless communication apparatus holding valid MCIM.

The confirm button 525 is a button pressed to confirm a selection operation for a wireless communication apparatus of the storage location after the selection operation is performed in the storage location selection screen 520.

The back button 526 is a button pressed, for example, to return to a display screen that has been displayed immediately before.

[Example of Storage of Music Content]

Figure 13:
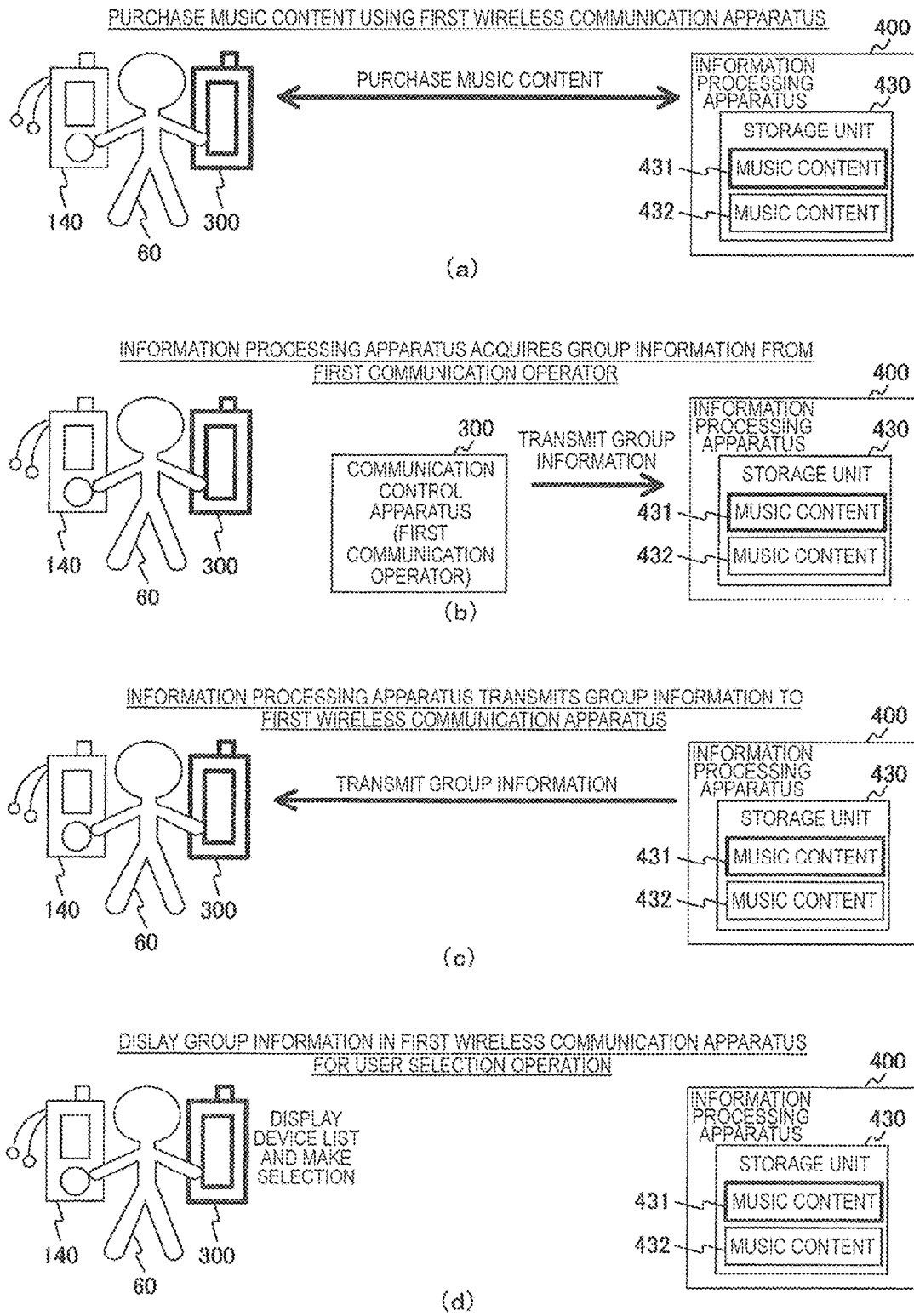
FIG. 13 is a diagram showing the flow of a case of storing music content purchased through a purchase operation using the first wireless communication apparatus 300 in a third wireless communication apparatus 140 according to the second embodiment of the present technology in a simplified manner.
Figure 14:
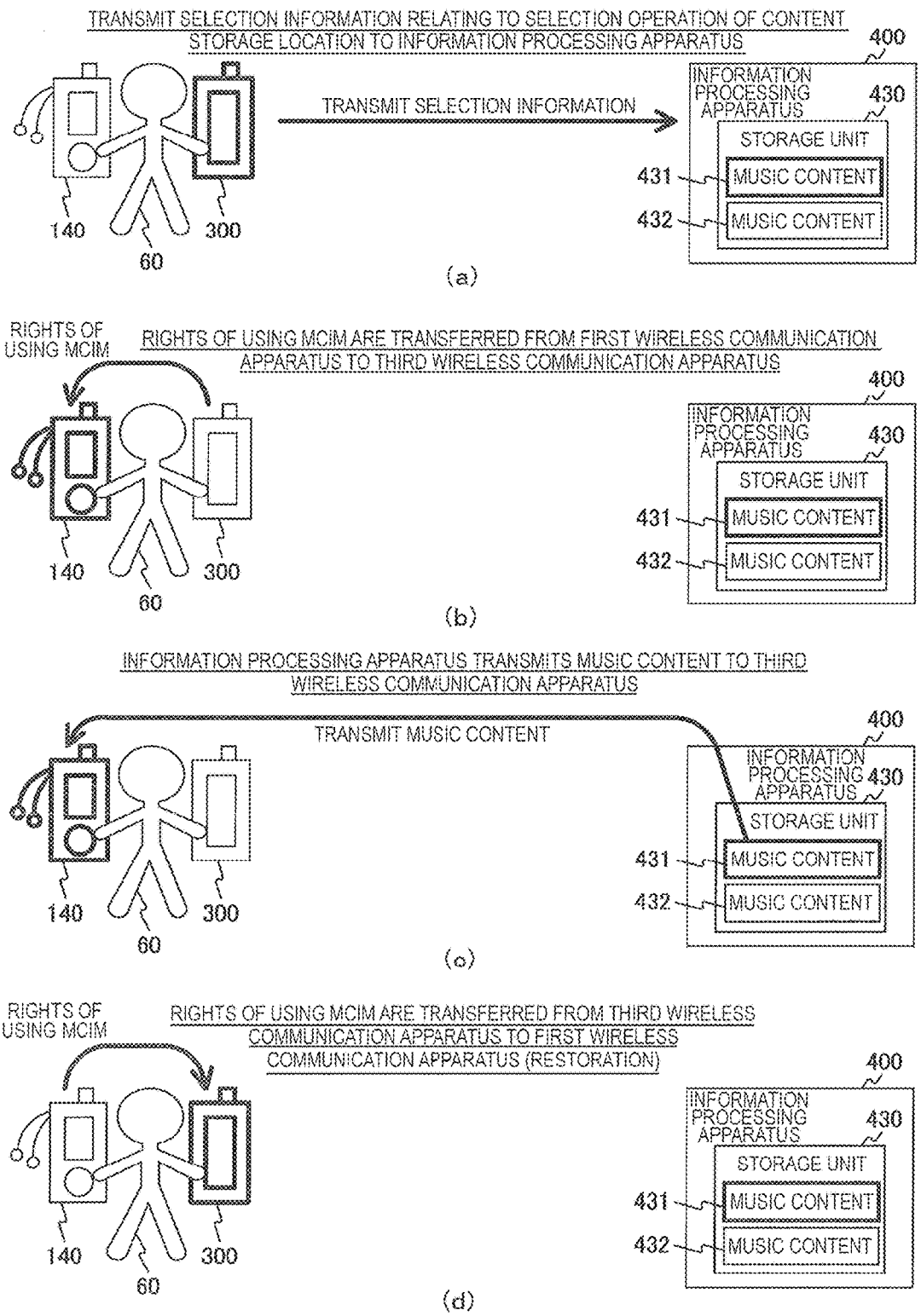
FIG. 14 is a diagram showing the flow of a case of storing music content purchased through a purchase operation using the first wireless communication apparatus 300 in the third wireless communication apparatus 140 according to the second embodiment of the present technology in a simplified manner.

FIG. 13 and FIG. 14 are diagrams showing the flow of a case of storing music content purchased through a purchase operation using the first wireless communication apparatus 300 in the third wireless communication apparatus 140 according to the second embodiment of the present technology in a simplified manner.

In FIG. 13 and FIG. 14, a wireless communication apparatus holding rights of using MCIM is shown with a thick line. In other words, it is assumed that, in FIG. 13 and FIGS. 14(a) and (d), the first wireless communication apparatus 300 holds rights of using MCIM, and in FIGS. 14(b) and (c), the second wireless communication apparatus 130 holds rights of using MCIM.

FIG. 13 and FIG. 14 show an example of storing purchased music content in a wireless communication apparatus that belongs to the same group (group AB) as the first wireless communication apparatus 300 that has performed a purchase operation of the music content.

FIG. 13(a) shows a state in which a purchase operation of purchasing music content desired by the user 60 is performed using the first wireless communication apparatus 300. Here, the first wireless communication apparatus 300 holds rights of using MCIM, and thus can connect to the information processing apparatus 400 via the communication control apparatus (second communication operator) 120. Then, the first wireless communication apparatus 300 displays a music content purchase screen (not shown) while connected to the information processing apparatus 400. This music content purchase screen is a screen for purchasing music content, and the user 60 performs the purchase operation on the music content purchase screen. For example, in the music content purchase screen, marks representing a plurality of pieces of music content (for example, music content 431 and 432) are displayed, and the user 60 performs the selection operation of selecting a desired piece of music content (for example, the music content 431) from among these pieces of music content. In addition, a purchase operation of purchasing the selected piece of music content (for example, the music content 431) is performed.

FIG. 13(b) shows a state in which acquisition processing for the information processing apparatus 400 to acquire group information from the communication control apparatus (first communication operator) 200 is being performed.

As shown in FIG. 13(a), when the music content purchase operation is performed using the first wireless communication apparatus 300, the information processing apparatus 400 acquires information relating to a group of the wireless communication apparatus having performed the purchase operation (group information). Specifically, by communication processing relating to music content purchasing performed between the first wireless communication apparatus 300 and the information processing apparatus 400, terminal identification information on the first wireless communication apparatus 300 is transmitted to the information processing apparatus 400. The information processing apparatus 400 transmits the terminal identification information on the first wireless communication apparatus 300 to the communication control apparatus (first communication operator) 200, and the communication control apparatus (first communication operator) 200 extracts the group to which the first wireless communication apparatus 300 belongs based on the terminal identification information. Then, the communication control apparatus (first communication operator) 200 transmits the information relating to respective wireless communication apparatuses belonging to the extracted group (group information) to the information processing apparatus 400.

FIG. 13(c) shows a state in which transmission processing of transmitting group information from the information processing apparatus 400 to the first wireless communication apparatus 300 is being performed.

As shown in FIG. 13(c), the information processing apparatus 400 transmits the group information acquired from the communication control apparatus (first communication operator) 200 to the first wireless communication apparatus 300. In this case, the first wireless communication apparatus 300 is connected to the communication control apparatus (second communication operator) 120, and thus the information processing apparatus 400 transmits the group information to the first wireless communication apparatus 300 via the communication control apparatus (second communication operator) 120.

FIG. 13(d) shows a state in which the group information is displayed in the first wireless communication apparatus 300, and a selection operation of selecting a storage location to store the purchased music content is being performed.

When the group information is received from the information processing apparatus 400, the first wireless communication apparatus 300 displays the group information on the display unit 370. For example, based on the group information, the storage location selection screen 520 shown in FIG. 12 is displayed. On this storage location selection screen 520, the selection operation of selecting a storage location to store the purchased music content is performed. In this example, it is assumed that the selection operation of selecting the third wireless communication apparatus 140 as a storage location has been performed.

FIG. 14(a) shows a state in which transmission processing of transmitting selection information relating to a user selection operation (information relating to the selected storage location) from the first wireless communication apparatus 300 to the information processing apparatus 400 is being performed.

For example, the information relating to the storage location selected on the storage location selection screen 520 shown in FIG. 12 is transmitted from the first wireless communication apparatus 300 to the information processing apparatus 400 as the selection information (for example, terminal identification information on the selected storage location).

FIG. 14(b) shows a state in which transfer processing of rights of using MCIM from the first wireless communication apparatus 300 to the third wireless communication apparatus 140 has been performed. When the information processing apparatus 400 receives the aforementioned selection information, the transfer processing of rights of using MCIM from the first wireless communication apparatus 300 to the third wireless communication apparatus 140 is performed to connect to the network 110 and perform predetermined communication processing. Here, when the third wireless communication apparatus 140 receives MCIM setting information, it is determined that a predetermined condition for connecting to the network 110 and performing predetermined communication processing (download processing of music content) is satisfied. This MCIM transfer processing will be described in detail with reference to FIG. 15 to FIG. 18.

FIG. 14(c) shows a state in which the third wireless communication apparatus 140 is downloading the music content 431 from the information processing apparatus 400 using set MCIM. For example, the music content 431 is transmitted from the information processing apparatus 400 via the network 110 and the communication control apparatus (second communication operator) 120, and recorded in a memory 340 of the third wireless communication apparatus 140.

FIG. 14(d) shows a state in which transfer processing of rights of using MCIM from the third wireless communication apparatus 140 to the first wireless communication apparatus 300 has been performed. When download processing of the music content 431 from the information processing apparatus 400 ends, MCIM transfer processing (restoration processing) is performed. This MCIM transfer processing will be described in detail with reference to FIG. 15 to FIG. 18.

[Communication Example in Case of Performing Upload Processing of Music Content]

FIG. 15 to FIG. 18 are sequence charts showing a communication processing example between each apparatus included in the communication system 100 according to the second embodiment of the present technology.

In FIG. 15 to FIG. 18, description will be made assuming that the aforementioned group AB has been configured, and the first wireless communication apparatus 300 is holding rights of using MCIM. FIG. 15 to FIG. 18 show the communication processing example of a case of downloading music content purchased through a purchase operation from the information processing apparatus 400 to the third wireless communication apparatus 140 when the purchase operation of the music content has been performed using the first wireless communication apparatus 300.

In FIG. 15 to FIG. 18, it is assumed that the first wireless communication apparatus 300 is in a connected state (646) with the communication control apparatus (second communication operator) 120, and the third wireless communication apparatus 140 is in a connected state (645) with the communication control apparatus (first communication operator) 200. In addition, in FIG. 15 to FIG. 18, illustrations of the second wireless communication apparatus 130, the fourth wireless communication apparatus 150, and the like are omitted for convenience of description.

At first, as shown in FIG. 13(*a*), the music content purchase operation is performed by the user 60 using the first wireless communication apparatus 300 (647 to 649). In other words, communication processing (communication processing relating to the purchase of music content) is performed between the first wireless communication apparatus 300 and the information processing apparatus 400 via the communication control apparatus (second communication control apparatus) 120 (647 to 649). In this case, only purchase processing of music content is performed, and download processing of the purchased content is not performed.

In this way, when the music content purchase operation is performed by the first wireless communication apparatus 300 (647 to 649), the information processing apparatus 400 acquires group information from the communication control apparatus (first communication operator) 200 as shown in FIG. 13(*b*) (650 to 654).

Specifically, the information processing apparatus 400 transmits a group information acquisition request to the communication control apparatus (first communication operator) 200 (650 and 651). This group information acquisition request is a request for acquisition of information relating to the group to which the first wireless communication apparatus 300 belongs (group information), and includes terminal identification information on the first wireless communication apparatus 300.

When the communication control apparatus (first communication operator) 200 receives the group information acquisition request (651), the control unit 210 of the communication control apparatus (first communication operator) 200 extracts the group information according to the received group information acquisition request (652). Specifically, the control unit 210 extracts terminal identification information (PCID#1) included in the received group information acquisition request from the group management database 220. Then, the control unit 210 extracts the group (group AB) to which the wireless communication apparatus (first wireless communication apparatus 300) relating to the extracted terminal identification information (PCID#1) belongs. Then, the control unit 210 transmits the information (group information) relating to the extracted group (group AB) to the information processing apparatus 400 (653 and 654).

When the group information is received (654), the information processing apparatus 400 transmits the received group information to the first wireless communication apparatus 300 as shown in FIG. 13(*c*) (655 to 658). In this case, the first wireless communication apparatus 300 is in the connected state (646) with the communication control apparatus (second communication operator) 120. For this reason, the group information is transmitted from the information processing apparatus 400 to the first wireless communication apparatus 300 via the communication control apparatus (second communication operator) 120 (655 to 658).

When the first wireless communication apparatus 300 receives the group information (658), the control unit 330 of the first wireless communication apparatus 300 causes the display unit 370 to display the received group information as shown in FIG. 13(*d*) (659). For example, the storage location selection screen 520 shown in FIG. 12 is displayed as the group information (659).

Subsequently, in a state in which the group information is being displayed, a selection operation of a storage location to store the content purchased by the user is performed (660). For example, in a state in which the storage location selection screen 520 shown in FIG. 12 is being displayed, the third wireless communication apparatus 140 is selected, and an operation of confirming the selection (selection operation of the content storage location) is performed (660).

In this way, when the selection operation of a content storage location is performed (660), the control unit 330 of the first wireless communication apparatus 300 transmits selection information relating to the selection operation to the information processing apparatus 400 as shown in FIG. 14(*a*) (661 to 664). The selection information includes terminal identification information on the wireless communication apparatus selected as the content storage location and terminal identification information on a transmission source (content purchase source), and these pieces of terminal identification information are held in association with information on the purchased content (content purchase information). In this case, the first wireless communication apparatus 300 is in the connected state (646) with the communication control apparatus (second communication operator) 120. For this reason, the selection information is transmitted from the first wireless communication apparatus 300 to the information processing apparatus 400 via the communication control apparatus (second communication operator) 120 (661 to 664).

When the information processing apparatus 400 receives the selection information (664), the control unit 450 of the information processing apparatus 400 transmits a notification that MCIM is transferred (MCIM transfer notification) to the wireless communication apparatus (first wireless communication apparatus 300) having performed the content purchase operation (665 to 668).

Subsequently, the control unit 450 of the information processing apparatus 400 transmits an MCIM transfer request to the communication control apparatus (first communication operator) 200 (669 and 670). This MCIM transfer request is a request to transfer rights of using MCIM from the wireless communication apparatus (first wireless communication apparatus 300) having performed the content purchase operation to the wireless communication apparatus (third wireless communication apparatus 140) selected as the content storage location. Here, the wireless communication apparatus (first wireless communication apparatus 300) having performed the content purchase operation and the wireless communication apparatus (third wireless communication apparatus 140) selected as the content storage location are decided based on the terminal identification information included in the selection information.

Subsequently, transfer processing of rights of using MCIM from the wireless communication apparatus (first wireless communication apparatus 300) having performed the content purchase operation to the wireless communication apparatus (third wireless communication apparatus 140) selected as the content storage location is performed (671 to 687). This transfer processing is approximately the same as the transfer processing (606 to 622) shown in FIG. 9 and FIG. 10, and thus description will be omitted here.

Also, the control unit 450 of the information processing apparatus 400 transmits a storage location state check request to the communication control apparatus (first communication operator) 200 (688 and 689). This storage location state check request is a request to check a state of the wireless communication apparatus (third wireless communication apparatus 140) selected as the content storage location (a hold state of rights of using MCIM).

When the communication control apparatus (first communication operator) 200 receives the storage location state check request (689), the control unit 210 of the communication control apparatus (first communication operator) 200 checks the state of the third wireless communication apparatus 140 (the hold state of rights of using MCIM) (690). Specifically, the control unit 210 checks the content of the group management database 220, thereby checking whether or not rights of using MCIM have been set for the third wireless communication apparatus 140 (690).

Subsequently, the control unit 210 of the communication control apparatus (first communication operator) 200 transmits check results corresponding to the storage location state check request to the information processing apparatus 400 (691 and 692). In this example, rights of using MCIM have been set for the third wireless communication apparatus 140, and thus check results of this are transmitted to the information processing apparatus 400 (691 and 692).

When the information processing apparatus 400 receives the check results that rights of using MCIM have been set for the third wireless communication apparatus 140 (692), download processing of the purchased music content is performed (693 to 695). In other words, communication processing is performed between the third wireless communication apparatus 140 and the information processing apparatus 400 via the communication control apparatus (second communication operator) 120 (693 to 695). Specifically, download processing of the music content (purchased music content) stored in the storage unit 430 of the information processing apparatus 400 to the third wireless communication apparatus 140 is performed (693 to 695). Then, the control unit 330 of the third wireless communication apparatus 140 causes the memory 340 to record the music content transmitted from the information processing apparatus 400 through the download processing (696).

Subsequently, when the download processing ends (693 to 695), the control unit 450 of the information processing apparatus 400 transmits an MCIM transfer request to the communication control apparatus (first communication operator) 200 (697 and 698). This MCIM transfer request is a request to transfer rights of using MCIM from the wireless communication apparatus (third wireless communication apparatus 140) having performed the download processing to the wireless communication apparatus (first wireless communication apparatus 300) having performed the content purchase operation. The wireless communication apparatus (first wireless communication apparatus 300) having performed the content purchase operation and the wireless communication apparatus (third wireless communication apparatus 140) having performed the download operation are decided based on the two pieces of terminal identification information that are in association with the content purchase information.

Subsequently, transfer processing of rights of using MCIM from the wireless communication apparatus (third wireless communication apparatus 140) having performed the download processing to the wireless communication apparatus (first wireless communication apparatus 300) having performed the content purchase operation is performed (699 to 715). This transfer processing is approximately the same as the transfer processing (671 to 687) described above except that the transfer location and the transfer source are exchanged, and thus description will be omitted here.

Also, the control unit 450 of the information processing apparatus 400 transmits a storage location state check request to the communication control apparatus (first communication operator) 200 (716 and 717). This storage location state check request is a request to check a state of the wireless communication apparatus (first wireless communication apparatus 300) having performed the content purchase operation (the hold state of rights of using MCIM).

When the communication control apparatus (first communication operator) 200 receives the storage location state check request (717), the control unit 210 of the communication control apparatus (first communication operator) 200 checks the state of the first wireless communication apparatus 300 (the hold state of rights of using MCIM) (718). This checking is the same as the check processing (690) described above, and thus description will be omitted here.

Subsequently, the control unit 210 of the communication control apparatus (first communication operator) 200 transmits check results corresponding to the storage location state check request to the information processing apparatus 400 (719 and 720). In this example, rights of using MCIM have been set for the first wireless communication apparatus 300, and thus check results of this are transmitted to the information processing apparatus 400 (719 and 720).

When the information processing apparatus 400 receives the check results that rights of using MCIM have been set for the first wireless communication apparatus 300 (720), a download completion notification is transmitted (721 and 722). In other words, the control unit 450 of the information processing apparatus 400 transmits the download completion notification to the wireless communication apparatus (first wireless communication apparatus 300) having performed the content purchase operation (721 and 722).

When the first wireless communication apparatus 300 receives the download completion notification (722), the control unit 330 of the first wireless communication apparatus 300 causes the display unit 370 to display that the download of the purchased music content has been completed (723).

In this way, when it is determined that a predetermined condition is satisfied, the control unit 330 of the first wireless communication apparatus 300 controls connection rights to be transferred to the third wireless communication apparatus 140. Here, the case in which the predetermined condition is satisfied is, for example, a case in which the content purchase operation (647 to 649) and the selection operation of the content storage location (660) have been performed. Also, the control unit 330 of the first wireless communication apparatus 300 controls download processing of downloading music content from the information processing apparatus 400 to the third wireless communication apparatus 140 to be performed as communication processing. When the third wireless communication apparatus 140 has received MCIM setting information (682), the predetermined condition may be determined to be satisfied.

The operation unit 360 of the first wireless communication apparatus 300 receives a determination operation (selection operation) of determining a wireless communication apparatus (third wireless communication apparatus 140) to perform the download operation from among a plurality of wireless communication apparatuses included in the group AB. In other words, the control unit 330 of the first wireless communication apparatus 300 acquires group information (including terminal identification information) from the communication control apparatus (first communication operator) 200 via the information processing apparatus 400. Then, the control unit 330 causes the display unit 370 to display a selection screen (for example, the storage location selection screen 520 shown in FIG. 12) for selecting the third wireless communication apparatus 140 from among the plurality of wireless communication apparatuses included in the group AB based on the group information. Also, the control unit 330 of the first wireless communication apparatus 300 determines a wireless communication apparatus selected in the selection screen by a user operation as a wireless communication apparatus to perform the download processing.

The control unit 450 of the information processing apparatus 400 acquires the group information (including terminal identification information) from the communication control apparatus (first communication operator) 200, and controls the acquired group information to be transmitted to the first wireless communication apparatus 300. In other words, the acquired group information is transmitted as information for causing the display unit 370 of the first wireless communication apparatus 300 to display the aforementioned selection screen (for example, the storage location selection screen 520 shown in FIG. 12).

In this way, in the second embodiment of the present technology, MCIM transfer processing is performed according to an event (content purchase operation) in a wireless communication apparatus holding MCIM. In other words, it is possible to realize application-oriented transfer processing of rights of using MCIM and automatic application execution. Also, it is possible to provide a mechanism capable of sharing group information (information relating to a wireless communication apparatus capable of sharing MCIM) managed by the communication control apparatus (first communication operator) 200 with an external service (information processing apparatus 400) and a wireless communication apparatus.

[Operational Example of Wireless Communication Apparatus (Operation Device)]

Figure 19:
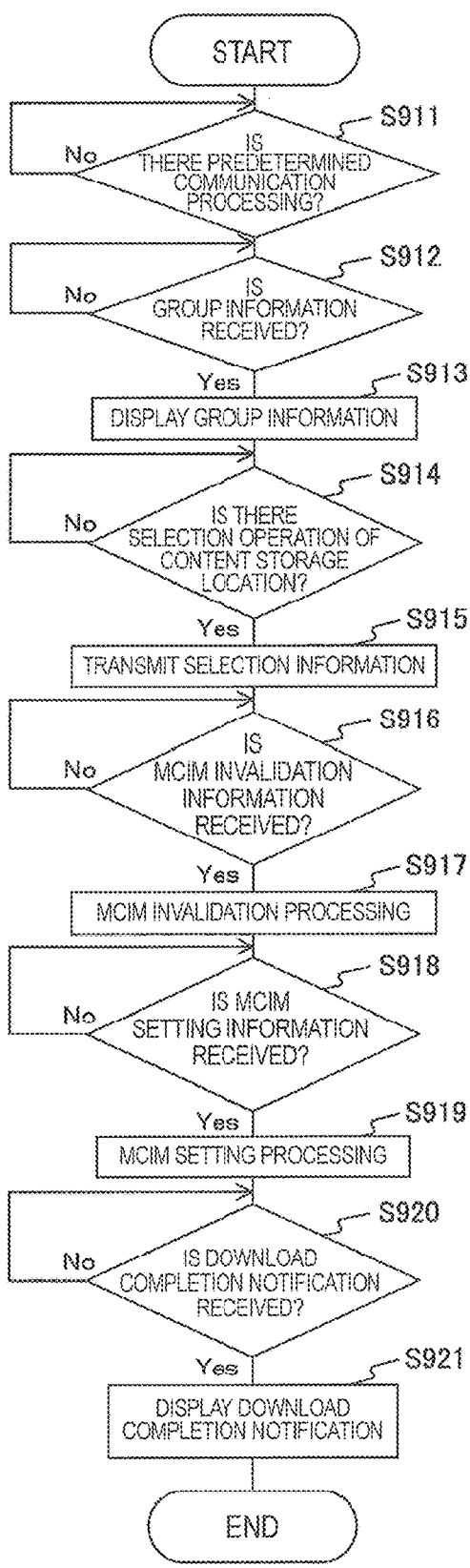
FIG. 19 is a flow chart showing an example of the processing procedure for communication processing by the first wireless communication apparatus 300 according to the second embodiment of the present technology.

FIG. 19 is a flow chart showing an example of the processing procedure for communication processing by the first wireless communication apparatus 300 according to the second embodiment of the present technology.

At first, the control unit 330 decides whether or not predetermined communication processing (for example, purchase processing of music content) is being performed (step S911), and continues monitoring when the predetermined communication is not being performed.

When the predetermined communication is being performed (step S911), the control unit 330 decides whether or not group information has been received (step S912), and continues monitoring when group information has not been received. On the other hand, when group information has been received (step S912), the control unit 330 causes the display unit 370 to display the received group information (step S913). For example, the storage location selection screen 520 shown in FIG. 12 is displayed as the group information (step S913).

Subsequently, the control unit 330 decides whether or not a selection operation of a storage location to store the content purchased by a user has been performed (S914). When the selection operation has not been performed, the control unit 330 continues monitoring. On the other hand, when the selection operation has been performed (step S914), the control unit 330 transmits selection information relating to the selection operation to the information processing apparatus 400 (step S915).

Subsequently, the control unit 330 decides whether or not MCIM invalidation information has been received (step S916), and continues monitoring when MCIM invalidation information has not been received. Also, when MCIM invalidation information has been received (step S916), the control unit 330 performs invalidation processing of MCIM stored in the MCIM information storage unit 350 (step S917).

Subsequently, the control unit 330 decides whether or not MCIM setting information has been received (step S918), and continues monitoring when MCIM setting information has not been received. Also, when MCIM setting information has been received (step S918), the control unit 330 performs setting processing (for example, validation processing) of MCIM stored in the MCIM information storage unit 350 (step S919).

Subsequently, the control unit 330 decides whether or not a download completion notification has been received (step S920), and continues monitoring when a download completion notification has not been received. On the other hand, when a download completion notification has been received (step S920), the control unit 330 causes the display unit 370 to display the received download completion notification (step S921).

[Operational Example of Wireless Communication Apparatus (Content Storage Location Device)]

Figure 20:
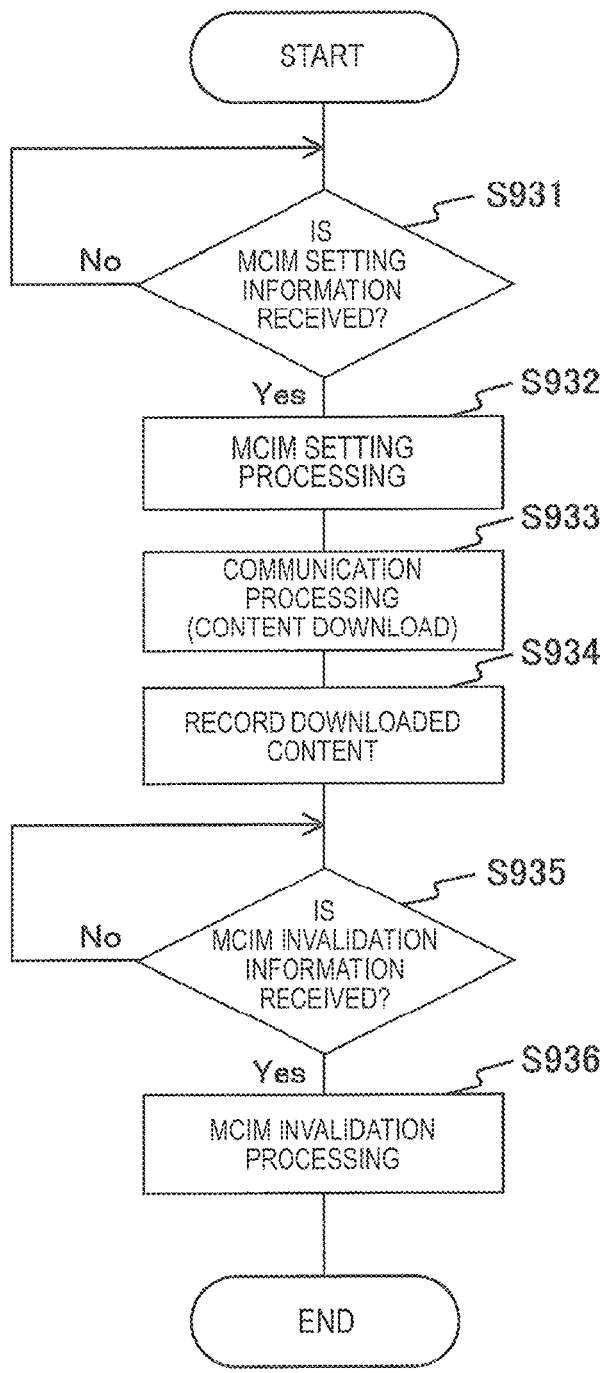
FIG. 20 is a flow chart showing an example of a processing procedure for communication processing by a third wireless communication apparatus 140 according to the second embodiment of the present technology.

FIG. 20 is a flow chart showing an example of a processing procedure for communication processing by the third wireless communication apparatus 140 according to the second embodiment of the present technology.

At first, the control unit 330 of the third wireless communication apparatus 140 decides whether or not MCIM setting information has been received (step S931), and continues monitoring when MCIM setting information has not been received. Also, when MCIM setting information has been received (step S931), the control unit 330 of the third wireless communication apparatus 140 performs setting processing (for example, validation processing) of MCIM stored in the MCIM information storage unit 350 of the third wireless communication apparatus 140 (step S932).

Subsequently, the control unit 330 of the third wireless communication apparatus 140 performs download processing of purchased music content (step S933). In other words, communication processing (download processing) is performed between the third wireless communication apparatus 140 and the information processing apparatus 400 via the communication control apparatus (second communication operator) 120 (step S933). Subsequently, the control unit 330 of the third wireless communication apparatus 140 causes the memory 340 to record the music content transmitted from the information processing apparatus 400 through the download processing (step S934).

Subsequently, the control unit 330 of the third wireless communication apparatus 140 decides whether or not MCIM invalidation information has been received (step S935), and continues monitoring when MCIM invalidation information has not been received. Also, when MCIM invalidation information has been received (step S935), the control unit 330 of the third wireless communication apparatus 140 performs invalidation processing of MCIM stored in the MCIM information storage unit 350 of the third wireless communication apparatus 140 (step S936).

<3. Third Embodiment>

The first and second embodiments of the present technology show examples of performing MCIM transfer processing immediately after user operations are performed in wireless communication apparatuses. In other words, examples of rapidly performing MCIM transfer processing by the lead of user applications have been shown. However, it is also assumed that, according to the type of a download or an upload and a user, the processing may not be performed immediately after user operations. In this case, it is conceivable that radio resources can be efficiently used by performing the processing in a period of time in which there are spare radio resources (for example, a period of time in which the resource use cost of a download or an upload is low) based on control of a network side.

Accordingly, a third embodiment of the present technology shows an example of performing MCIM transfer processing based on control of a network side to perform processing of a download, an upload, and the like. In the third embodiment of the present technology, a configuration of a communication system is approximately the same as the example of FIG. 3 or the like. For this reason, description of parts that are common to the third embodiment and the first embodiment of the present technology will be partially omitted.

[Example of Display of Timing Selection Screen]

Figure 21:
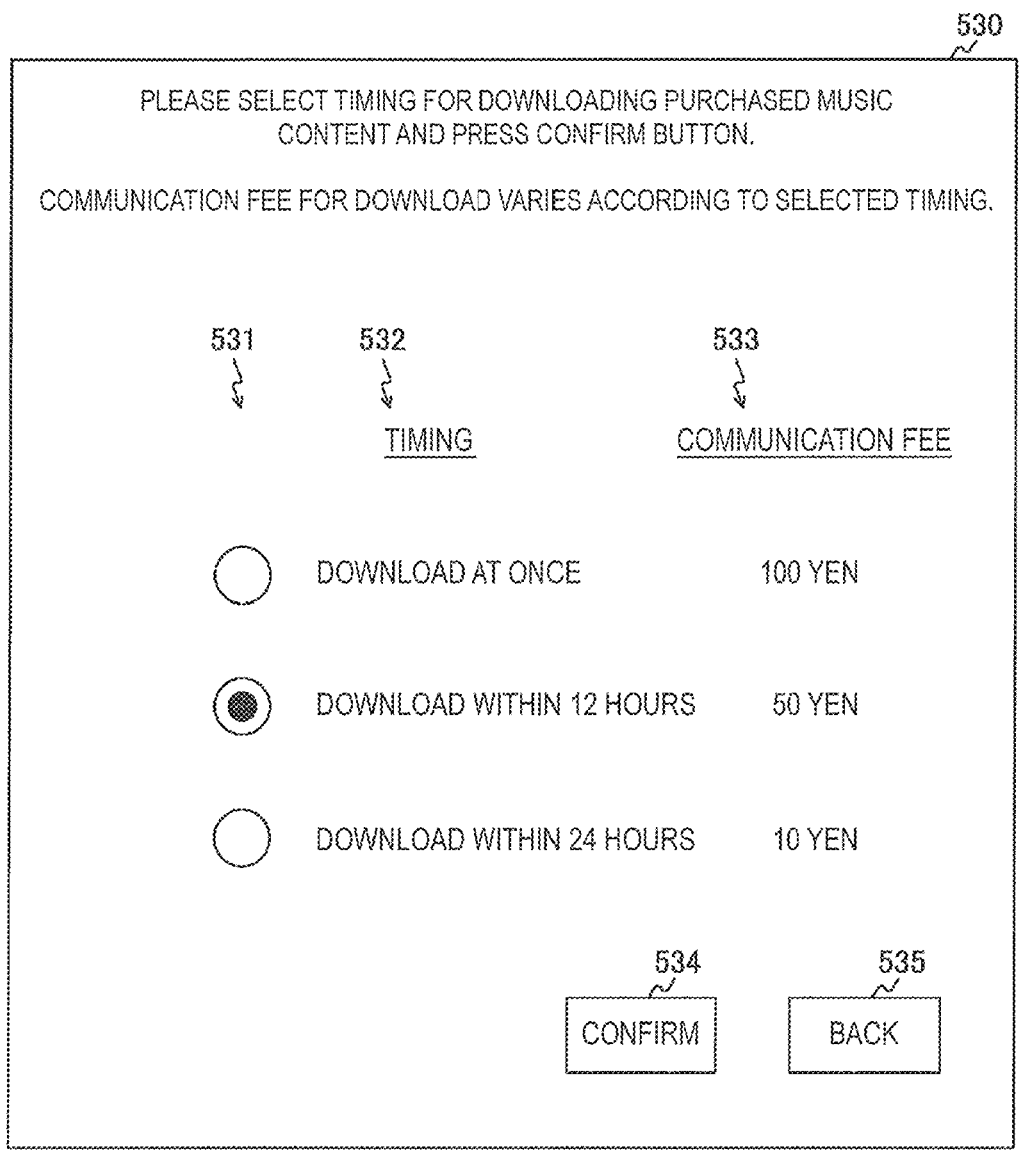
FIG. 21 is a diagram showing an example of a display screen (a timing selection screen 530) displayed on a display unit 370 of a first wireless communication apparatus 300 according to a third embodiment of the present technology.

FIG. 21 is a diagram showing an example of a display screen (a timing selection screen 530) displayed on a display unit 370 of a first wireless communication apparatus 300 according to the third embodiment of the present technology.

The timing selection screen 530 is a display screen for selecting a timing for downloading music content purchased through operation of the first wireless communication apparatus 300 to a wireless communication apparatus. For example, the timing selection screen 530 is displayed after a selection operation in the storage location selection screen 520 shown in FIG. 12 ends.

Specifically, in the timing selection screen 530, a timing selection area 531, a timing display area 532, a communication fee display area 533, a confirm button 534, and a back button 535 are provided.

In the timing selection area 531, radio buttons for selecting a timing for downloading the purchased music content to a wireless communication apparatus selected as a storage location are displayed. For example, when a timing selection operation has been performed, a black circle is added to a radio button of the timing selection area 531 corresponding to the selected timing.

In the timing display area 532, timings of downloading the purchased music content to the wireless communication apparatus selected as the storage location are displayed. In FIG. 21, as the timings of downloading the purchased music content, download at once, download within 12 hours, and download within 24 hours are displayed.

In the communication fee display area 533, communication fees charged in the case of downloading the purchased music content at the timings displayed in the timing display area 532 are displayed. FIG. 21 shows an example in which a communication fee decreases as a timing for performing the download is delayed The confirm button 534 is a button pressed to confirm a timing selection operation after the timing selection operation is performed in the timing selection screen 530.

The back button 535 is a button pressed, for example, to return to a display screen that has been displayed immediately before.

[Example of Storage of Music Content]

Figure 22:
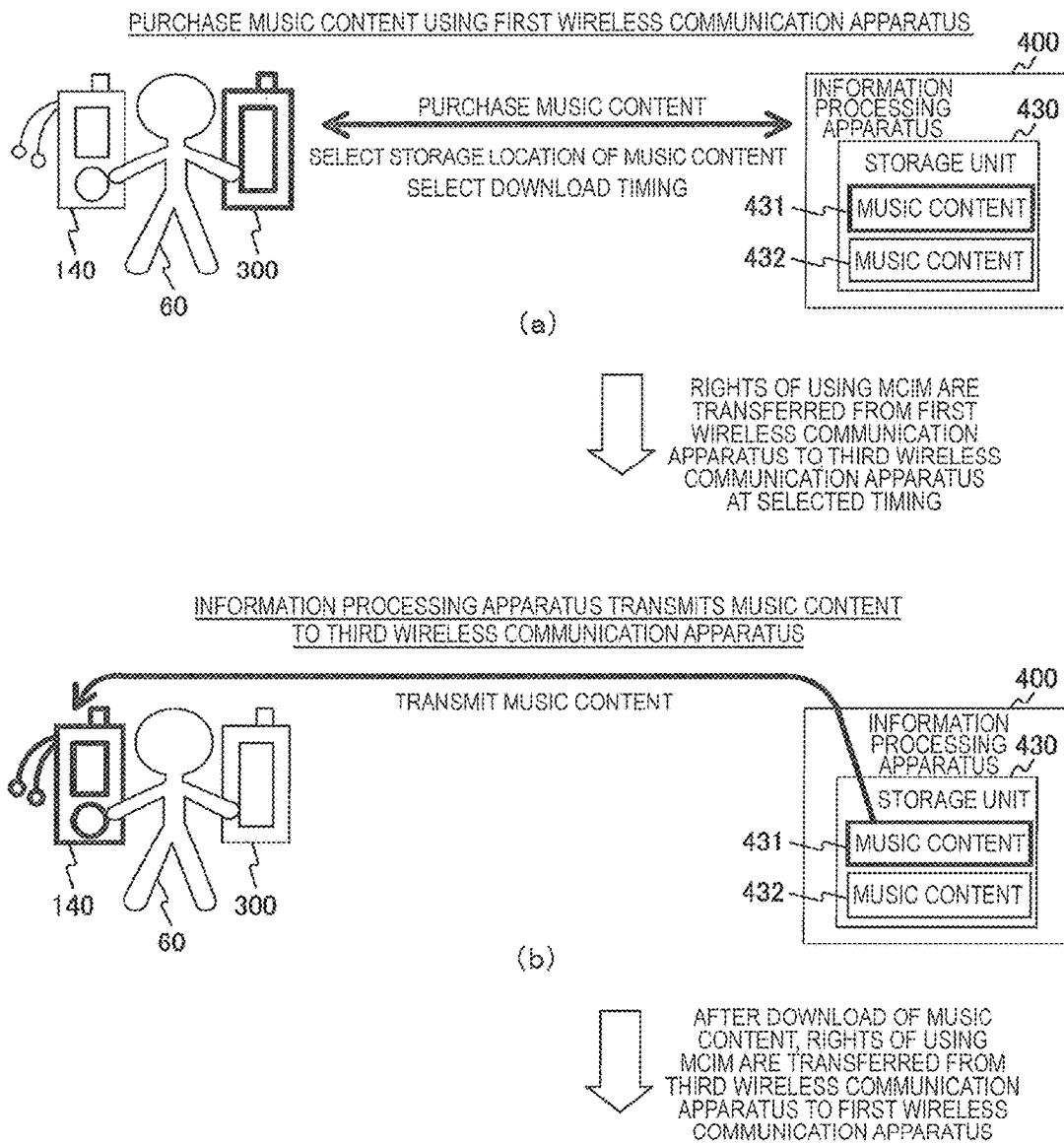
FIG. 22 is a diagram showing the flow of a case of storing music content purchased through a purchase operation using the first wireless communication apparatus 300 in a third wireless communication apparatus 140 according to the third embodiment of the present technology in a simplified manner.

FIG. 22 is a diagram showing the flow of a case of storing music content purchased through a purchase operation using the first wireless communication apparatus 300 in a third wireless communication apparatus 140 according to the third embodiment of the present technology in a simplified manner An example shown in FIG. 22 is a modified example of FIG. 13 and FIG. 14, and differs in that transfer processing of rights of using MCIM and download processing of music content by the third wireless communication apparatus 140 are performed at timings selected by a user. Accordingly, in FIG. 22, illustration and description of parts that are common to FIG. 22, FIG. 13 and FIG. 14 will be partially omitted, and description will be mainly made regarding differences from FIG. 13 and FIG. 14.

FIG. 22(a) shows a state in which a music content purchase operation, a selection operation of a music content storage place, and a selection operation of a timing for downloading the music content are being performed using the first wireless communication apparatus 300. The music content purchase operation and the selection operation of a music content storage place are processing corresponding to FIG. 13(a) to FIG. 14(a).

Also, when the selection operation of the timing for downloading the music content is performed, timing information is transmitted from the information processing apparatus 400 to the first wireless communication apparatus 300, and this timing information is displayed in the first wireless communication apparatus 300. This timing information is information for causing, for example, the timing selection screen 530 shown in FIG. 21 to be displayed. As the timing information, for example, the timing selection screen 530 shown in FIG. 21 is displayed.

In the timing selection screen 530, the selection operation of selecting the timing for downloading the purchased music content is performed. In this example, it is assumed that the selection operation of selecting "download within 12 hours" has been performed. In this way, information relating to the timing selected in the timing selection screen 530 is transmitted from the first wireless communication apparatus 300 to the information processing apparatus 400 as timing selection information.

When the received timing selection information is a timing other than "download at once," the information processing apparatus 400 transmits a timing relating to the timing selection information to the communication control apparatus (first communication operator) 200 as reservation information. When this reservation information is received, the control unit 210 of the communication control apparatus (first communication operator) 200 records the reservation information in association with a content storage location. For example, a reception time of the reservation information is recorded in the reservation reception time 227 shown in FIG. 4, and a timing relating to the reservation information (for example, within 12 hours or within 24 hours) is recorded in the timing information 228 shown in FIG. 4.

FIG. 22(b) shows a state in which the third wireless communication apparatus 140 is downloading music content 431 from the information processing apparatus 400 using set MCIM.

The communication control apparatus (first communication operator) 200 monitors whether or not a communication environment between the storage location (third wireless communication apparatus 140) and the communication control apparatus (second communication operator) 120 satisfies a fixed condition based on content of the group management database 220. For example, the communication control apparatus (first communication operator) 200 sequentially acquires communication environment information from the communication control apparatus (second communication operator) 120, and monitors whether or not the communication environment satisfies the fixed condition. A case of the communication environment satisfying the fixed condition is, for example, a period of time in which the usage load of the communication control apparatus (second communication operator) 120 is light, or a period of time in which the network load of the side of the communication control apparatus (second communication operator) 120 is light. This period of time in which the network load is light can be obtained by, for example, polling a network load state. Also, a case of the communication environment satisfying the fixed condition can be set as a predetermined period of time (for example, around 3 a.m.).

When it is decided that the communication environment between the storage location (third wireless communication apparatus 140) and the communication control apparatus (second communication operator) 120 satisfies the fixed condition, the communication control apparatus (first communication operator) 200 exercises control for transfer processing of rights of using MCIM. Specifically, the communication control apparatus (first communication operator) 200 outputs an instruction for transferring rights of using MCIM from the first wireless communication apparatus 300 to the third wireless communication apparatus 140 (transfer instruction) to the communication control apparatus (second communication operator) 120. After MCIM is set for the third wireless communication apparatus 140 based on the transfer instruction, the third wireless communication apparatus 140 downloads the music content 431 from the information processing apparatus 400.

After the end of the download of the music content 431, the rights of using the MCIM are transferred from the third wireless communication apparatus 140 to the first wireless communication apparatus 300.

In addition, when the communication environment between the storage location (third wireless communication apparatus 140) and the communication control apparatus (second communication operator) 120 does not satisfy the fixed condition within the time of a selected timing, the transfer processing and the download processing described above are performed upon lapse of the time.

[Communication Example in Case of Performing Upload Processing at Selected Timing]

Figure 23:
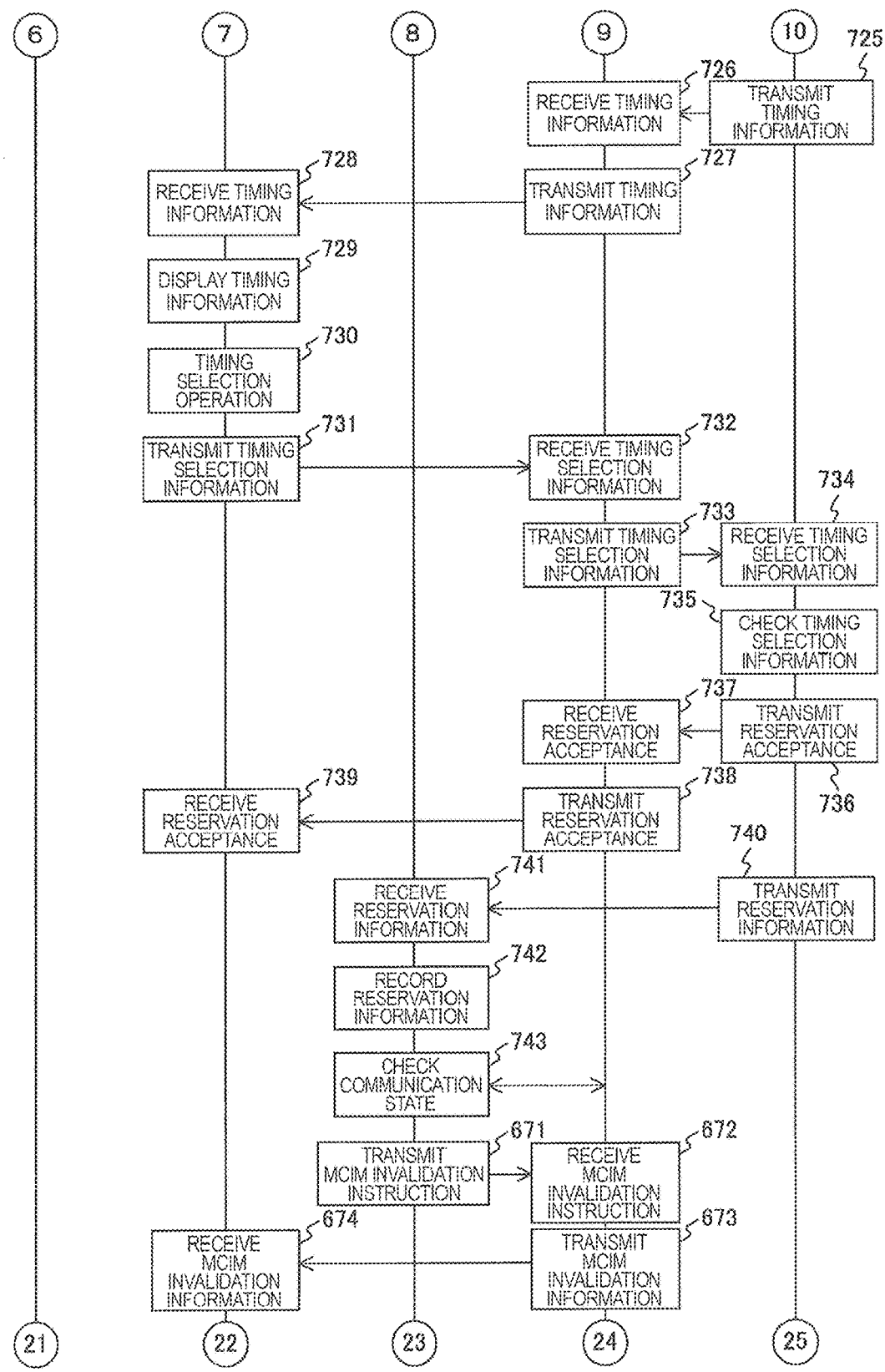
FIG. 23 is a sequence chart showing a communication processing example between each apparatus included in the communication system 100 according to the third embodiment of the present technology.
Figure 24:
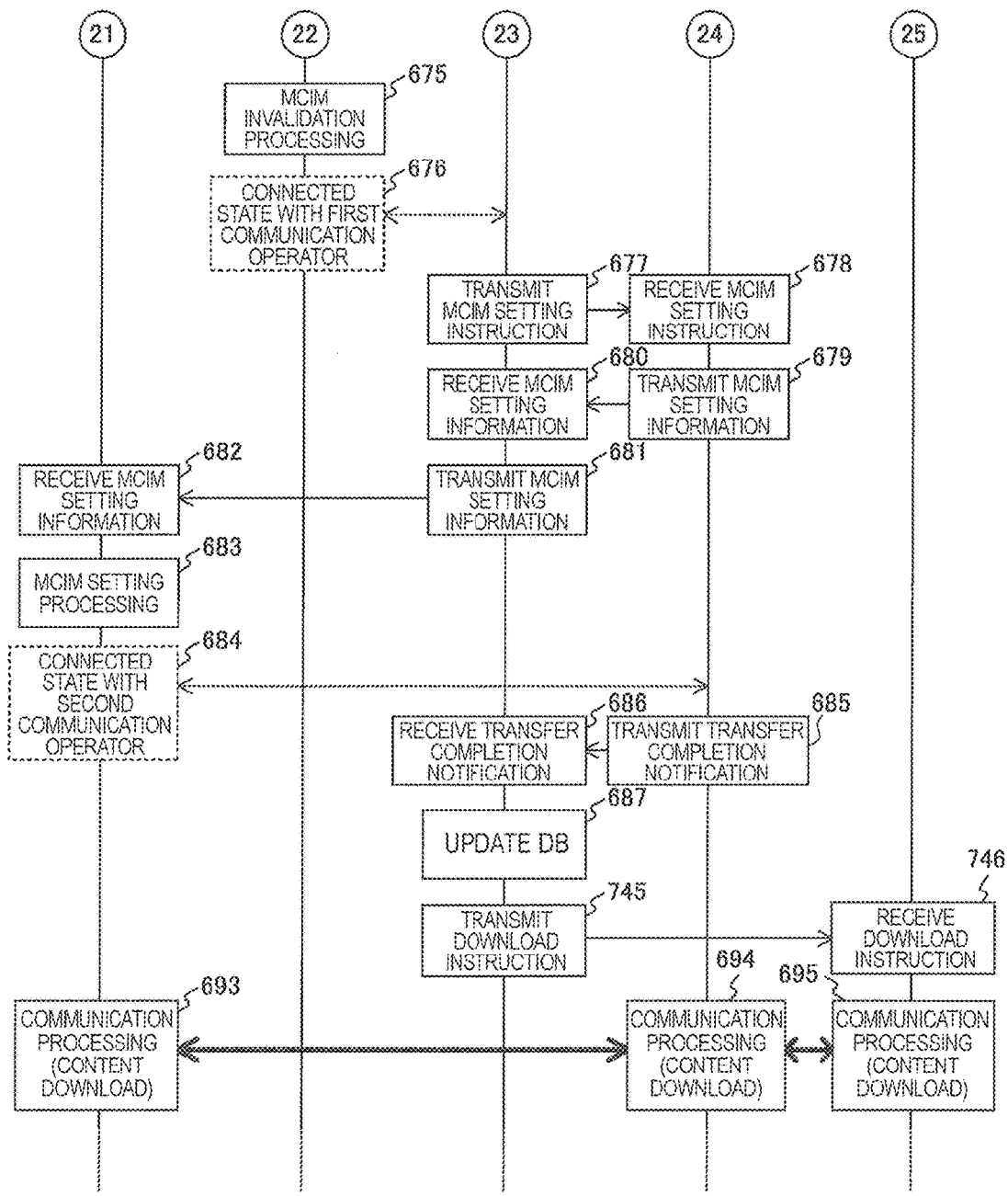
FIG. 24 is a sequence chart showing a communication processing example between each apparatus included in the communication system 100 according to the third embodiment of the present technology.

FIG. 23 and FIG. 24 are sequence charts showing a communication processing example between each apparatus included in the communication system 100 according to the third embodiment of the present technology.

An example shown in FIG. 23 and FIG. 24 is a modified example of FIG. 15 to FIG. 18, and differs in that transfer processing of rights of using MCIM and download processing of music content by the third wireless communication apparatus 140 are performed at timings selected by a user. Accordingly, in FIG. 23 and FIG. 24, parts that are common to FIG. 23, FIG. 24, and FIG. 15 to FIG. 18 will be given the same reference numbers, and description thereof will be partially omitted. Also, in FIG. 23 and FIG. 24, description will be mainly made regarding differences from FIG. 15 to FIG. 18.

Figure 15:
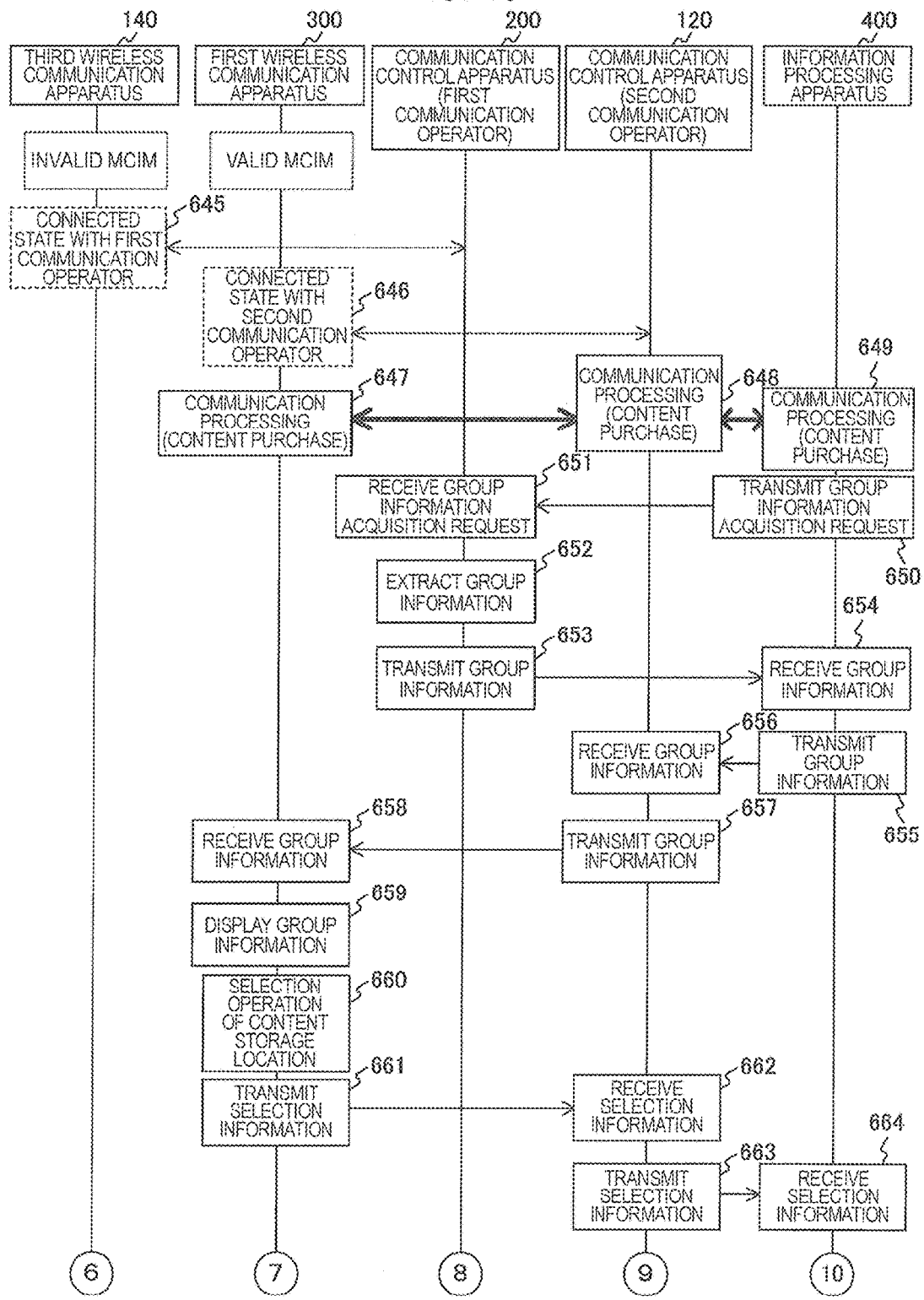
FIG. 15 is a sequence chart showing a communication processing example between each apparatus included in the communication system 100 according to the second embodiment of the present technology.

At first, as shown in FIG. 22(*a*), a purchase operation of music content and a selection operation of a music content storage place are performed (the processing shown in FIG. 15 (647 to 664)).

Subsequently, as shown in FIG. 15, when the information processing apparatus 400 receives the selection information (664), the control unit 450 of the information processing apparatus 400 transmits timing information to the first wireless communication apparatus 300 (725 to 728). In this case, the first wireless communication apparatus 300 is in the connected state (646) with the communication control apparatus (second communication operator) 120. For this reason, the timing information is transmitted from the information processing apparatus 400 to the first wireless communication apparatus 300 via the communication control apparatus (second communication operator) 120 (725 to 728).

When the first wireless communication apparatus 300 receives the timing information (728), the control unit 330 of the first wireless communication apparatus 300 causes the display unit 370 to display the received timing information (729). For example, the timing selection screen 530 shown in FIG. 21 is displayed as the timing information (729).

Subsequently, in the state in which the timing information is being displayed, a user performs a selection operation of selecting a timing for storing the purchased content (730). For example, in a state in which the timing selection screen 530 shown in FIG. 21 is being displayed, "download within 12 hours" is selected, and an operation of confirming the selection (timing selection operation) is performed (730).

In this way, when the timing selection operation has been performed (730), the control unit 330 of the first wireless communication apparatus 300 transmits timing selection information relating to the selection operation to the information processing apparatus 400 (731 to 734). In this case, the first wireless communication apparatus 300 is in the connected state (646) with the communication control apparatus (second communication operator) 120. For this reason, the selection information is transmitted from the first wireless communication apparatus 300 to the information processing apparatus 400 via the communication control apparatus (second communication operator) 120 (731 to 734).

When the information processing apparatus 400 receives the timing selection information (734), the control unit 450 of the information processing apparatus 400 checks whether or not the received timing selection information is "download at once" (735). When the received timing selection information is "download at once," transfer processing of rights of using MCIM and download processing of the music content by the third wireless communication apparatus 140 are immediately performed as shown in FIG. 15 to FIG. 18. On the other hand, when the received timing selection information is not "download at once," the transfer processing of rights of using MCIM and the download processing of the music content are performed at the timing (for example, within 12 hours or within 24 hours).

Accordingly, the control unit 450 of the information processing apparatus 400 transmits a notification (reservation acceptance) that a reservation for downloading the music content at the timing selected by the user is made to the first wireless communication apparatus 300 (736 to 739).

Also, the control unit 450 of the information processing apparatus 400 transmits a timing relating to the received timing selection information (for example, within 12 hours or within 24 hours) to the communication control apparatus (first communication operator) 200 as reservation information (740 and 741). This reservation information includes terminal identification information on a wireless communication apparatus having performed the content purchase operation and a wireless communication apparatus of a content storage location.

When the communication control apparatus (first communication operator) 200 receives the reservation information (741), the control unit 210 of the communication control apparatus (first communication operator) 200 records the reservation information in the group management database 220 in association with the storage location (742). For example, a reception time of the reservation information is recorded in the reservation reception time 227 shown in FIG. 4, and the timing relating to the reservation information (for example, within 12 hours or within 24 hours) is recorded in the timing information 228 shown in FIG. 4 (742).

Also, the control unit 210 of the communication control apparatus (first communication operator) 200 checks a communication state of the communication control apparatus (second communication operator) 120 regularly or irregularly (743).

When it is determined that a communication environment between the storage location (third wireless communication apparatus 140) and the communication control apparatus (second communication operator) 120 satisfies a fixed condition (or when it is a time limit) (743), transfer processing of rights of using MCIM is performed (671 to 687). In other words, when it is determined that the fixed condition is satisfied (743), the transfer processing of rights of using MCIM is performed (671 to 687). This transfer processing of rights of using MCIM is transfer processing from the wireless communication apparatus (first wireless communication apparatus 300) having performed the content purchase operation and the wireless communication apparatus (third wireless communication apparatus 140) having been selected as the content storage location. However, in the case of reservation processing, it is also assumed that the user is transferring rights of using MCIM to a wireless communication apparatus other than the wireless communication apparatus relating to the reservation for other reasons. In this case, it is assumed that the transfer processing of rights of using MCIM means transfer processing from a wireless communication apparatus that holds valid MCIM at the time of execution to the wireless communication apparatus (third wireless communication apparatus 140) having been selected as the content storage location. When this transfer processing of rights of using MCIM ends (687), the control unit 210 of the communication control apparatus (first communication operator) 200 transmits an instruction for starting a download (download instruction) to the information processing apparatus 400 (745 and 746).

When the information processing apparatus 400 receives the download instruction (746), download processing of the purchased music content is performed (693 to 695). Since respective types of subsequent processing are the same as the respective types of processing (696 to 723) shown in FIG. 15 to FIG. 18, illustration and description will be omitted.

In this way, the operation unit 360 of the first wireless communication apparatus 300 receives the determination operation (selection operation) of determining a timing for performing the download processing of the purchased music content. Also, the control unit 330 of the first wireless communication apparatus 300 controls the storage location of the purchased music content (third wireless communication apparatus 140) to perform the download processing at the determined timing.

In this way, in the third embodiment of the present technology, it is possible to upload or download content that does not demand immediacy (for example, music content or image content) in a period of time in which the cost or the load of wireless communication is light. In this case, a communication operator or a service provider can automatically assign connection rights to a wireless communication apparatus (device) that is a target. Also, when processing, such as an upload, a download, or the like, that is an object ends, it is possible to automatically return the connection rights to a wireless communication apparatus of a transfer source.

[Operational Example of Wireless Communication Apparatus (Operation Device)]

Figure 25:
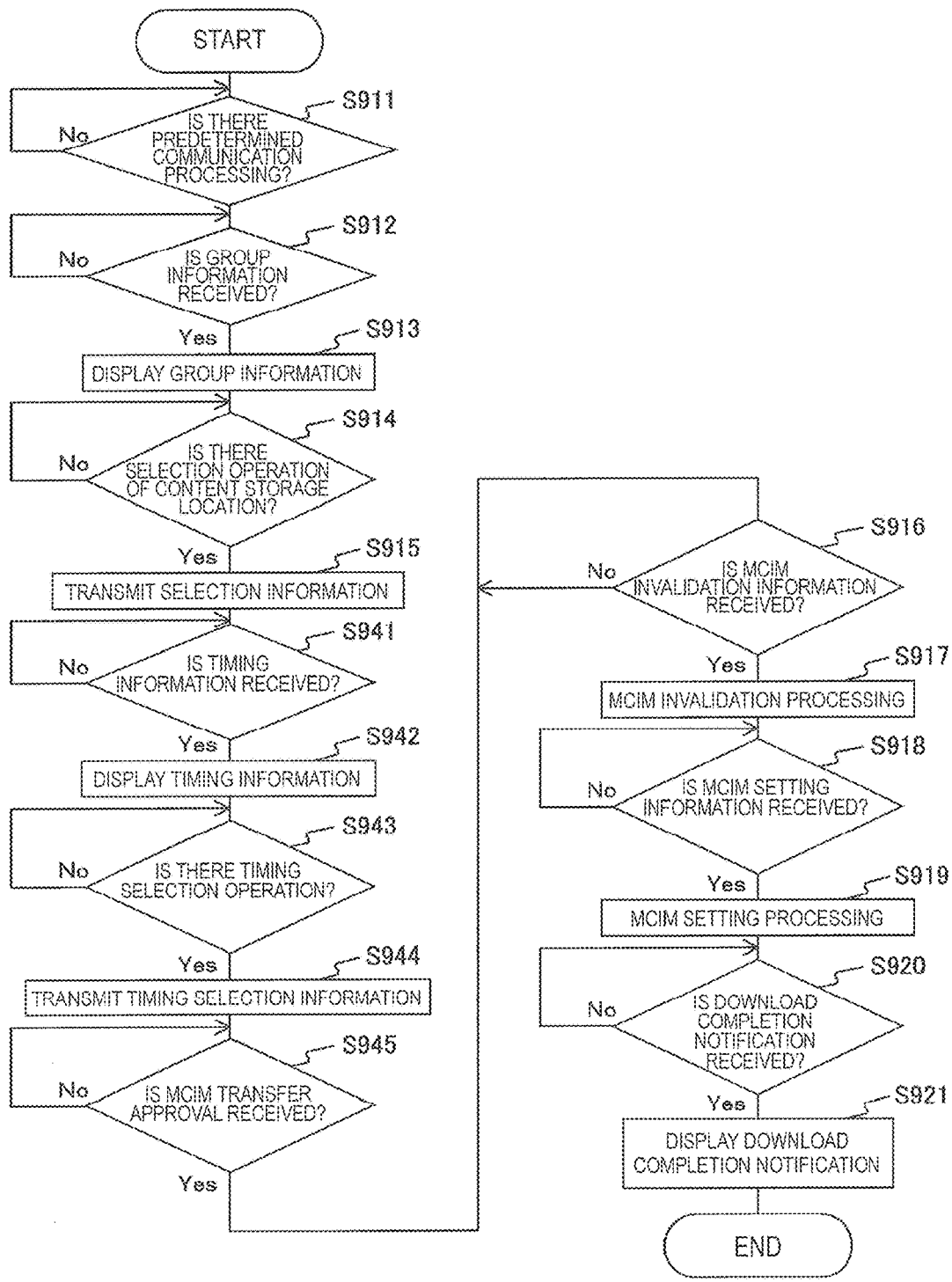
FIG. 25 is a flow chart showing an example of the processing procedure for communication processing by the first wireless communication apparatus 300 according to the third embodiment of the present technology.

FIG. 25 is a flow chart showing an example of the processing procedure for communication processing by the first wireless communication apparatus 300 according to the third embodiment of the present technology. Since FIG. 25 is a modified example of FIG. 19, parts that are common to FIG. 25 and FIG. 19 will be given the same reference numbers, and description thereof will be partially omitted.

After transmitting selection information to the information processing apparatus 400 (step S915), the control unit 330 decides whether or not timing information has been received (step S941), and continues monitoring when timing information has not been received (step S941). On the other hand, when timing information has been received (step S941), the control unit 330 causes the display unit 370 to display the received timing information (step S942). For example, the timing selection screen 530 shown in FIG. 21 is displayed as the timing information (step S942).

Subsequently, in a state in which the timing information is being displayed, the control unit 330 decides whether or not a selection operation of a timing for storing content purchased by a user has been performed (step S943), and continues monitoring when the selection operation has not been performed. On the other hand, when the selection operation has been performed (step S943), the control unit 330 transmits timing selection information relating to the selection operation to the information processing apparatus 400 (step S944).

Subsequently, the control unit 330 decides whether or not an MCIM transfer approval has been received (step S945), and continues monitoring when an MCIM transfer approval has not been received. On the other hand, when an MCIM transfer approval has been received (step S945), the process proceeds to step S916.

[Operational Example of Information Processing Apparatus]

Figure 26:
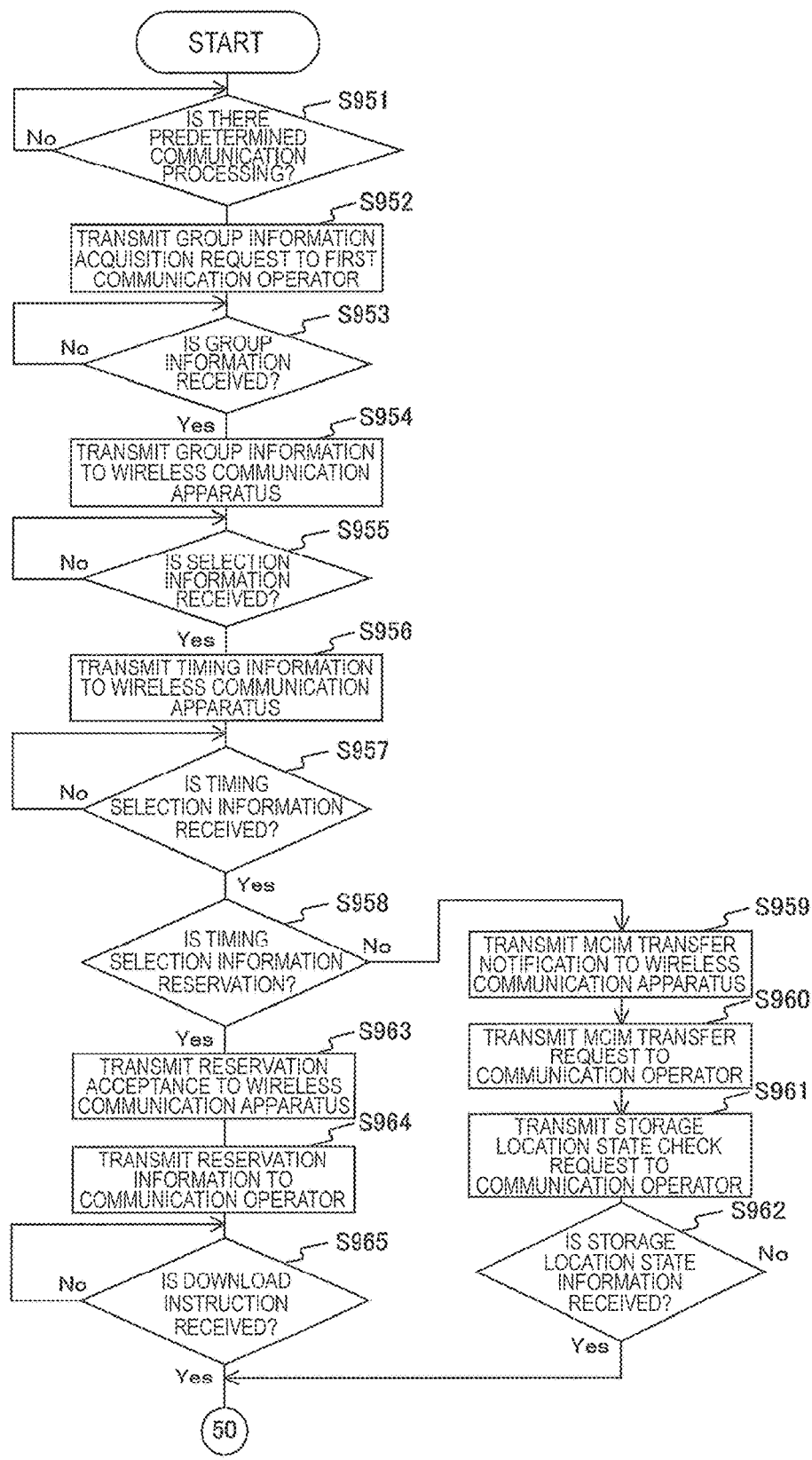
FIG. 26 is a flow chart showing an example of the processing procedure for communication processing by the information processing apparatus 400 according to the third embodiment of the present technology.
Figure 27:
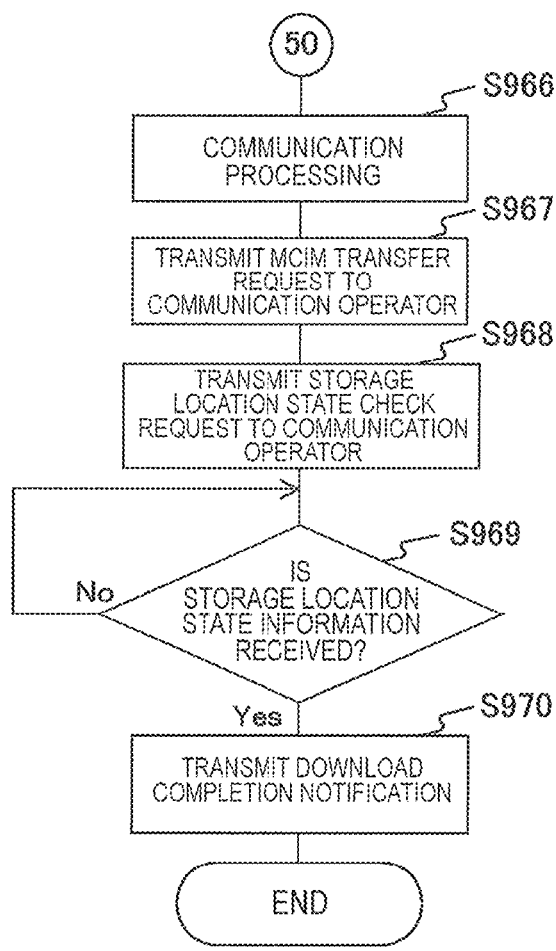
FIG. 27 is a flow chart showing an example of the processing procedure for communication processing by the information processing apparatus 400 according to the third embodiment of the present technology.

FIG. 26 and FIG. 27 are flow charts showing an example of the processing procedure for communication processing by the information processing apparatus 400 according to the third embodiment of the present technology.

At first, the control unit 450 decides whether or not predetermined communication processing (for example, purchase processing of music content) is being performed (step S951), and continues monitoring when the predetermined communication processing is not being performed.

When the predetermined communication processing has not been performed (step S951), the control unit 450 transmits a group information acquisition request to the communication control apparatus (first communication operator) 200 (step S952). Subsequently, the control unit 450 decides whether or not group information corresponding to the group information acquisition request has been received (step S953), and continues monitoring when group information has not been received. On the other hand, when group information has been received (step S953), the control unit 450 transmits the group information to a wireless communication apparatus having performed the predetermined communication processing (for example, the music content purchase processing) (step S954).

Subsequently, the control unit 450 decides whether or not selection information has been received (step S955), and continues monitoring when selection information has not been received. On the other hand, when selection information has been received (step S955), the control unit 450 transmits timing information to the wireless communication apparatus having performed the predetermined communication processing (for example, the music content purchase processing) (step S956).

Subsequently, the control unit 450 decides whether or not timing selection information has been received (step S957), and continues monitoring when timing selection information has not been received. On the other hand, when timing selection information has been received (step S957), the control unit 450 decides whether or not the timing selection information is information relating to a reservation (in other words, timing selection information other than "download at once") (step S958).

When the timing selection information is not information relating to a reservation (step S958), transfer processing of rights of using MCIM and download processing of the music content by a wireless communication apparatus of a storage location are immediately performed. In other words, the control unit 450 transmits an MCIM transfer notification to the wireless communication apparatus having performed the predetermined communication processing (for example, the music content purchase processing) (step S959). Subsequently, the control unit 450 transmits an MCIM transfer request to the communication control apparatus (first communication operator) 200 (step S960). Subsequently, the control unit 450 transmits a storage location state check request to the communication control apparatus (first communication operator) 200 (step S961). Subsequently, the control unit 450 decides whether storage location state information has been received (step S962), and continues monitoring when storage location state information has not been received. On the other hand, when storage location state information has been received (step S962), the process proceeds to step S966.

When the timing selection information is information relating to a reservation (step S958), the transfer processing of rights of using MCIM and the music content download processing by the wireless communication apparatus of the storage location are performed at the timing selected through a user operation. In other words, the control unit 450 transmits a reservation acceptance to the wireless communication apparatus having performed the predetermined communication processing (for example, the music content purchase processing) (step S963). Subsequently, the control unit 450 transmits reservation information to the communication control apparatus (first communication operator) 200 (step S964). Subsequently, the control unit 450 decides whether or not a download instruction has been received (step S965), and continues monitoring when a download instruction has not been received. On the other hand, when a download instruction has been received (step S965), the control unit 450 performs communication processing (for example, the music content download processing) (step S966).

Subsequently, the control unit 450 transmits an MCIM transfer request (a transfer request for restoration processing) to the communication control apparatus (first communication operator) 200 (step S967). Subsequently, the control unit 450 transmits a storage location state check request to the communication control apparatus (first communication operator) 200 (step S968). Subsequently, the control unit 450 decides whether or not storage location state information has been received (step S969), and continues monitoring when storage location state information has not been received. On the other hand, when storage location state information has been received (step S969), the control unit 450 transmits a download completion notification to the wireless communication apparatus having performed the predetermined communication processing (for example, purchase processing of music content) (step S970).

[Configuration Example of Service Reservation Database]

Thus far, an example of performing download processing based on reservation information held in the communication control apparatus (first communication operator) 200 has been shown. However, for example, with reservation information held in the information processing apparatus 400, download processing may be performed based on the reservation information. Accordingly, an example of performing download processing based on reservation information with the reservation information held in the information processing apparatus 400 will be shown below.

FIG. 28 is a diagram schematically showing a service reservation database 850 stored in the information processing apparatus 400 according to the third embodiment of the present technology. The service reservation database 850 is stored in, for example, the storage unit 430.

In the service reservation database 850, destination device information 851, a connection time 852, and a purchase list 853 are stored in association with each other. These pieces of information are updated in sequence by the control unit 450 based on, for example, each request (content purchase processing) from each wireless communication apparatus.

The destination device information 851 is information for identifying a wireless communication apparatus of a storage location of content purchased through content purchase processing, and, for example, terminal identification information is stored.

The connection time 852 is the time of transmitting the content purchased through the content purchase processing to the wireless communication apparatus of the storage location of the content (download time).

The purchase list 853 is information for identifying the content purchased through the content purchase processing.

Figure 16:
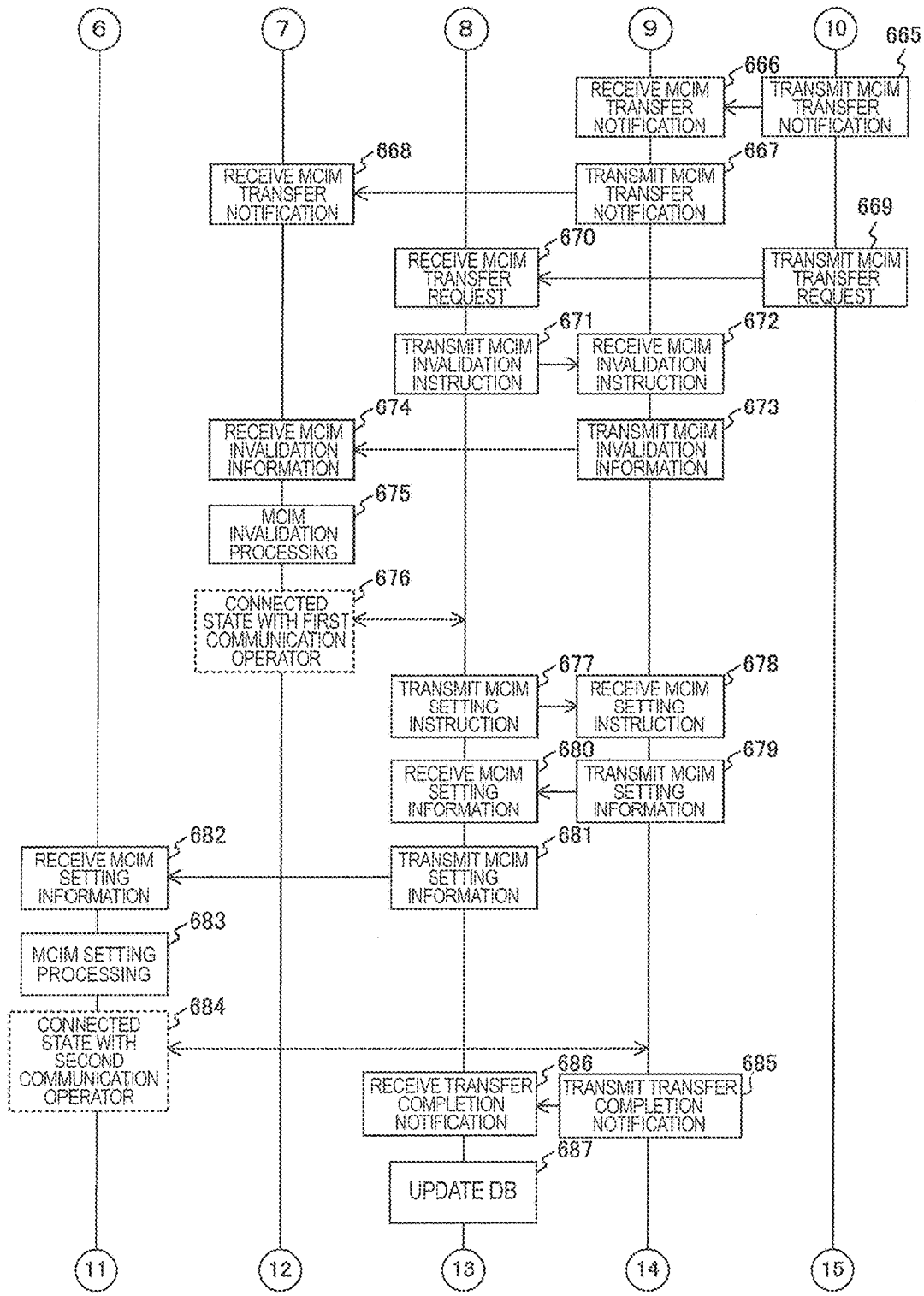
FIG. 16 is a sequence chart showing a communication processing example between each apparatus included in the communication system 100 according to the second embodiment of the present technology.
Figure 17:
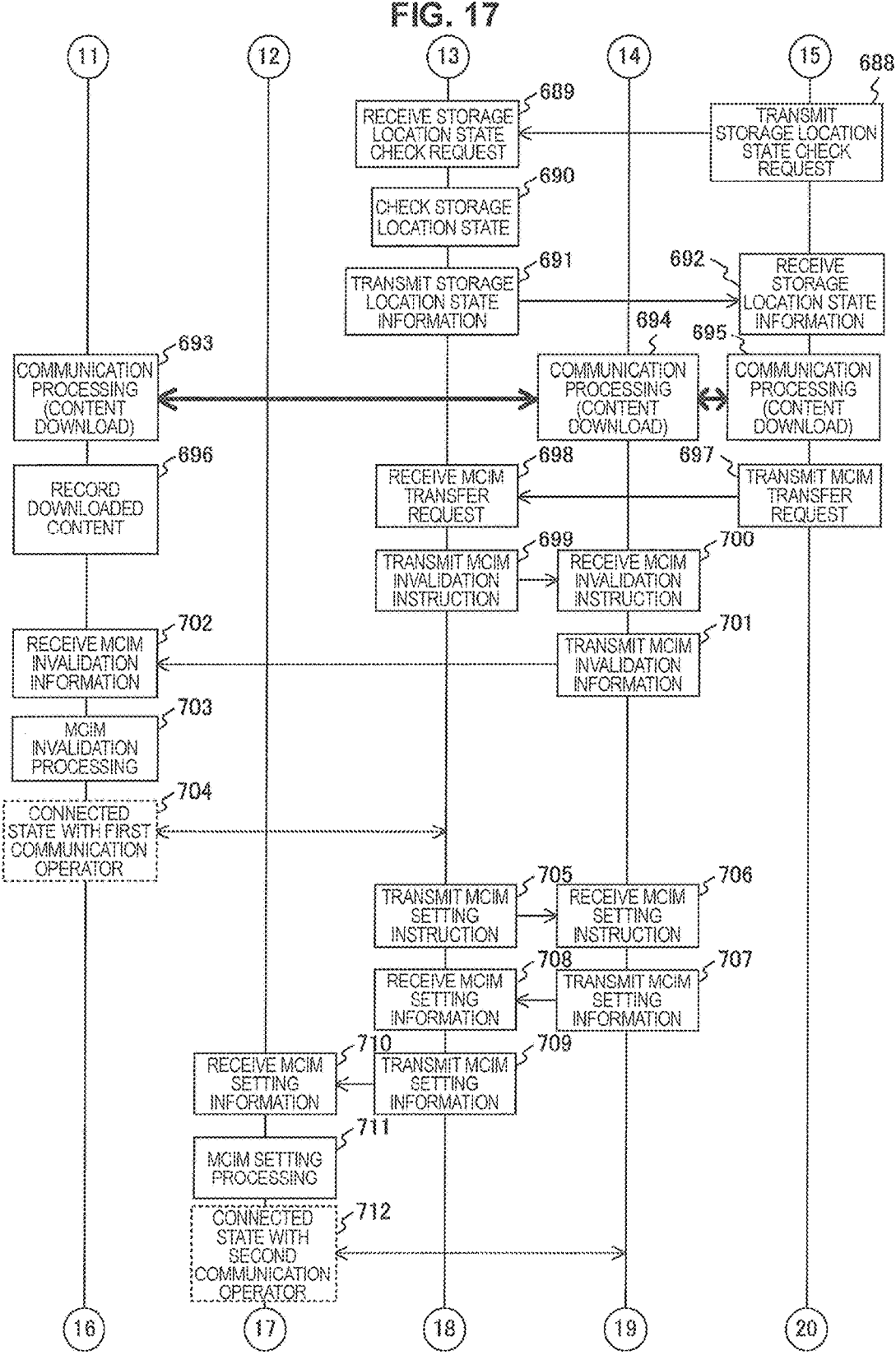
FIG. 17 is a sequence chart showing a communication processing example between each apparatus included in the communication system 100 according to the second embodiment of the present technology.
Figure 18:
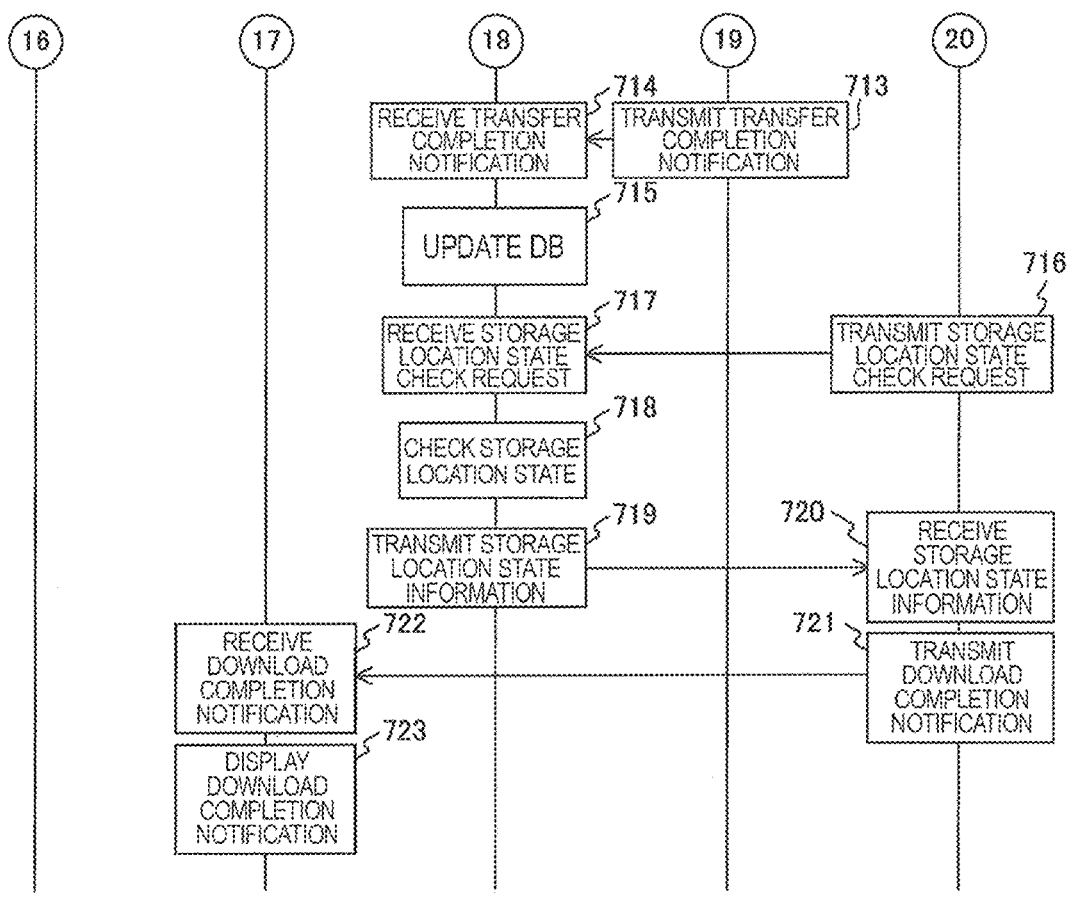
FIG. 18 is a sequence chart showing a communication processing example between each apparatus included in the communication system 100 according to the second embodiment of the present technology.

For example, based on the content of the service reservation database 850, the information processing apparatus 400 transmits an MCIM transfer request to the communication control apparatus (first communication operator) 200 (corresponding to 669 shown in FIG. 16). For example, when it is a time of the connection time 852, the determination unit 440 determines that the aforementioned predetermined condition is satisfied. Then, based on the determination results, the control unit 450 transmits an MCIM transfer request to cause rights of using MCIM to be transferred to the wireless communication apparatus of the destination device information 851 to the communication control apparatus (first communication operator) 200. After rights of using MCIM are transferred, download processing of content stored in the purchase list 853 is performed.

In other words, when the determination unit 440 determines that the predetermined condition is satisfied, the control unit 450 makes the transfer request to transfer connection rights to the communication control apparatus (first communication operator) 200. Also, using the connection rights set according to the transfer request, the control unit 450 controls communication processing (for example, download processing of music content) to be performed between the information processing apparatus 400 and a wireless communication apparatus for which the connection rights have been set. When a communication environment of a wireless communication apparatus that is a subject of the communication processing (for example, download processing of music content) satisfies a fixed condition, or it is a set period of time, the determination unit 440 can determine that the predetermined condition is satisfied. The communication environment of the wireless communication apparatus can be decided based on information from a base station to which the wireless communication apparatus is connected or the communication control apparatus. Also, a case of the communication environment satisfying the fixed condition is, as mentioned above, a period of time in which the usage load of the communication control apparatus is light, a period of time in which the network load of the side of the communication control apparatus is light, or the like.

<4. Fourth Embodiment>

The first to third embodiments of the present technology show examples of uploading image content and downloading music content according to user operations. However, it is conceivable to combine these and exchange content between a plurality of apparatuses.

Accordingly, a fourth embodiment of the present technology shows an application example of a case of exchanging content between a plurality of apparatuses. A configuration of a communication system according to the fourth embodiment of the present technology is approximately the same as the example of FIG. 3 or the like. For this reason, description of parts that are common to the fourth embodiment and the first embodiment of the present technology will be partially omitted.

[Configuration Example of Communication System]

Figure 29:
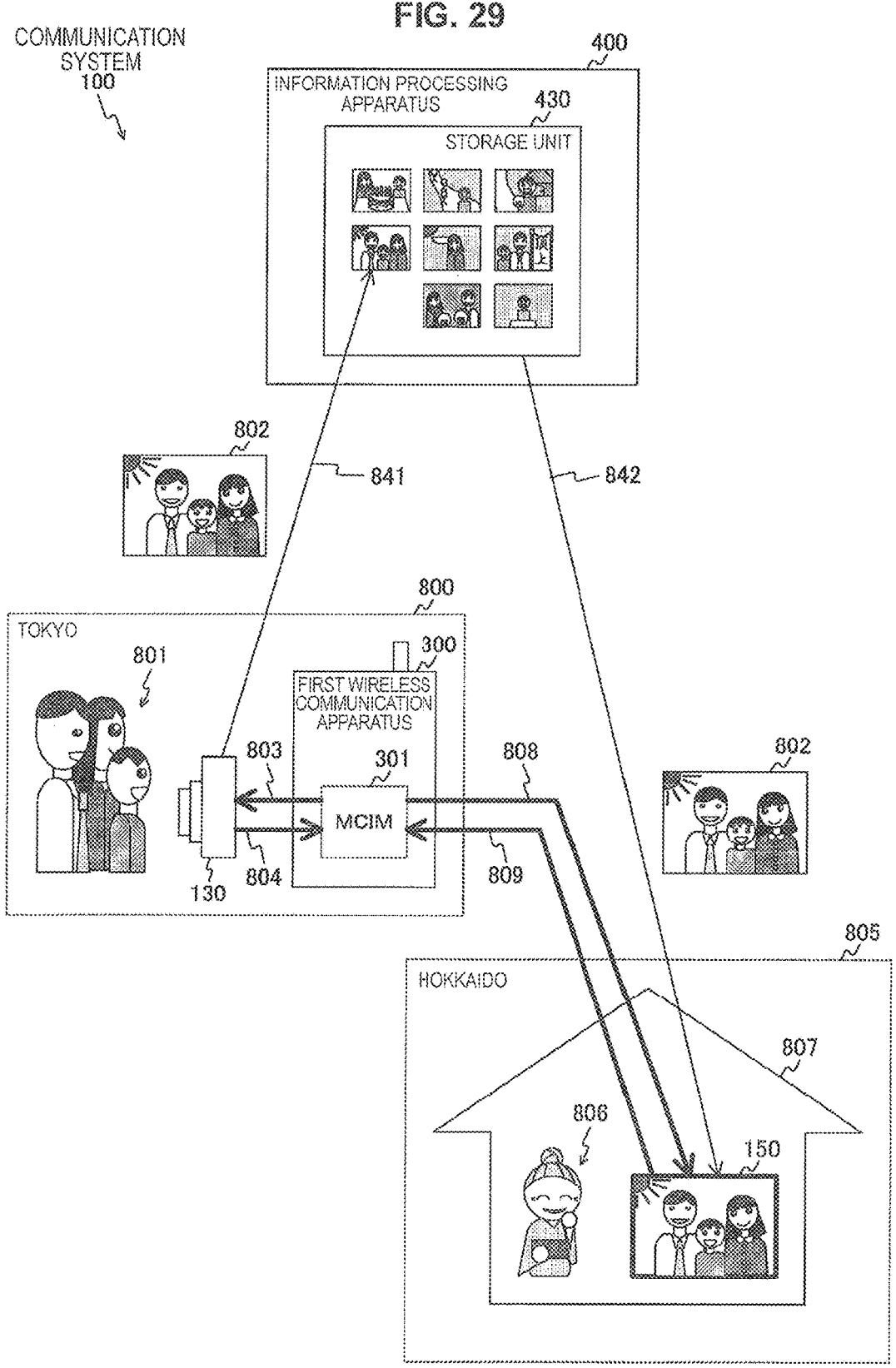
FIG. 29 is a diagram schematically showing a system configuration example of a communication system 100 according to a fourth embodiment of the present technology.

FIG. 29 is a diagram schematically showing a system configuration example of a communication system 100 according to the fourth embodiment of the present technology.

FIG. 29 shows an example in which a family 801 residing in Tokyo 800 has the first wireless communication apparatus 300 and the second wireless communication apparatus 130, and the fourth wireless communication apparatus 150 is installed in a house 807 of a grandmother 806 residing in Hokkaido 805. In FIG. 29, it is assumed that the first wireless communication apparatus 300 holds valid MCIM (rights of using MCIM) at normal times. In addition, in FIG. 29, illustrations of the third wireless communication apparatus 140, the communication control apparatus (first communication operator) 300, the communication control apparatus (second communication operator) 120, and the like are omitted for convenience of description.

Here, a case in which the family 801 residing in Tokyo 800 has taken a photograph of the family 801 using the second wireless communication apparatus 130 is assumed. In this case, as shown in the first embodiment of the present technology, rights of using MCIM are transferred from the first wireless communication apparatus 300 to the second wireless communication apparatus 130. Then, it is possible to upload the photograph (image content 802) recorded through the photography to the information processing apparatus 400.

Also, a case in which the grandmother 806 residing in Hokkaido 805 sees an image displayed in the fourth wireless communication apparatus 150 installed in the house 807 is assumed. In this case, as shown in the second embodiment and the third embodiment of the present technology, rights of using MCIM are transferred from the first wireless communication apparatus 300 to the fourth wireless communication apparatus 150. Then, it is possible to download the photograph (image content 802) recorded in the information processing apparatus 400. In this case, even when the grandmother 806 residing in Hokkaido 805 does not operate the fourth wireless communication apparatus 150, it is possible to automatically download and display the photograph (image content 802) recorded in the information processing apparatus 400. For this reason, the grandmother 806 residing in Hokkaido 805 can see recent photographs of the family 801 residing in Tokyo 800 in sequence.

[Communication Example in Case of Uploading and Downloading Image Content]

Figure 30:
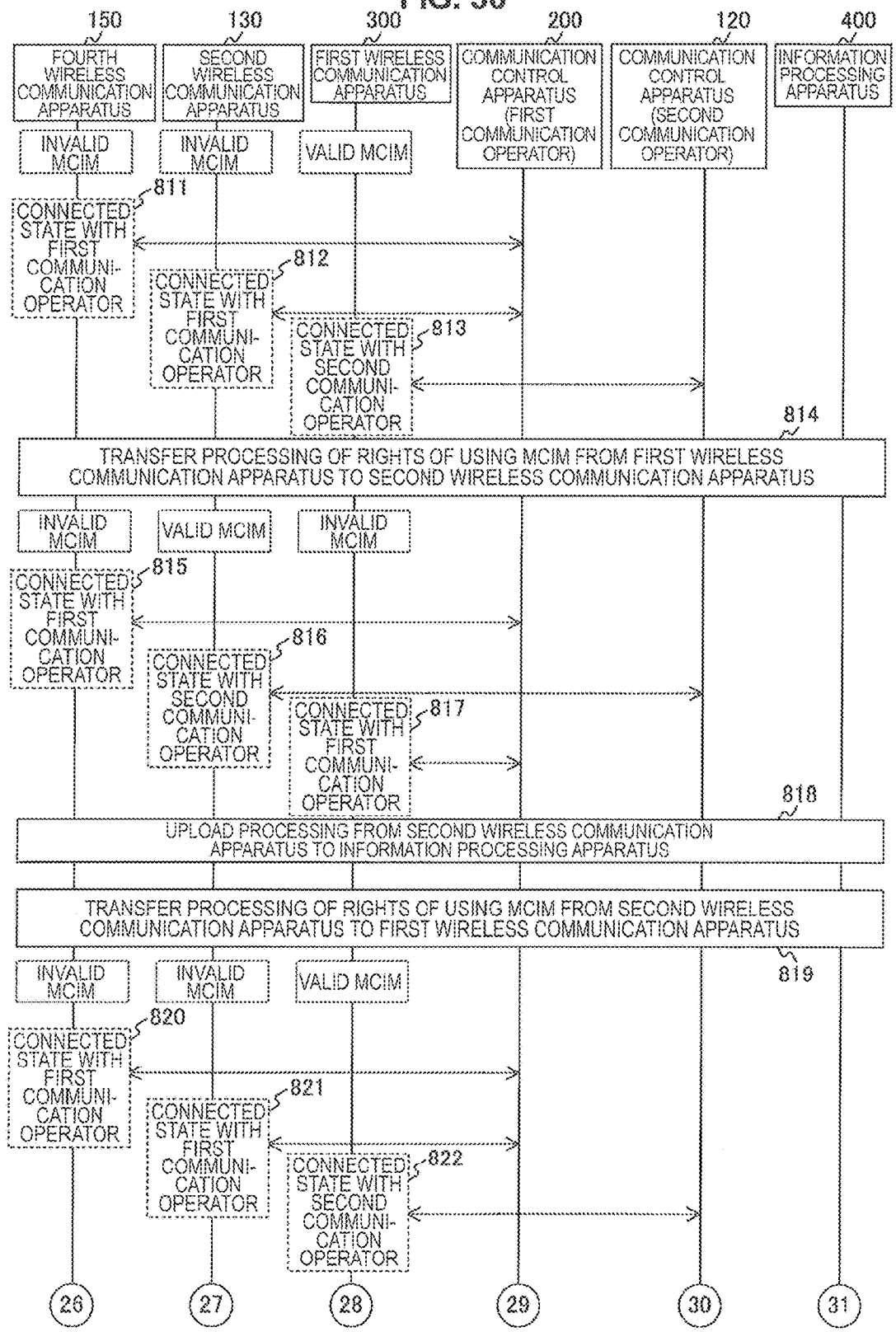
FIG. 30 is a sequence chart showing the communication processing example between each apparatus included in the communication system 100 according to the fourth embodiment of the present technology.

FIG. 30 and FIG. 31 are sequence charts showing a communication processing example between each apparatus included in the communication system 100 according to the fourth embodiment of the present technology.

The example shown in FIG. 30 and FIG. 31 is an application example of the first to third embodiments of the present technology, and an example in which these are combined. Accordingly, in FIG. 30 and FIG. 31, illustrations of parts that are common to FIG. 30, FIG. 31, and the first to third embodiments of the present technology will be shown in a simplified manner, and description thereof will be partially omitted.

FIG. 30 and FIG. 31 shows an example of performing upload processing from the information processing apparatus 400 to the fourth wireless communication apparatus 150 based on control of the information processing apparatus 400.

It is assumed that the first wireless communication apparatus 300 is in a connected state (813) with the communication control apparatus (second communication operator) 120, and the second wireless communication apparatus 130 and the fourth wireless communication apparatus 150 are in connected states (811 and 812) with the communication control apparatus (first communication operator) 200.

As shown in FIG. 29, it is assumed that the family 801 has performed photography using the second wireless communication apparatus 130 in Tokyo 800. In this case, as indicated by an arrow 803 (shown in FIG. 29), transfer processing of transferring rights of using MCIM from the first wireless communication apparatus 300 to the second wireless communication apparatus 130 is performed (814). Thereby, the second wireless communication apparatus 130 is put in a connected state (816) with the communication control apparatus (second communication operator) 120, and the first wireless communication apparatus 300 and the fourth wireless communication apparatus 150 are put in connected states (815 and 817) with the communication control apparatus (first communication operator) 200.

Subsequently, as indicated by an arrow 841 (shown in FIG. 29), the photograph (image content 802) recorded through the photography using the second wireless communication apparatus 130 is uploaded to the information processing apparatus 400 (818).

When this upload processing ends (818), as indicated by an arrow 804 (shown in FIG. 29), transfer processing of transferring the rights of using the MCIM from the second wireless communication apparatus 130 to the first wireless communication apparatus 300 is performed (819). In this way, the connected states of the respective wireless communication apparatuses become the original states (820 to 822).

Subsequently, the control unit 450 of the information processing apparatus 400 decides whether or not a predetermined condition is satisfied (823). For example, reaching the time of the connection time 852 shown in FIG. 28 can be set as the predetermined condition. When the predetermined condition is satisfied (for example, it is 3 a.m.) (823), transfer processing of transferring the rights of using the MCIM from the first wireless communication apparatus 300 to the fourth wireless communication apparatus 150 is performed (824) as indicated by an arrow 808 (shown in FIG. 29). Hereby, the fourth wireless communication apparatus 150 is put in a connected state (825) with the communication control apparatus (second communication operator) 120, and the first wireless communication apparatus 300 and the second wireless communication apparatus 130 are put in connected states (826 and 827) with the communication control apparatus (first communication operator) 200.

Subsequently, as indicated by an arrow 842 (shown in FIG. 29), the photograph (image content 802) stored in the storage unit 430 of the information processing apparatus 400 is downloaded from the information processing apparatus 400 to the fourth wireless communication apparatus 150 (828). In this case, synchronization processing (for example, synchronization processing of image content) may be performed between the information processing apparatus 400 and the fourth wireless communication apparatus 150.

When this download processing ends (828), transfer processing of transferring the rights of using the MCIM from the fourth wireless communication apparatus 150 to the first wireless communication apparatus 300 is performed (829) as indicated by an arrow 809 (shown in FIG. 29). Thereby, the connected states of the respective wireless communication apparatuses become the original states (830 to 832).

Embodiments of the present technology have been described with an example of integrally constituted information processing apparatuses (the communication control apparatuses 120 and 200, the information processing apparatus 400, and the like). However, the embodiments of the present technology can also be applied to an information processing system in which respective parts of these information processing apparatuses (for example, control units and the group management database 220) are constituted of a plurality of apparatuses. Also, while the embodiments of the present technology have been described with an example of the group AB constituted of four wireless communication apparatuses, the embodiments of the present technology can also be applied to a group constituted of two, three, or five or more wireless communication apparatuses. In addition, the embodiments of the present technology have been described with an example of a case of performing communication processing between a plurality of wireless communication apparatuses included in a group. However, the embodiments of the present technology can also be applied to a case of performing communication processing between a plurality of wireless communication apparatuses that are not included in a group. In this case, it is possible to set a counterpart through a user operation (for example, an input operation of identification information for identifying a wireless communication apparatus of the counterpart).

The embodiments of the present technology can be applied to a portable wireless communication apparatus (for example, a terminal apparatus dedicated to data communication) and fixed wireless communication apparatuses. For example, the embodiments of the present technology can be applied to wireless communication apparatuses intended to collect data of vending machines, and wireless communication apparatuses installed in elevators, automobiles, electronics (for example, home appliances, game machines, digital photo frames).

In addition, the embodiment of the present technology has been described by taking, as network connection rights (connection rights), rights of using MCIM as an example. However, an embodiment of the present technology can also be applied to rights to connect to a predetermined network based on other information (for example, USIM (Universal Subscriber Identity Module)).

Also, the above-described embodiments are intended only to show examples realizing the present technology, and matters according to the embodiments and specific inventive matters within the scope of claims have a correspondence relation. Likewise, specific inventive matters within the scope of claims, and matters according to the embodiments of the present technology, to which the same names as the specific inventive matters are assigned, have a correspondence relation. However, the present technology is not limited to the embodiments, and the embodiments may also be modified in various forms without departing from the scope and spirit of the present technology.

Also, the processing procedures described in the above-mentioned embodiments may be methods including a series of these steps, and may also include a program for executing a series of these steps on a computer or a recording medium storing the program. As the recording medium, for example, a Compact Disc (CD), Minidisc (MD), a Digital Versatile Disc (DVD), a memory card, a Blu-ray Disc (trademark), or the like may be used.

Additionally, the present technology may also be configured as below.

(1)
An information processing apparatus including:
a determination unit which determines whether a first wireless communication apparatus for which a connection right to connect to a predetermined network using wireless communication has not been set satisfies a predetermined condition for connecting to the network and performing predetermined communication processing,
wherein, when the predetermined condition is satisfied, the first wireless communication apparatus performs the communication processing using the connection right set for the first wireless communication apparatus through transfer of the connection right from a second wireless communication apparatus for which the connection right has been set to the first wireless communication apparatus.

(2)
The information processing apparatus according to (1),
wherein the information processing apparatus is the first wireless communication apparatus, and
wherein the information processing apparatus further includes a control unit which makes a transfer request to transfer the connection right from the second wireless communication apparatus to the first wireless communication apparatus and performs control for performing the communication processing using the connection right set according to the transfer request when it is determined that the predetermined condition is satisfied in the first wireless communication apparatus.

(3)
The information processing apparatus according to (2),
wherein the information processing apparatus is a content creation apparatus that creates content, and
wherein the control unit performs control for performing, as the communication processing, upload processing of uploading the created content to an information processing apparatus for storing the created content.

(4)
The information processing apparatus according to (3),
wherein the determination unit determines that the predetermined condition is satisfied at any timing among a timing at which the content is generated, a timing at which a capacity of the content stored in a storage unit exceeds a predetermined capacity, and a timing of power off or a fixed time after power off.

(5)
The wireless communication apparatus according to any one of (2) to (4),
wherein the control unit makes the transfer request to an RO (Registration Operator), and performs control for performing the communication processing using the connection right set according to the transfer request by an SHO (Selected Home Operator).

(6) The information processing apparatus according to (1),
wherein the information processing apparatus is the second wireless communication apparatus, and
wherein the information processing apparatus further includes a control unit which performs control for transferring the connection right from the second wireless communication apparatus to the first wireless communication apparatus when it is determined that the predetermined condition is satisfied in the second wireless communication apparatus.

(7) The information processing apparatus according to (6),
wherein the first wireless communication apparatus is an information processing apparatus that handles content, and
wherein the control unit performs control for performing, as the communication processing, download processing of downloading the content from another information processing apparatus that handles the content to the first wireless communication apparatus.

(8) The information processing apparatus according to (7), further including:
a reception unit which receives a determination operation of determining a timing for performing the download processing,
wherein the control unit performs control for performing the download processing at the determined timing.

(9) The information processing apparatus according to (7) or (8),
wherein a group that shares the connection right includes a plurality of wireless communication apparatuses including the information processing apparatus, and
wherein the information processing apparatus further comprises a reception unit which receives a determination operation of determining the first wireless communication apparatus to perform the download processing, from among the plurality of wireless communication apparatuses included in the group.

(10) The information processing apparatus according to (9),
wherein identification information for identifying the respective wireless communication apparatuses included in the group is stored in an RO that manages the group, and
wherein the control unit acquires the identification information from the RO, causes a display unit to display a selection screen for selecting the first wireless communication apparatus from among the plurality of wireless communication apparatuses included in the group based on the acquired identification information, and determines a wireless communication apparatus selected through a user operation in the selection screen as the first wireless communication apparatus.

(11) The information processing apparatus according to (1),
wherein the information processing apparatus is an information processing apparatus that performs the communication processing between the information processing apparatus and the first wireless communication apparatus, and
wherein the information processing apparatus further includes a control unit which makes a transfer request to transfer the connection right from the second wireless communication apparatus to the first wireless communication apparatus and performs control for performing the communication processing between the information processing apparatus and the first wireless communication apparatus using the connection right set for the first wireless communication apparatus according to the transfer request when it is determined that the predetermined condition is satisfied in the information processing apparatus.

(12) The information processing apparatus according to (11),
wherein identification information for identifying a plurality of wireless communication apparatuses included in a group that is constituted of the wireless communication apparatuses including the information processing apparatus and shares the connection right is stored in an RO that manages the group, and
wherein the control unit acquires the identification information from the RO, and performs control for transmitting the acquired identification information to the second wireless communication apparatus.

(13) The information processing apparatus according to (12),
wherein the control unit transmits the acquired identification information to the second wireless communication apparatus as information for causing a display unit of the second wireless communication apparatus to display a selection screen for selecting the first wireless communication apparatus from among the plurality of wireless communication apparatuses included in the group.

(14) The information processing apparatus according to any one of (11) to (13),
wherein, when a communication environment of the first wireless communication apparatus satisfies a given condition, or when a set period of time arrives, the determination unit determines that the predetermined condition is satisfied.

(15) The information processing apparatus according to (11),
wherein the information processing apparatus is an information processing apparatus that handles content, and
wherein the control unit performs control for performing, as the communication processing, upload processing of uploading the content from the first wireless communication apparatus or download processing of downloading the content to the first wireless communication apparatus.

(16) The information processing apparatus according to any one of (1) to (15),
wherein, when the communication processing using the connection right set through the transfer ends, the connection right is transferred from the first wireless communication apparatus to the second wireless communication apparatus.

(17) The information processing apparatus according to any one of (1) to (16),
wherein the connection right is a right to connect to a base station managed by a communication operator based on contract authentication information for connecting to the base station.

(18) A communication system including:
a first wireless communication apparatus for which a connection right to connect to a predetermined network using wireless communication has not been set; and
a second wireless communication apparatus for which the connection right has been set,
wherein it is determined whether the first wireless communication apparatus satisfies a predetermined condition for connecting to the network and performing predetermined communication processing, and when the predetermined condition is satisfied, the first wireless communication apparatus performs the communication processing using the connection right set for the first wireless communication apparatus through transfer of the connection right from the second wireless communication apparatus to the first wireless communication apparatus.

(19)

A control method of an information processing apparatus, the control method including:

a determination procedure of determining whether a first wireless communication apparatus for which connection right to connect to a predetermined network using wireless communication has not been set satisfies a predetermined condition for connecting to the network and performing predetermined communication processing, and a control procedure of performing control, when the predetermined condition is satisfied, for the first wireless communication apparatus to perform the communication processing using the connection right set for the first wireless communication apparatus through transfer of the connection right from a second wireless communication apparatus for which the connection right has been set to the first wireless communication apparatus.

REFERENCE SIGNS LIST 10, 100 communication system
40, 110 network
50 service providing company
51, 400 information processing apparatus
80 content server
120 communication control apparatus (second communication operator)
21, 31, 121, 122, 206 base station
125, 210, 330, 450 control unit
131 shutter button
132 input and output panel
130 second wireless communication apparatus
140 third wireless communication apparatus
150 fourth wireless communication apparatus
200 communication control apparatus (first communication operator)
205, 410 communication unit
220 group management database
300 first wireless communication apparatus
311 antenna
312 antenna shared unit
321 modulation unit
322 demodulation unit
331 bus
340 memory
350 MCIM information storage unit
360 operation unit
370 display unit
380 position information acquisition unit
391 microphone
392 speaker
420 service providing unit
430 storage unit
440 determination unit

The invention claimed is:

1. A first information processing apparatus, comprising:
a processor configured to:
determine whether a first wireless communication apparatus satisfies a condition to connect to a network and execute a communication process, wherein
a second wireless communication apparatus transfers a connection right to the first wireless communication apparatus based on a selection of a purchase operation on the second wireless communication apparatus and a selection of the first wireless communication apparatus on the second wireless communication apparatus,
the condition is satisfied based on the transfer of the connection right to the first wireless communication apparatus, and
the selection of the first wireless communication apparatus is based on a user operation on the second wireless communication apparatus;
control the second wireless communication apparatus to display a timing selection screen, wherein
the display of the timing selection screen is subsequent to the selection of the first wireless communication apparatus,
the timing selection screen includes a plurality of timings for download of first content, and
the second wireless communication apparatus:
receives a first determination operation on the timing selection screen,
selects a timing from the plurality of timings based on the first determination operation, and
transmits information indicating the selected timing to the first information processing apparatus;
control, based on the transmitted information, the first wireless communication apparatus to execute the communication process for the download of the first content, wherein
the download of the first content is at the selected timing,
the download of the first content is based on the selected purchase operation and the transferred connection right,
the second wireless communication apparatus belongs to a group that includes a plurality of wireless communication apparatuses, and
first group identification information of the group to which the second wireless communication apparatus belongs is same as second group identification information associated with the first wireless communication apparatus; and
control the first wireless communication apparatus to transfer the connection right from the first wireless communication apparatus to the second wireless communication apparatus, wherein the transfer of the connection right from the first wireless communication apparatus to the second wireless communication apparatus is subsequent to completion of the download of the first content.

2. The first information processing apparatus according to claim 1, wherein
the first information processing apparatus is the first wireless communication apparatus, and
the processor is further configured to:
transmit a transfer request to the second wireless communication apparatus, wherein
the second wireless communication apparatus transfers the connection right to the first wireless communication apparatus based on the transfer request; and execute the communication process based on the transferred connection right and the determination that the condition is satisfied in the first wireless communication apparatus.

3. The first information processing apparatus according to claim 1, wherein
the first information processing apparatus is a content creation apparatus configured to create second content, and
the processor is further configured to control, as the communication process, an upload process for upload of the created second content to a second information processing apparatus to store the created second content.

4. The first information processing apparatus according to claim 3, wherein a first time at which the condition is satisfied corresponds to at least one of a second time at which the second content is generated, a third time of a power off operation of the first wireless communication apparatus, or a fixed fourth time of the power off operation of the first wireless communication apparatus.

5. The first information processing apparatus according to claim 1, wherein the processor is further configured to:
transmit a transfer request to a Registration Operator (RO) for the transfer of the connection right from the second wireless communication apparatus to the first wireless communication apparatus; and
control the first wireless communication apparatus to execute the communication process, wherein the execution of the communication process is based on the transferred connection right and the transfer request by a Selected Home Operator (SHO).

6. The first information processing apparatus according to claim 1, wherein
the first information processing apparatus is the second wireless communication apparatus, and
the processor is further configured to control the transfer of the connection right from the second wireless communication apparatus to the first wireless communication apparatus, based on a determination that the condition is satisfied in the second wireless communication apparatus.

7. The first information processing apparatus according to claim 6, wherein
the first wireless communication apparatus is configured to handle the first content, and
the processor is further configured to control the first wireless communication apparatus to download the first content from a second information processing apparatus.

8. The first information processing apparatus according to claim 7, wherein
the group shares the connection right and includes the plurality of wireless communication apparatuses including the first information processing apparatus,
the processor is further configured to receive a second determination operation to determine the first wireless communication apparatus from the plurality of wireless communication apparatuses included in the group, and
the determined first wireless communication apparatus downloads the first content.

9. The first information processing apparatus according to claim 8, wherein
the first group identification information, to identify the plurality of wireless communication apparatuses included in the group, is stored in a Registration Operator (RO), the registration operator manages the group, and
the processor is further configured to:
acquire the first group identification information from the RO;
control a display unit of the second wireless communication apparatus to display a selection screen; and
select the first wireless communication apparatus from the plurality of wireless communication apparatuses included in the group based on the user operation on the selection screen, wherein
the display of the selection screen is based on the acquired first group identification information.

10. The first information processing apparatus according to claim 1, wherein the processor is further configured to:
transmit a transfer request to the second wireless communication apparatus, wherein
the second wireless communication apparatus transfers the connection right to the first wireless communication apparatus based on the transfer request; and
control the first wireless communication apparatus to execute the communication process between a second information processing apparatus and the first wireless communication apparatus based on the transmitted transfer request.

11. The first information processing apparatus according to claim 10, wherein
the first group identification information, to identify the plurality of wireless communication apparatuses included in the group, is stored in a Registration Operator (RO) that manages the group,
the group comprises the plurality of wireless communication apparatuses including the first information processing apparatus,
the group shares the connection right, and
the processor is further configured to:
acquire the first group identification information from the RO; and
transmit the acquired first group identification information to the second wireless communication apparatus.

12. The first information processing apparatus according to claim 11, wherein the processor is further configured to:
control a display unit of the second wireless communication apparatus to display a selection screen,
wherein the display of the selection screen is based on the transmitted first group identification information; and
select the first wireless communication apparatus from the plurality of wireless communication apparatuses included in the group, based on the user operation on the selection screen.

13. The first information processing apparatus according to claim 10, wherein the processor is further configured to determine that the condition is satisfied, based on a determination that at least one of a communication environment of the first wireless communication apparatus satisfies a given condition or a set period of time arrives.

14. The first information processing apparatus according to claim 10, wherein
the first information processing apparatus is configured to handle second content, and
the processor is further configured to control, as the communication process, at least one of an upload process to upload the second content from the first wireless communication apparatus or a download process to download the second content to the first wireless communication apparatus.

15. The first information processing apparatus according to claim 1, wherein
the connection right is a right to connect to a base station managed by a communication operator, and
the connection to the base station is based on contract authentication information.

16. A communication system, comprising:
a first wireless communication apparatus;
a second wireless communication apparatus; and
a processor configured to:
determine whether the first wireless communication apparatus satisfies a condition to connect to a network and execute a communication process, wherein
the second wireless communication apparatus is configured to transfer a connection right to the first wireless communication apparatus based on a selection of a purchase operation on the second wireless communication apparatus and a selection of the first wireless communication apparatus on the second wireless communication apparatus,
the condition is satisfied based on the transfer of the connection right to the first wireless communication apparatus, and
the selection of the first wireless communication apparatus is based on a user operation on the second wireless communication apparatus;
control the second wireless communication apparatus to display a timing selection screen, wherein
the display of the timing selection screen is subsequent to the selection of the first wireless communication apparatus,
the timing selection screen includes a plurality of timings for download of content, and
the second wireless communication apparatus is further configured to:
receive a determination operation on the timing selection screen;
select a timing from the plurality of timings based on the determination operation; and
transmit information indicating the selected timing to the processor;
control, based on the transmitted information, the first wireless communication apparatus to execute the communication process for the download of the content, wherein
the download of the content is at the selected timing,
the download of the content is based on the selected purchase operation and the transferred connection right,
the second wireless communication apparatus belongs to a group that includes a plurality of wireless communication apparatuses, and
first group identification information of the group to which the second wireless communication apparatus belongs is same as second group identification information associated with the first wireless communication apparatus; and
control the first wireless communication apparatus to transfer the connection right from the first wireless communication apparatus to the second wireless communication apparatus, wherein the transfer of the connection right from the first wireless communication apparatus to the second wireless communication apparatus is subsequent to completion of the download of the content.

17. A control method, comprising:
in a first information processing apparatus:
determining whether a first wireless communication apparatus satisfies a condition to connect to a network and execute a communication process, wherein
a second wireless communication apparatus transfers a connection right to the first wireless communication apparatus based on a selection of a purchase operation on the second wireless communication apparatus and a selection of the first wireless communication apparatus on the second wireless communication apparatus,
the condition is satisfied based on the transfer of the connection right to the first wireless communication apparatus, and
the selection of the first wireless communication apparatus is based on a user operation on the second wireless communication apparatus;
controlling the second wireless communication apparatus to display a timing selection screen, wherein
the display of the timing selection screen is subsequent to the selection of the first wireless communication apparatus,
the timing selection screen includes a plurality of timings for download of content, and
the second wireless communication apparatus:
receives a determination operation on the timing selection screen,
selects a timing from the plurality of timings based on the determination operation, and
transmits information indicating the selected timing to the first information processing apparatus;
controlling, based on the transmitted information, the first wireless communication apparatus to execute the communication process for the download of the content, wherein
the download of the content is at the selected timing,
the download of the content is based on the selected purchase operation and the transferred connection right,
the second wireless communication apparatus belongs to a group that includes a plurality of wireless communication apparatuses, and
first group identification information of the group to which the second wireless communication apparatus belongs is same as second group identification information associated with the first wireless communication apparatus; and
controlling the first wireless communication apparatus to transfer the connection right from the first wireless communication apparatus to the second wireless communication apparatus, wherein the transfer of the connection right from the first wireless communication apparatus to the second wireless communication apparatus is subsequent to completion of the download of the content.

* * * * *